US007822735B2

(12) United States Patent
Suda et al.

(10) Patent No.: US 7,822,735 B2
(45) Date of Patent: Oct. 26, 2010

(54) SYSTEM AND METHOD FOR SAVING BROWSED DATA

(75) Inventors: Aruna Rohra Suda, Yokohama (JP); Suresh Jeyachandran, Yokohama (JP); Prem Anand Joseph, Yokohama (JP)

(73) Assignee: Saora Kabushiki Kaisha, Yokohama-shi (JP)

( * ) Notice: Subject to any disclaimer, the term of this patent is extended or adjusted under 35 U.S.C. 154(b) by 879 days.

(21) Appl. No.: 09/865,773

(22) Filed: May 25, 2001

(65) Prior Publication Data

US 2002/0035563 A1 Mar. 21, 2002

(30) Foreign Application Priority Data

| May 29, 2000 | (JP) | ............................. 2000-197293 |
| Jul. 17, 2000 | (JP) | ............................. 2000-248999 |
| Oct. 16, 2000 | (JP) | ............................. 2000-314601 |

(51) Int. Cl.
 *G06F 7/00* (2006.01)
(52) U.S. Cl. ...................................... 707/711; 707/741
(58) Field of Classification Search ............... 707/1–10, 707/100–104.1, 200–205, 711; 715/501.1, 715/510–514, 841, 968, 500.1; 709/203–228; 345/781, 825, 861, 853, 968
 See application file for complete search history.

(56) References Cited

U.S. PATENT DOCUMENTS

| 4,633,393 A | | 12/1986 | Rundell |
| 5,371,844 A | | 12/1994 | Andrew et al. |
| 5,497,491 A | | 3/1996 | Mitchell et al. |
| 5,678,041 A | * | 10/1997 | Baker et al. ..................... 707/9 |
| 5,796,952 A | | 8/1998 | Davis et al. |
| 5,809,242 A | | 9/1998 | Shaw et al. |
| 5,828,374 A | | 10/1998 | Coleman et al. |
| 5,835,712 A | * | 11/1998 | DuFresne ..................... 709/203 |
| 5,848,410 A | * | 12/1998 | Walls et al. ...................... 707/6 |
| 5,892,908 A | | 4/1999 | Hughes et al. |
| 5,900,005 A | * | 5/1999 | Saito .......................... 715/531 |
| 5,913,214 A | * | 6/1999 | Madnick et al. ............... 707/10 |

(Continued)

FOREIGN PATENT DOCUMENTS

EP 0 837 583 A2 4/1998

(Continued)

OTHER PUBLICATIONS

Athman B et al. World wide database integrating the web, CORBA and Databases, 3 pages.*

(Continued)

*Primary Examiner*—Neveen Abel Jalil
*Assistant Examiner*—Christyann R Pulliam
(74) *Attorney, Agent, or Firm*—Crowell & Moring LLP

(57) ABSTRACT

A system saves browsed data in a database in response to a user request by assigning a predetermined index to the data, wherein the user is not requested for any index. The system sorts indices of the data in the database and displays the sorted indices, then the system retrieves, in response to a selection of an index from the displayed indices by a user, the data corresponding to the selected index from the database. Accordingly if a user wants to save a data currently browsed, he can make store the data in the database easily only by issuing an instruction to save without specifying any index.

4 Claims, 91 Drawing Sheets

U.S. PATENT DOCUMENTS

| | | | |
|---|---|---|---|
| 5,933,811 A | 8/1999 | Angles et al. | |
| 5,933,827 A * | 8/1999 | Cole et al. | 707/10 |
| 5,937,163 A | 8/1999 | Lee et al. | |
| 5,948,061 A | 9/1999 | Merriman et al. | |
| 5,959,621 A | 9/1999 | Nawaz et al. | |
| 5,963,965 A * | 10/1999 | Vogel | 715/501.1 |
| 5,974,409 A * | 10/1999 | Sanu et al. | 707/3 |
| 5,974,455 A * | 10/1999 | Monier | 709/223 |
| 6,003,046 A * | 12/1999 | Nielsen | 715/513 |
| 6,012,053 A * | 1/2000 | Pant et al. | 707/3 |
| 6,067,541 A * | 5/2000 | Raju et al. | 707/3 |
| 6,067,552 A * | 5/2000 | Yu | 715/501.1 |
| 6,070,159 A * | 5/2000 | Wilson et al. | 707/3 |
| 6,073,135 A * | 6/2000 | Broder et al. | 707/100 |
| 6,078,866 A | 6/2000 | Buck et al. | |
| 6,081,829 A * | 6/2000 | Sidana | 709/203 |
| 6,094,657 A * | 7/2000 | Hailpern et al. | 707/103 R |
| 6,100,890 A * | 8/2000 | Bates et al. | 715/826 |
| 6,112,193 A | 8/2000 | Dlugos et al. | |
| 6,119,133 A * | 9/2000 | Nusbickel et al. | 707/205 |
| 6,151,624 A * | 11/2000 | Teare et al. | 709/217 |
| 6,182,063 B1 * | 1/2001 | Woods | 707/3 |
| 6,189,018 B1 * | 2/2001 | Newman et al. | 715/501.1 |
| 6,209,036 B1 * | 3/2001 | Aldred et al. | 709/229 |
| 6,269,361 B1 * | 7/2001 | Davis et al. | 707/3 |
| 6,282,548 B1 * | 8/2001 | Burner et al. | 707/104.1 |
| 6,292,473 B1 | 9/2001 | Duske et al. | |
| 6,304,872 B1 * | 10/2001 | Chao | 707/5 |
| 6,336,117 B1 * | 1/2002 | Massarani | 707/711 |
| 6,338,044 B1 | 1/2002 | Cook et al. | |
| 6,345,289 B1 | 2/2002 | Lotspiech et al. | |
| 6,351,745 B1 * | 2/2002 | Itakura et al. | 707/10 |
| 6,366,956 B1 * | 4/2002 | Krishnan | 709/223 |
| 6,370,527 B1 * | 4/2002 | Singhal | 707/6 |
| 6,415,319 B1 * | 7/2002 | Ambroziak | 709/219 |
| 6,457,060 B1 | 9/2002 | Martin et al. | |
| 6,470,381 B2 | 10/2002 | De Boor et al. | |
| 6,484,149 B1 | 11/2002 | Jammes et al. | |
| 6,490,370 B1 | 12/2002 | Krasinski et al. | |
| 6,493,758 B1 | 12/2002 | McLain | |
| 6,505,196 B2 * | 1/2003 | Drucker et al. | 707/5 |
| 6,507,855 B1 | 1/2003 | Stern | |
| 6,516,312 B1 * | 2/2003 | Kraft et al. | 707/3 |
| 6,516,338 B1 | 2/2003 | Landsman et al. | |
| 6,567,800 B1 * | 5/2003 | Barrera et al. | 707/3 |
| 6,567,918 B1 * | 5/2003 | Flynn et al. | 726/7 |
| 6,571,295 B1 * | 5/2003 | Sidana | 709/246 |
| 6,578,078 B1 * | 6/2003 | Smith et al. | 709/224 |
| 6,594,682 B2 * | 7/2003 | Peterson et al. | 718/102 |
| 6,598,017 B1 * | 7/2003 | Yamamoto et al. | 704/251 |
| 6,651,090 B1 | 11/2003 | Itabashi et al. | |
| 6,654,749 B1 * | 11/2003 | Nashed | 707/10 |
| 6,697,838 B1 | 2/2004 | Jakobson | |
| 6,704,741 B1 | 3/2004 | Lively et al. | |
| 6,718,365 B1 | 4/2004 | Dutta | |
| 6,721,736 B1 * | 4/2004 | Krug et al. | 707/5 |
| 6,732,142 B1 * | 5/2004 | Bates et al. | 709/203 |
| 6,744,447 B2 * | 6/2004 | Estrada et al. | 715/751 |
| 6,766,458 B1 * | 7/2004 | Harris et al. | 726/6 |
| 6,778,194 B2 * | 8/2004 | Jones | 715/808 |
| 6,816,880 B1 | 11/2004 | Strandberg et al. | |
| 6,928,432 B2 * | 8/2005 | Fagan et al. | 707/711 |
| 6,928,615 B1 | 8/2005 | Haitsuka et al. | |
| 7,082,427 B1 * | 7/2006 | Seibel et al. | 707/661 |
| 2001/0007097 A1 | 7/2001 | Kim | |
| 2001/0011270 A1 * | 8/2001 | Himmelstein et al. | 707/3 |
| 2001/0018658 A1 | 8/2001 | Kim | |
| 2001/0018685 A1 * | 8/2001 | Saito et al. | 707/3 |
| 2001/0020242 A1 | 9/2001 | Gupta et al. | |
| 2001/0032122 A1 | 10/2001 | Hankla | |
| 2001/0037377 A1 * | 11/2001 | Nakano et al. | 709/219 |
| 2001/0051927 A1 * | 12/2001 | London et al. | 705/51 |
| 2002/0002552 A1 | 1/2002 | Schultz et al. | |
| 2002/0002588 A1 | 1/2002 | Sugimoto | |
| 2002/0013725 A1 | 1/2002 | Takakura et al. | |
| 2002/0019837 A1 * | 2/2002 | Balnaves | 707/512 |
| 2002/0023002 A1 | 2/2002 | Staehelin | |
| 2002/0059398 A1 | 5/2002 | Shimabukuro | |
| 2002/0065800 A1 | 5/2002 | Morlitz | |
| 2002/0065857 A1 * | 5/2002 | Michalewicz et al. | 707/532 |
| 2002/0069105 A1 | 6/2002 | Botelho et al. | |
| 2002/0075321 A1 * | 6/2002 | Sakatani | 345/814 |
| 2002/0077899 A1 | 6/2002 | Kaneko et al. | |
| 2002/0078197 A1 * | 6/2002 | Suda et al. | 709/224 |
| 2002/0147775 A1 * | 10/2002 | Suda et al. | 709/203 |
| 2002/0147805 A1 | 10/2002 | Leshem et al. | |
| 2002/0163663 A1 * | 11/2002 | Suda et al. | 358/1.15 |
| 2003/0004941 A1 | 1/2003 | Yamada et al. | |
| 2003/0084096 A1 | 5/2003 | Starbuck et al. | |
| 2003/0131106 A1 * | 7/2003 | Kasriel | 709/225 |
| 2003/0132958 A1 * | 7/2003 | Himmel et al. | 345/745 |
| 2003/0160994 A1 | 8/2003 | Bates | |
| 2003/0177202 A1 | 9/2003 | Suda et al. | |
| 2003/0195896 A1 | 10/2003 | Suda et al. | |
| 2004/0059630 A1 | 3/2004 | Toyooka | |
| 2005/0033715 A1 | 2/2005 | Suda et al. | |
| 2006/0036609 A1 * | 2/2006 | Suda et al. | 707/10 |

FOREIGN PATENT DOCUMENTS

| | | | | |
|---|---|---|---|---|
| EP | 0 843 269 A2 | | 5/1998 | |
| EP | 0 848 337 A1 | | 6/1998 | |
| EP | 0981097 | * | 8/1998 | 17/30 |
| EP | 1 067 470 A2 | | 1/2001 | |
| EP | 1158423 A2 | * | 11/2001 | |
| EP | 0 843 269 B1 | | 7/2004 | |
| EP | 1626354 A2 | | 2/2006 | |
| GB | 2324896 | * | 11/1998 | 17/30 |
| JP | 9-218876 | | 8/1997 | |
| JP | 10-283366 | | 10/1998 | |
| JP | 11-120191 | | 4/1999 | |
| JP | 11-203188 | | 7/1999 | |
| JP | 11-203226 | | 7/1999 | |
| JP | 2000-259671 | | 9/2000 | |
| JP | 1999-203188 | | 2/2001 | |
| JP | 1999-203226 | | 2/2001 | |
| JP | 2001-134646 | | 5/2001 | |
| JP | 2002-183210 | | 6/2002 | |
| JP | 2002-304399 | | 10/2002 | |
| WO | WO 97/45800 | * | 12/1997 | 17/30 |
| WO | WO 99 12108 | | 3/1999 | |
| WO | WO 99/12108 | | 3/1999 | |
| WO | WO 01/02984 A2 | | 1/2001 | |
| WO | WO 01/42972 | * | 6/2001 | |
| WO | WO 01/42972 A2 | | 6/2001 | |
| WO | WO 01/93071 A2 | | 12/2001 | |
| WO | WO 02/42940 A1 | * | 5/2002 | |

OTHER PUBLICATIONS

Seung-Jin Lim et al. "extracting structures of HTML documents", twelfth internatinal conference on information networking, 1998, pp. 420-426.*

Challenger,J et al. "A scalable and highly available system for serving dynamic data at frequently accessed web sites", IEEE/ACM conference on supercomputing, 1998, 25 pages.*

Kawano,H, "Mondou: web search engine with textual data mining", proceesing PACRIM networking the pacific rim, IEEE pacific rim conference on communications, computers and signal processing, 1997, vol. 1, pp. 402-405.*

Sakairi,T, "A site map for visualizing both a web site's structure and keywords", IEEE SMC 1999 International conference on systems, man, and cybermetics, 1999, vol. 4, pp. 200-205.*

Krishna Bharat, "search pad: explicit capture of search context to support web search", computer networks, 33, 2000, pp. 493-501.*

Shavlik, Jude and Jeremy Goecks. Estimating users' intersst in Web pages by unobtrusively monitoring users' normal behavior. Proceedings of AAAI 2000 Spring Symposium Series Mar. 20-22, 2000. Papers from the 2000 AAAI symposium, 2000, p. 113-115.*

Katz, B et al. "Integrating Web Resources and Lexicons into a Natural Language Query System" IEEE International Conference on Multimedia Computing and Systems, 1999, Florence, Italy, Jun. 7, 1999, pp. 255-261.

Cockburn, A et al. "Issues of Page Representation and Organization in Web Browser's Revisitation Tools" Proceedings of the OZCHI, Australian Conference on Human Computer Interaction, Nov. 28, 1999, 7 pages only.

Anonymous, "Java Applet Language Translator" IBM Technical Disclosure Bulletin, IBM Corp. New York, US, vol. 42, No. 420, Apr. 1, 1999, whole document, one page only.

"IE5 Web Accessories" Internet, 'Online! Apr. 25, 2000 Retrieved from the Internet: URL: http://www.netmag.co.uk/ie5/access.htm (retrieved May 27, 2003) whole document, one page only.

PC Magazine, Web Information Managers, Mar. 3, 2000, available at http://zdnet.com/products/stories/reviews/0,4161,2445667,00.html, 2 pages only.

Edward Mendelson, Webforia Organizer & Reporter, Mar. 3, 2000, available at http://www.zdnet.com/products/stories/reviews/0,4161,2444585,00.html, 2 pages only.

Nelson King, iHarvest One, Mar. 3, 2000, available at http://www.zdnet.com/products/stories/reviews/0,4161,2444582,00.html, 2 pages only.

Nelson King, Netonizer 1.1, Mar. 3, 2000, available at http://www.zdnet.com/products/stories/reviews/0,4161,2444583,00.html, 2 pages only.

Nelson King, WebSpace 1.1a, Mar. 3, 2000, available at http://www.zdnet.com/products/stories/reviews/0,4161,2444586,00.html, 2 pages only.

Nelson King, WebWhacker 2000, Mar. 3, 2000, available at http://www.zdnet.com/products/stories/reviews/0,4161,2444587,00.html, 2 pages only.

Preston Gralla, Organize Your Net Research—For Free, Mar. 13,. 2000, available at http://www.zdnet.com/anchordesk/story/story_4513.htm, 2 pages only.

Edward Mendelson, 30 Ways to Browse Better, Oct. 17, 2000, available at http://www.pcmag.com/article/0,2997,s%3D1590%26a%3D5921,00.asp, 4 pages only.

GERASoft PageSaver, available at http://www.gerasoft.com/psmain.html, downloaded on Apr. 2,2002, 2 pages only.

SpotOn Professional—Product Features List, available at http://www.spoton.com/solutions/features.html, downloaded on Apr. 2, 2002, 3 pages.

SurfSaver Software—Download it today!—It's Free, available at http://www.surfsaver.com, downloaded on Apr. 2, 2002, 2 pages.

Katz B. et al. "Integrating Web Resources and Lexicons into a Natural Language Query System" IEEE International Conference on Multimedia Computing and Systems, Florence Italy, Jun. 7-11, 1999.

Cockburn A. et al. "Issues of Page Representation and Organisation in Web Browser's Revisitation Tools" Australian Conference on Human Computer Interaction, Proceedings of the OZCHI, Nov. 28, 1999.

Chen et al., "WebCiao: A website Visualization and Tracking System", Proceedings of WebNet97, 1997.

"Make Web pages Available for Offline Viewing", http://www.microsoft.com/windowsxp/using/mobility/learnmore/offlineviewing.mspx, Accessed: Aug. 25, 2005, Published: Aug. 24, 2001, 2 pages.

"Leech", Dec. 6, 2001 Archive Page from Archive.com of http://www.aeria.com/products/leech Accessed: Aug. 25, 2005, 2 pages.

"Offline Navigator 1.01", http://www.afreego.com/Categories/Web_Tools/Offline_Web_Readers/006390.php Accessed: Aug. 25, 2005, 1 page.

http://www.uspto.gov Accessed: Aug. 25, 2005, 3 pages.

Non-Final Office Action of U.S. Appl. No. 10/116,932, dated May 3, 2006.

Paoli, "Bringing the XML Vision to the Desktop: How Office will Connect Data and Business Processes Across the Organization", PressPass—Information for Journalists, Published: Nov. 12, 2002, Accessed: Oct. 2, 2006, found at http://www.microsoft.com/presspass/features/2002/nov02/11-12XMLOffice.mspx.

European Communication for Application No. 04733973.4-1527 PCT/JP2004007156 dated Mar. 8, 2007 with Supplementary European Search Report, Mar. 2, 2007, EPO Form 1503 03.82 (P04C04).

Bouguettaya et al., "World Wide Database—Integrating the Web, CORBA and Databases," Queensland University of Technology, 4 pages w/abstract.

European Search Report dated Nov. 13, 2006.

International Business Machines Corporation, "Saving search results in an HTML-based information center," Research Disclosure, Mason Publications, Hampshire, GB, vol. 449, No. 148, Sep. 2001.

Nagino, et al., "Future View: Web Navigation based on Learning User's Browsing Patterns," Proceedings of the IEEE/WIC International Conference on Web Intelligence, 2003, IEEE, pp. 541-544.

Chen, et al., "Internet Browsing and Searching: User Evaluations of Category Map and Concept Space Techniques," Journal of the American Society for Information Science, May 15, 1998, vol. 49, No. 7, pp. 582-603.

Chen et al., "MetaSpider: Meta-Searching and Categorization on the Web," Journal of the American Society for Information Science and Technology, 2001, vol. 52, No. 13, pp. 1134-1147.

Office Action in Japanese Patent Application No. 2000-314601 dated Jul. 7, 2009.

Office Action in Japanese Patent Application No. 2000-248999 dated Jul. 23, 2009.

Hiroyuki Sekiguchi, Comprehension of a basic operation and a setting, for beginner, OE&IE5.0 for Mac perfect guide, Japan, ASCII Corporation, May 14, 2000, pp. 64-70.

Internet with Ease—comprehension of good usage—for Web, for mail Easy PC, Japan, Deagostini Japan Corporation, May 9, 2000, vol. 5 No. 111, pp. 13-24.

Mayu Nishi, A Tool for collecting Web pages in correspondence with a Yahoo notice board, Internet Ninja 5, ASCII, Japan, ASCII Corporation, May 1, 2002, vol. 24, No. 5, p. 312.

* cited by examiner (a)
KPTConcept

```
KPTConcept
{
  ObjectID          KPTObjID
  ModifyStatus      KPTStatus
  ...
}
```

(b)
KPTPerson

```
KPTPerson : KPTConcept
{
  RememberAs    String
  Name          String
  Phone         String
  Email         String
  Fax           String
  URL           String
  ...
}
```

(c)
KPTDocument

```
KPTDocument : KPTConcept
{
  RememberAs    String
  Name          String
  PhysicalURL   String
  LogicalURL    String
  Orgn          String
  Domain        String
  Keywords      String
  Title         String
  FolderName    String
  LinkType      KPTLinkType
  RetrievedDoc  bool
  ...
}
```

FIG. 19

(a) KPTAction

```
KPTAction : KPTConcept
{
    Type            KPTActionType
    Actor           KPTPerson
    Object          KPTConcept    //Document or Action
    From            KPTConcept
    To              KPTConcept
    How             KPTInstrumentType
    WhenToDo        KPTTime
    WhenDone        KPTTime
    ConnectedTo     KPTConnenctionList
    SessionID       KPTObjID
    ActionStatus    KPTActSysStatus
    UserStatus      KPTUsrStatus
    ActImportance   KPTImportance
    ...
}
```

(b) KPTContent

```
KPTContent : KPTConcept
{
    URL             String
    FileName        String
    KPTDocID        KPTObjID
    ContentType     KPTMimeType
    ContentLength   long
    ...
}
```

KPTDoc. Knowledge Base

| ObjectID | KeepAs | LogicalURL | Orgn | Domain | Keywords | Folder | ... |
|---|---|---|---|---|---|---|---|
| D630a816 | Saora | www.saora.co.jp | saora keepoint | JP.CO | KPT, Yokohama | D630a816 | ... |
| D630a932 | KPT | keepoint.com | keepoint | COM | KPT | D630a932 | ... |
| D630b232 | | keepoint.com/faq | saora | COM | | | ... |
| D233x123 | Saora | www.saora.com | paltek,sales | COM | | D233x123 | ... |
| D133f822 | | sales.paltek.co.jp | hns, sales | JP.COM | ALTERA, MAX | D133f822 | ... |
| D2340x13 | HNS | sales.hns.ne.jp | ... | JP.NE | KIOSK, India | D2340x13 | ... |
| ... | ... | ... | | ... | ... | ... | ... |

(b)

KPTAction. Knowledge Base

| ObjectID | Type | KPTDocID | Done Time | SessionID | Status | ValidTime | ... |
|---|---|---|---|---|---|---|---|
| A238x231 | StartSE | | 00/03/10 13:38:02 | | SYSDONE | | ... |
| A238x123 | Save | D630a816 | 00/03/10 13:38:22 | A238x231 | USRDONE | 00/03/10 ~ 01/03/10 | ... |
| A238x232 | QuickS | D630a932 | 00/03/10 14:18:42 | A238x231 | USRDONE | 00/03/10 ~ | ... |
| A980o232 | EndSE | | 00/03/10 14:20:15 | | SYSDONE | | ... |
| A909u898 | StartSE | | 00/04/19 12:12:00 | | SYSDONE | | ... |
| A323f229 | Hold | D630b232 | 00/04/19 12:22:13 | A909u898 | USRDONE | 00/04/25 ~ 00/04/30 | ... |
| A902o230 | EndSE | | 00/04/19 14:12:23 | | SYSDONE | | ... |
| A721n292 | StartSE | | 00/04/19 12:12:00 | | SYSDONE | | ... |
| A723b232 | Send | D630a816 | 00/04/19 12:12:23 | A721n292 | SYSTODO | | ... |
| ... | ... | ... | ... | ... | ... | ... | |

KPTPerson. Knowledge Base

| ObjectID | KeepAs | Name | Email | Phone | Fax | Extraced From | ... |
|---|---|---|---|---|---|---|---|
| P324o902 | Saora | Saora Inc. | support@saora.co.jp | 0459139820 | 0459139821 | www.saora.co.jp | ... |
| P421y232 | Kato | Nihon Kato | kato@saora.com | | | | ... |
| P234x234 | | HNS Inc. | siva@hns.com | | | hnsonline.com | ... |
| ... | ... | ... | ... | ... | ... | ... | ... |
| | | | | | | | ... |
| | | | | | | | ... |
| | | | | | | | ... |

(b)

KPTContent. Knowledge Base

| ObjectID | URL | FILENAME | KPTDocID | Content Type | ContLen | ... |
|---|---|---|---|---|---|---|
| F232j233 | www.saora.co.jp/logo.gif | logo.gif | D630a816 | IMAGE/GIF | 212 | ... |
| F802u233 | www.saora.co.jp/jap.gif | jap.gif | D630a816 | IMAGE/GIF | 128 | ... |
| F232q897 | keepoint.com/img/logo.gif | logo1.gif | D630a932 | IMAGE/GIF | 232 | ... |
| F329x800 | keepoint.com/music/a.mid | a.mid | D630a932 | MIME/MIDI | 987 | ... |
| ... | ... | ... | ... | ... | ... | ... |
| | | | | | | ... |
| | | | | | | ... |

FIG. 22

Domain. Knowledge Base

```
# Generic Domains
.com,              .COM (Commercial Domains)
.edu,              .EDU (Educational Domains)
.gov,              US Government
.mil,              US Dept of Defense
.net,              .NET (Network Domains)
.org,              .ORG (Organization Domains)
# Country Code Domains
.ac,               Ascension Island
.ad,               Andorra
.ae,               United Arab Emirates
.af,               Afghanistan
.ag,               Antigua and Barbuda
.ai,               Anguilla
.al,               Albania
.aq,               Antarctica
.jp                Japan
.ad.jp,            . . Administrative
.ac.jp,            . . Universities
.co.jp,            . . Commercial Organizations
.go.jp,            . . Government Organizations
.or.jp,            . . Non Commercial Organizations
.ne.jp,            . . ISP
.ru                Russia
.ac.ru,            . . Academic Community
.com.ru,           . . Commercial Organizations
.edu.ru,           . . Universities
.int.ru,           . . For public registration
.mil.ru,           . . Military Establishment
.net.ru,           . . Internet Service Providers
.org.ru,           . . Non Commercial Organizations
.pp.ru,            . . Private Person's domain
...
```

FIG. 23

(a)
```
KPTDocument11 =
{
        ObjectID = "D630a816"
        RememberAs = ""
        Name = ""
        LogicalURL = "www.saora.co.jp"
        PhysicalURL = ""
        Orgn = ""
        Domain = ""
        Keywords = ""
        Title = ""
        FolderName = ""
        LinkType = '
        ...
}
```

(b)
```
KPTAction11
{
        ObjectID = "A238x123"
        Type = ""
        Actor = "John Smith"
        Object = "D630a816"
        From = ""
        To = ""
        How = ""
        WhenToDo = ""
        WhenDone = ""
        ConnectedTo = ""
        SessionID = "A238x231"
        ActionStatus = "PERFORMING"
        ...
}
```

FIG. 26

```
<html><head>
<title>How to reach Saora Inc.?</title>
<meta name="KEYWORD" content="KPT, Yokohama">
<meta http-equiv="Content-Type" content="text/html; charset=x-sjis">
</head>
<body bgcolor="#FFFFCC">
<table border="0" cellpadding="0" cellspacing="0" align="center" width="906">
 <tr>
   <td width="114" valign="top" align="center" height="24" rowspan="6">.
   <img src="www.saora.co.jp/logo.gif" width="50" height="200" ></td></tr>
 <tr>
   <td width="828" valign="top" colspan="4" height="2">
   <img src="jap.gif" width="535" height="391" </td>
 </tr>
<tr>
   <td width="44" valign="top" height="2"><font color="#400040">
   <strong><big>Train</big></strong></font></td>
   <td width="573" valign="top" height="2"><ul>
     <li><font color="#0000FF">Tokyu Den-en Toshi Line ICHIGAO Station</font></li>
     <li><font color="#0000FF">Take Bus Nos. 305, 306 Izumita Mukai (1 Minute)
   OR 20 Minutes Walk from the Station</font>. . . </li></ul></td>
   <td width="200" valign="top" height="2"></td>
   <td width="11" valign="top" height="2"></td></tr>
 <tr><td width="44" valign="top" height="2"><font color="#400040"><ul>
     <font color="#0000FF"><p>045-913-9820</font> </p></ul></td>
   <td width="200" valign="top" height="2"></td>
   <td width="11" valign="top" height="2"></td></tr>
 <tr>
   <td width="44" valign="top" height="2"><font color="#400040"></font></td>
   <td width="573" valign="top" height="2"><ul>
     <font color="#0000FF"><p>045-913-9821</font> </p> </ul></td>
   <td width="200" valign="top" height="2"></td>
   <td width="11" valign="top" height="2"></td></tr>
 ...
</table>
```

FIG. 27

(a)
```
KPTContent11
{
        ObjectID = "F232j233"
        URL   = "www.saora.co.jp/logo.gif"
        FileName= "logo.gif"
        KPTDocID = "D630a816"
        ContentType = 'IMAGE/GIF'
        ContLen = 212
        ...
}
```

(b)
```
KPTContent12
{
        ObjectID = "F802u233"
        URL   = "www.saora.co.jp/jap.gif"
        FileName= "jap.gif"
        KPTDocID = "D630a816"
        ContentType = 'IMAGE/GIF'
        ContLen = 128
        ...
}
```

FIG. 28

```
<html><head>
<title>How to reach Saora Inc.?</title>
<meta name="KEYWORD" content="KPT, Yokohama">
<meta http-equiv="Content-Type" content="text/html; charset=x-sjis">
</head>
<body bgcolor="#FFFFCC">
<table border="0" cellpadding="0" cellspacing="0" align="center" width="906">
  <tr>
    <td width="114" valign="top" align="center" height="24" rowspan="6">.
    <img src="KPTSYSKB/logo.gif" width="50" height="200" ></td></tr>
  <tr>
    <td width="828" valign="top" colspan="4" height="2">
    <img src=" KPTSYSKB /jap.gif" width="535" height="391" </td>
  </tr>
<tr>
    <td width="44" valign="top" height="2"><font color="#400040">
    <strong><big>Train</big></strong></font></td>
    <td width="573" valign="top" height="2"><ul>
      <li><font color="#0000FF">Tokyu Den-en Toshi Line ICHIGAO Station</font></li>
      <li><font color="#0000FF">Take Bus Nos. 305, 306 Izumita Mukai (1 Minute)
      OR 20 Minutes Walk from the Station</font>. . . </li></ul></td>
    <td width="200" valign="top" height="2"></td>
    <td width="11" valign="top" height="2"></td></tr>
<tr><td width="44" valign="top" height="2"><font color="#400040"><ul>
      <font color="#0000FF"><p>045-913-9820</font> </p></ul></td>
    <td width="200" valign="top" height="2"></td>
    <td width="11" valign="top" height="2"></td></tr>
  <tr>
    <td width="44" valign="top" height="2"><font color="#400040"></font></td>
    <td width="573" valign="top" height="2"><ul>
      <font color="#0000FF"><p>045-913-9821</font> </p> </ul></td>
    <td width="200" valign="top" height="2"></td>
    <td width="11" valign="top" height="2"></td></tr>
...
</table>
```

FIG. 29

(a)
```
KPTDocument11 =
{
        ObjectID = "D630a816"
        RememberAs = "Saora"
        Name = ""
        LogicalURL = "www.saora.co.jp"
        PhysicalURL = ""
        Orgn = "saora"
        Domain = "JP.CO"
        Keywords = "KPT, Yokohama"
        Title = "How to reach Saora Inc.?"
        FolderName = "D630a816"
        LinkType = 'Page Contents'
           ...
}
```

(b)
```
KPTAction11
{
        ObjectID = "A238x123"
        Type  = "Save"
        Actor = "John Smith"
        Object  = "D630a816"
        From = ""
        To = ""
        How = ""
        WhenToDo = "00/03/10 ~ 01/03/10"
        WhenDone = "00/03/10 13:38:22"
        ConnectedTo = ""
        SessionID = "A238x231"
        ActionStatus = "USRDONE"
        ModifyStatus =saveAsNewAction
           ...
}
```

FIG. 30

```html
<html><head>
<title>How to reach Saora Inc.?</title>
<meta name="KEYWORD" content="KPT, Yokohama">
<meta http-equiv="Content-Type" content="text/html; charset=x-sjis">
</head>
<body bgcolor="#FFFFCC">
<table border="0" cellpadding="0" cellspacing="0" align="center" width="906">
 <tr>
   <td width="114" valign="top" align="center" height="24" rowspan="6">.
   <img src="KPTSYSKB/logo.gif" width="50" height="200" ></td></tr>
 <tr>
   <td width="828" valign="top" colspan="4" height="2">
   <img src=" KPTSYSKB /jap.gif" width="535" height="391" </td>
 </tr>
<tr>
 <td width="44" valign="top" height="2"><font color="#400040">
   <strong><big>Train</big></strong></font></td>
   <td width="573" valign="top" height="2"><ul>
     <li><font color="#0000FF">Tokyu Den-en Toshi Line ICHIGAO Station
     <SPAN class="KPT" style="COLOR: #ff0000" id=ID_0027202
     [My Comments– Express Train does not Stop. ] </SPAN>
     </font></li> <li><font color="#0000FF">Take Bus Nos. 305, 306 Izumita Mukai
     (1 Minute)  OR 20 Minutes Walk from the Station</font>. . .
     </li></ul></td></font>. . . </li></ul></td>
    <td width="200" valign="top" height="2"></td>
    <td width="11" valign="top" height="2"></td></tr>
  <tr><td width="44" valign="top" height="2"><font color="#400040"><ul>
     <font color="#0000FF"><p>045-913-9820</font> </p></ul></td>
    <td width="200" valign="top" height="2"></td>
    <td width="11" valign="top" height="2"></td></tr>
  <tr>
    <td width="44" valign="top" height="2"><font color="#400040"></font></td>
    <td width="573" valign="top" height="2"><ul>
      <font color="#0000FF"><p>045-913-9821</font> </p> </ul></td>
    <td width="200" valign="top" height="2"></td>
    <td width="11" valign="top" height="2"></td></tr>
  ...
</table>
```

FIG. 33

(a)
```
KPTPerson31 =
{
        ObjectID = "P324o902"
        RememberAs = "Saora"
        Name = "Saora Inc."
        Email = "support@saora.co.jp"
        Phone = "045-913-9820"
        Fax = "045-913-9821"
        ExtractedFrom = "www.saora.co.jp"

...
}
```

(b)
```
KPTAction31
{
        ObjectID = "A324i213"
        Type  = "ExtractData"
        Actor = "John Smith"
        Object  = "P324o902"
        From = ""
        To = ""
        How = ""
        WhenToDo = ""
        WhenDone = "00/04/19 18:22:10"
        ConnectedTo = ""
        SessionID = "A902y134"
        ActionStatus = "USRDONE"
        ModifyStatus =saveAsNewAction
        ...
}
```

FIG. 36

Example Rules for Determining the Organization Indices for an URL

For the Given Input URL,

- Get the fully qualified URL and remove the parameters
    e.g., Input: http://www.saora.co.jp/contact.asp?userid=2323
        Output: http://www.saora.co.jp/contact.asp

- Remove the protocol, like http://, https://, ftp:// from the URL
    e.g., Input: http://www.saora.co.jp/contact.asp
        Output: www.saora.co.jp/contact.asp

- Remove the obvious address e.g., www, www2, etc. from the URL
    e.g., Input: www.sales.saora.co.jp/contact.asp
        Output: sales.saora.co.jp/contact.asp

- Remove the page information from the URL
    e.g., Input: sales.saora.co.jp/contact.asp
        Output: sales.saora.co.jp

- Get the domain information from the Domain Knowledgebase and
    Strip the domain information from the URL and get the organizations
    e.g., Input: sales.saora.co.jp
        Output: Organization(s) are - > sales, saora

FIG. 69

Example Rules for Determining the Domain Indices for an URL

For the Given Input URL,

- Get the fully qualified URL and remove the parameters
  e.g., Input: http://www.saora.co.jp/contact.asp?userid=2323
  Output: http://www.saora.co.jp/contact.asp

- Remove the protocol, like http://, https://, ftp:// from the URL
  e.g., Input: http://www.saora.co.jp/contact.asp
  Output: www.saora.co.jp/contact.asp

- Remove the obvious address e.g., www, www2, etc. from the URL
  e.g., Input: www.sales.saora.co.jp/contact.asp
  Output: sales.saora.co.jp/contact.asp

- Remove the page information from the URL
  e.g., Input: sales.saora.co.jp/contact.asp
  Output: sales.saora.co.jp

- Get the domain information from the Domain Knowledgebase
  e.g., Input: sales.saora.co.jp
  Output: Domain is .co.jp

FIG. 70

SYSTEM AND METHOD FOR SAVING BROWSED DATA

CLAIM FOR PRIORITY

This application claims priority from Application No. 2000-197293, filed on May 29, 2000 in JAPAN, and Application No. 2000-314601, filed no Oct. 16, 2000 in JAPAN.

FIELD

A system and method for saving acquired data, and more particularly a system and method for saving acquired data browsed in a client application, such as browsed by an Internet browser.

BACKGROUND

A conventional computer can access and display data in an Internet using a software called browser. The conventional computer also can open a file application and store data in a file.

The data on the browser can be transported to a word processing software or the like. Then a user can add an annotation to the browsed data on the word processing software or the like. The conventional computer can also send the browsed data as it is or with adding an annotation to other computer.

In the above conventional computer, however, the user must specify a folder and a file name for saving the browsed data. The user must open respective applications to save, make an annotation, and send the data. Therefore, the user has to perform complex operations to save the browsed data, make an annotation therein, and send the browsed or annotated data to other computer.

SUMMARY

According to certain embodiments of the present invention, the present invention provides a system and method to save data, which a user wants to do with a simple operation.

According to one of the embodiments, the present invention relates to a data processing system comprising data acquisition means for acquiring data; determination means for determining whether or not a user requests to save the acquired data; indexing means for assigning a predetermined index to the data requested to save, without inputting any index; and saving means for saving the requested data with the assigned index in a predetermined storage unit.

According to another embodiment, the present invention relates to a data processing method comprising a data acquisition step of acquiring data; a determination step of determining whether or not a user requests to save the acquired data; an indexing step of assigning a predetermined index to the data requested to save, without inputting any index; and a saving step of saving the requested data with the assigned index in a predetermined storage unit.

According to still another embodiment, the present invention relates to a computer-executable program for controlling a computer to perform data processing, said program comprising codes for causing the computer to perform a data acquisition step of acquiring data; a determination step of determining whether or not a user requests to save the acquired data; an indexing step of assigning a predetermined index to the data requested to save, without inputting any index; and a saving step of saving the requested data with the assigned index in a predetermined storage unit.

Other features and advantages of the present invention will be apparent from the following description taken in conjunction with the accompanying drawings, in which like reference characters designate the same or similar parts throughout the figures thereof.

BRIEF DESCRIPTION OF THE FIGURES

The accompanying drawings, which are incorporated in and constitute a part of the specification, illustrate embodiments of the invention and, together with the description, serve to explain the principles of the invention.

FIGS. 19 and 20 show examples of the knowledge structures in the knowledge base.

FIGS. 21 and 22 show examples content of the knowledge base.

FIG. 23 shows an example content of the Domain knowledge base.

FIG. 26 shows example results of the knowledge structures.

FIG. 27 shows an example HTML text obtained from the browser.

FIG. 28 shows example results of the knowledge structures.

FIG. 29 shows example modified HTML text.

FIG. 30 shows example results of the knowledge structures.

FIG. 33 shows example modified HTML text after user has performed annotations.

FIG. 36 shows example results of knowledge structures.

FIG. 69 shows example rules for determining the organization indices for a URL.

FIG. 70 shows example rules for determining the domain indices for a URL.

DETAILED DESCRIPTION

With reference to the figures, various embodiments of the method, system and apparatus for discovering, establishing and managing network connectivity across disparate networks will now be described in greater detail. It is to be understood that the tasks shown in the figures and described in this description can be sequenced in many different orders to achieve the desired result. The order or sequence of tasks illustrated in the figures is merely intended to be exemplary of the concepts defined herein.

Figure 1:
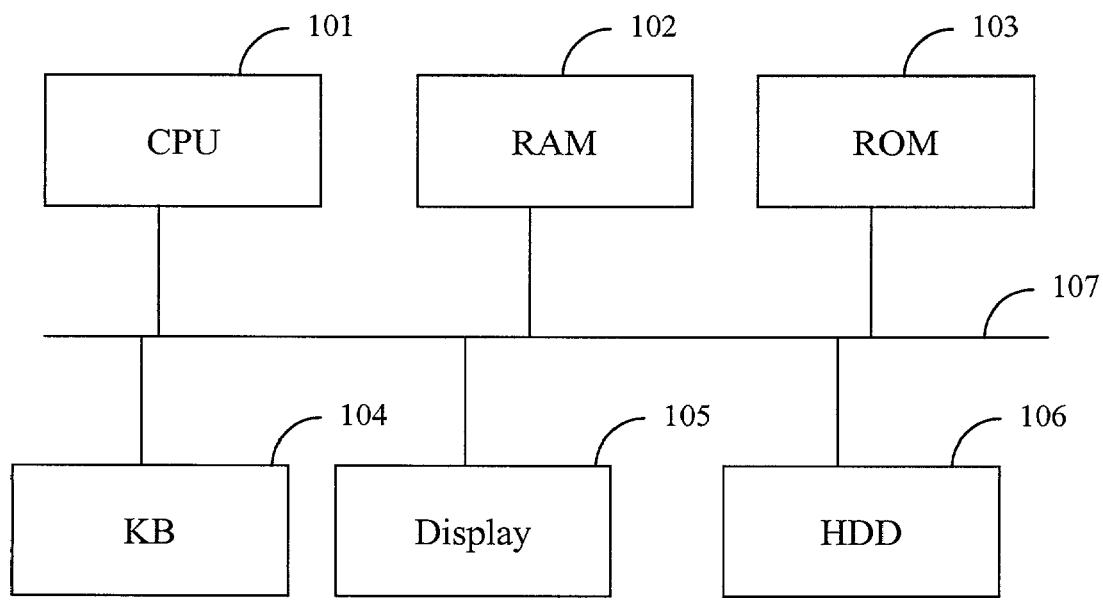
FIG. 1 is a block diagram illustrating the hardware configuration according to an embodiment of the present invention.

FIG. 1 is a block diagram illustrating the hardware configuration according to an embodiment of the present invention. In this figure, a central processing unit (CPU) 101 is operative to perform operations for various processing and make a logical decision or the like and further controls each composing element connected to a bus 107.

A RAM 102 is used to temporarily store variables and intermediate data generated during the processing. A program from an external source may be loaded into the RAM 102. A ROM 103 is used to store programs, which correspond to individual flowcharts that will be described later and which are to be executed by the CPU 101, and fixed data.

A keyboard (KB) 104 is used for inputting data and an instruction by a user. A mouse or other input devices may be used with the keyboard 104. Display 105 displays data and a hard disk drive (HHD) stores data of a database, a program, and the like.

The bus 107 is used to transfer an address signal indicating a composing element to be controlled by the CPU 101, a control signal used for controlling each composing element and data to be exchanged between the composing equipment.

Figure 2:
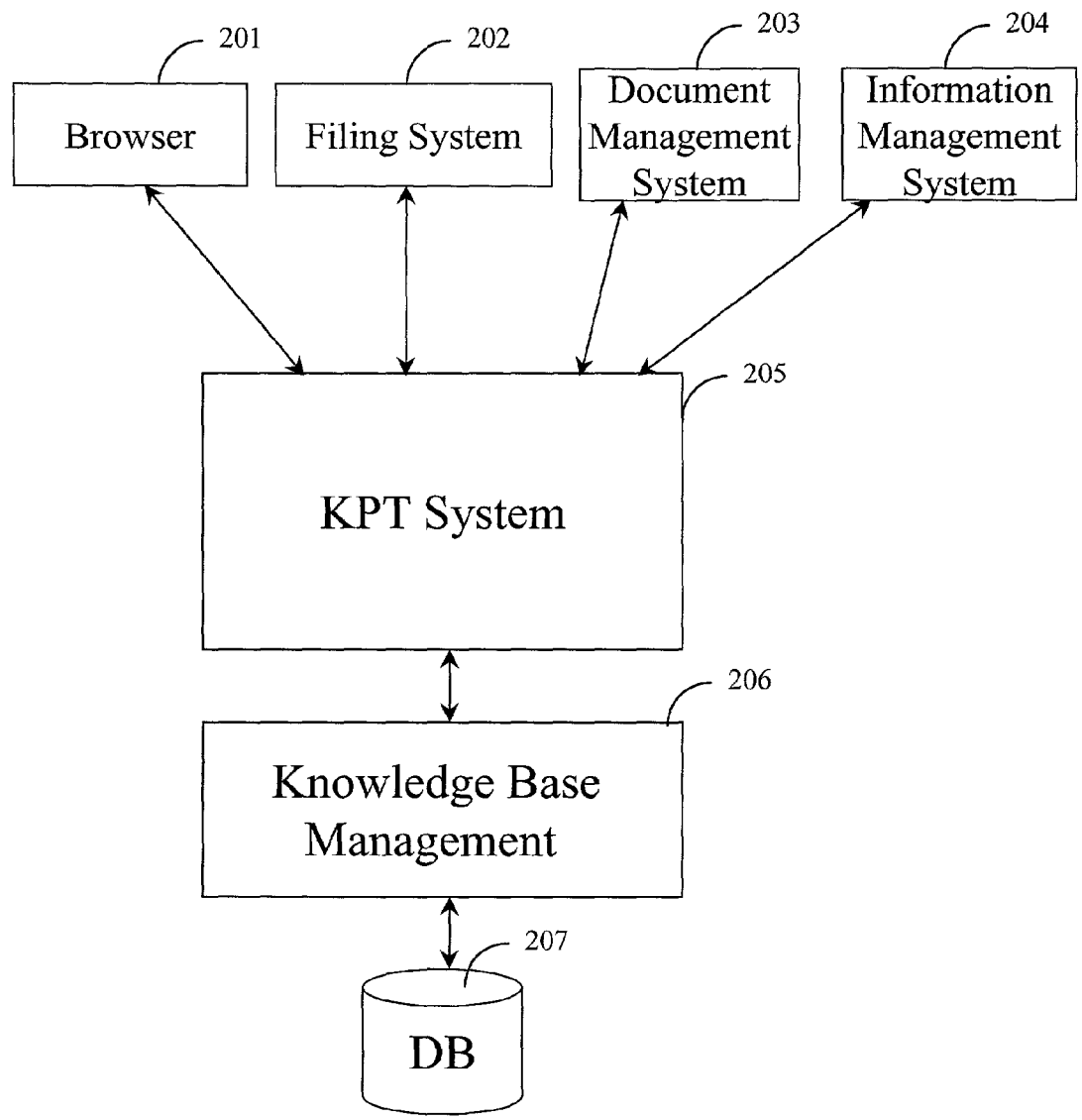
FIG. 2 shows the functional block diagram of information processing system embodying the present invention.

FIG. 2 shows the functional block diagram of information processing system embodying the present invention. Browser 201 is used for information browsing of the Web. Filing system 202 is for filing and managing files. Document Management System 203 is for managing documents. Information Management System 204 is for managing information other than documents. KPT System interacts and acts as a controlling system as explained in detail in this embodiment to Browser 201, Filing System 202, Document Management System 203 and Information Management System 204. Knowledge Base Management 206, is the management of knowledge accessed/stored from/to the Database 206.

Figure 3:
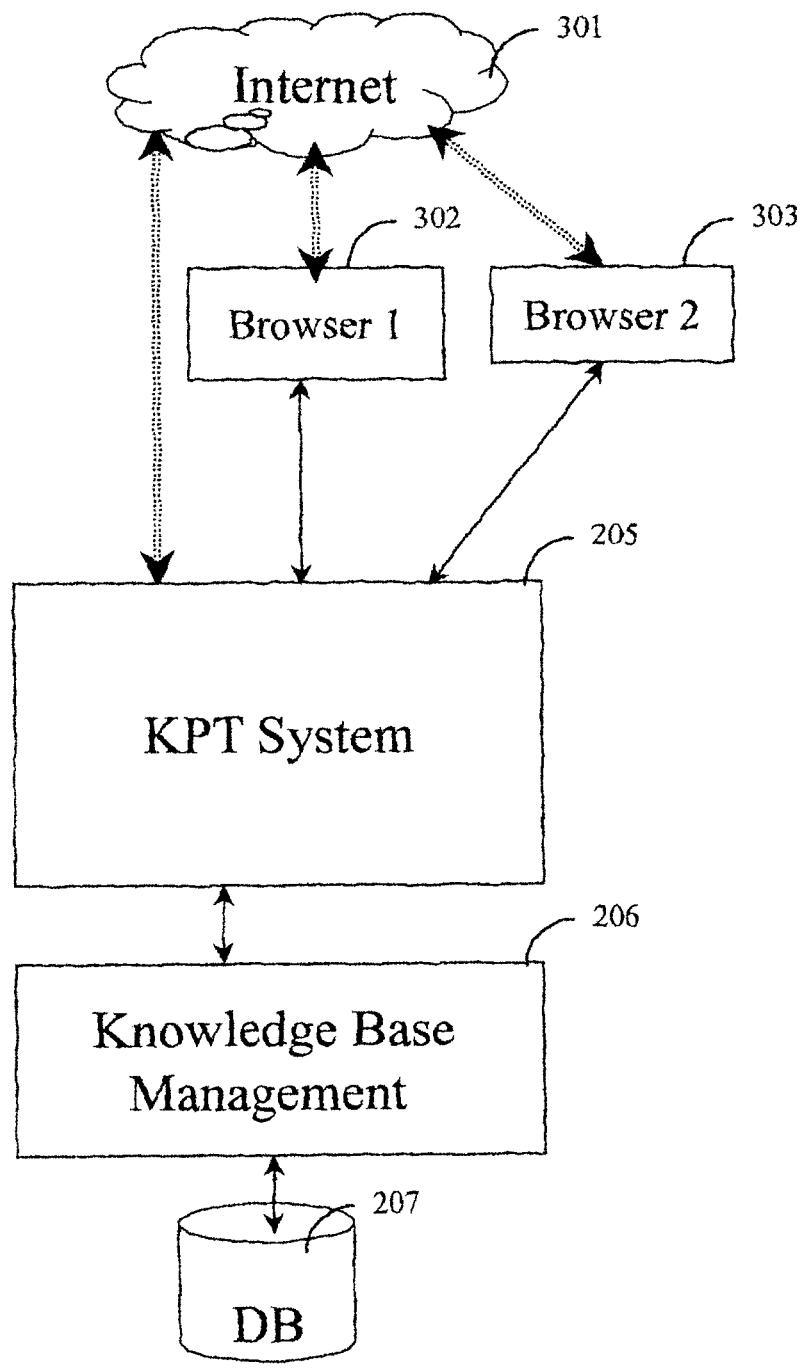
FIG. 3 shows the functional block diagram of information browsing system embodying the present invention.

FIG. 3 shows the functional block diagram of information browsing system embodying the present invention. The information on the Internet 301 is browsed using multiple browsers 302, 303 simultaneously and as explained in this embodiment, KPT System 205 handles and processes them separately.

Figure 4:
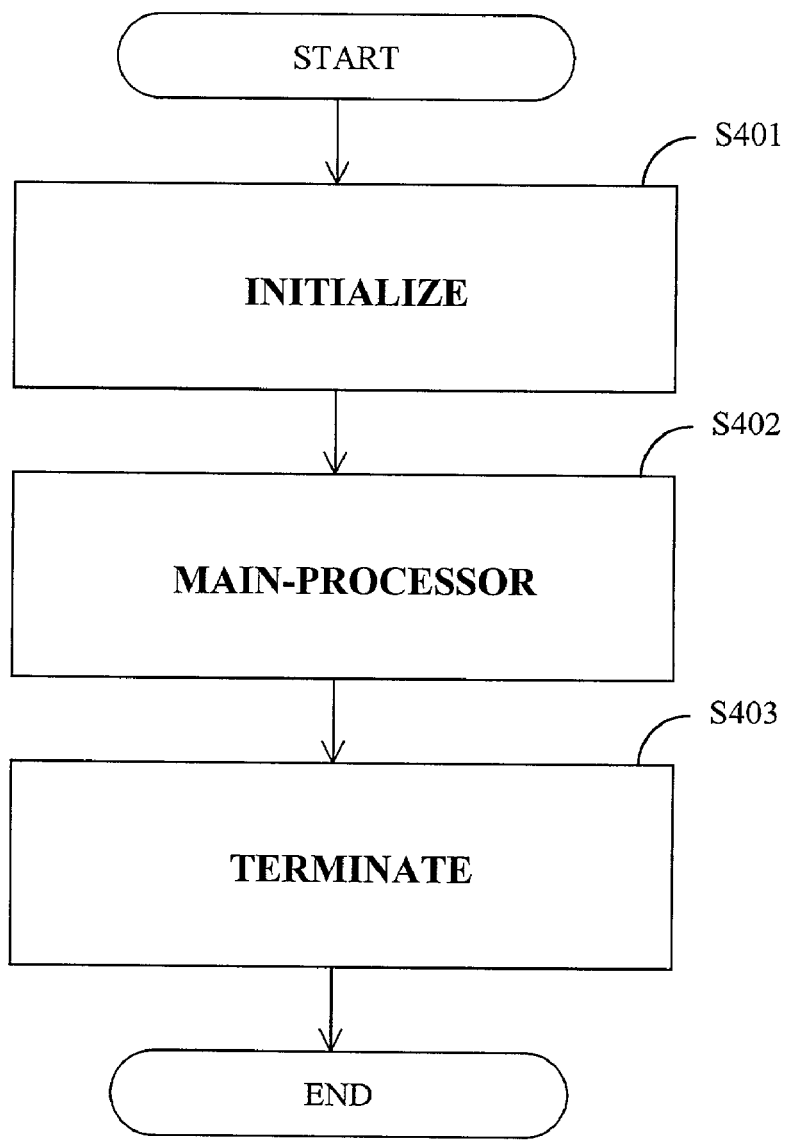
FIG. 4 is a flowchart of the main procedural steps of this embodiment.

FIG. 4 is a flowchart of the main procedural steps of this embodiment. The following description is for an example system, which connects to the Internet and allows browsing, annotating, extracting and saving of the information. In step S401, initialization processes to connect to the Internet are executed. In step S402, main function processing browsing, annotating, saving etc. of this embodiment is performed. In step S403, terminate or clean-up processing is executed.

Figure 5:
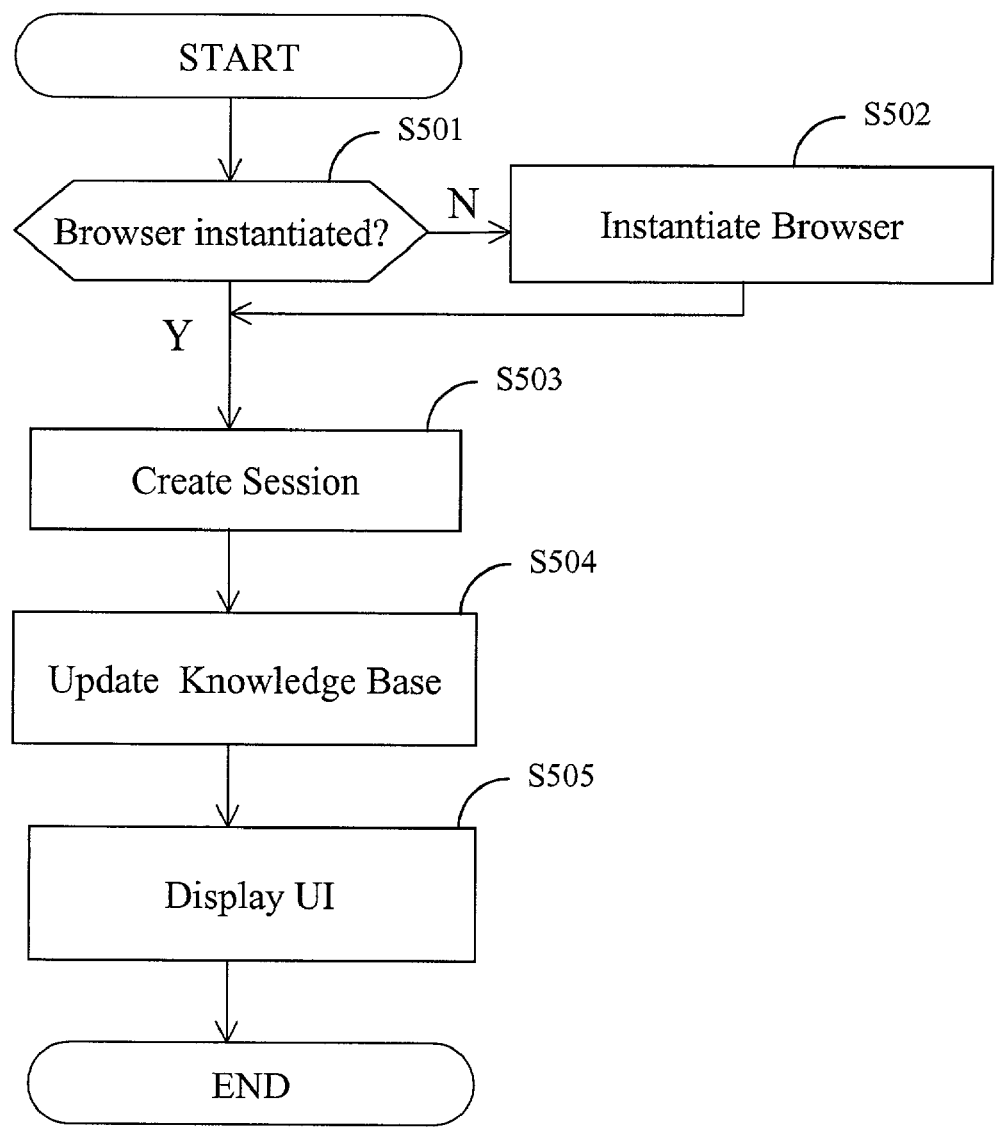
FIG. 5 is a flowchart of INITIALIZE procedure.

FIG. 5 is a flowchart of INITIALIZE procedure of step S401. In step S501 a check is made to determine if the browser needs to be instantiated or not. If browser is not instantiated, it is instantiated in step S502. In step S503, a new session is created. In step S504, the knowledge base is updated. The main UI of this embodiment is displayed in step S505 and the process ends.

Figure 6:
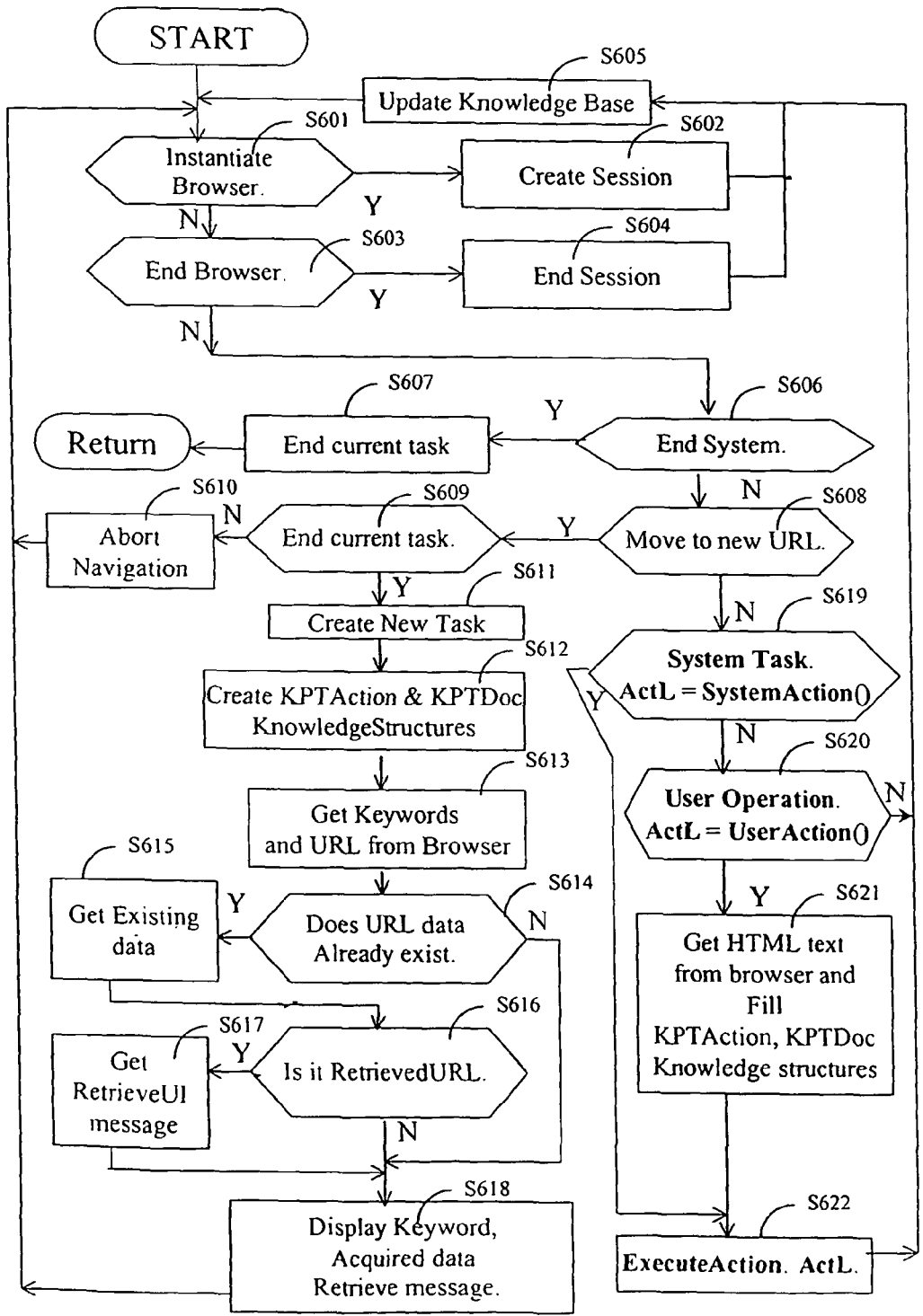
FIG. 6 is a flowchart of MAIN-PROCESSOR.

FIG. 6 is a flowchart of MAIN-PROCESSOR of step S402. In step S601, a check is made to determine if the browser was instantiated or not. If so, a new session is created in step S602 and the process proceeds to step S605, wherein the knowledge base is updated. If not, a check is made in step S603 to determine if the browser was terminated or ended. If so, the session associated with the browser is ended and proceeds to step S605. If not, a check is made in step S606 to determine if an action was performed to end the system. If so, all the current tasks are terminated in step S607 and the process returns.

If not, a check is made in step S608 to determine if the user is navigating to a new URL. If so, a check is made in step S609 to confirm with the user that the current task should be terminated. If not, the process proceeds to step S610, where the navigation is aborted and the process continues to step S601. If the current task is to be ended in step S609, step S611 is executed wherein, the previous task is terminated and then a new task is created. In step S612, the knowledge structures KPTAction and KPTDocument are created.

In step S613, the URL and the keywords are obtained from the Browser. A check is made in step S614 to determine if the URL data already exists in the knowledge base. If so, all the existing data for the current URL is procured from the knowledge base in step S615 and moves to step S616, where a check is made to determine if it is a RetrievedURL i.e., the user is trying to view the contents of an already stored page. If so, step S617 is executed to get the RetrieveUI message and control goes to S618. If URL data does not already exist in step S614, step S618 is executed to display the keywords, other acquired data from browser like the URL, page title etc. . . . and other existing data if any from the knowledge base like Keep As, validity period etc. . . . and the process proceeds to step S601.

In step S608, if the user is not moving to a new URL, a check is made in step S619 to determine if any SystemTask ActL needs to be executed. If so, step S622 ExecuteAction (ActL) is executed and the control moves to step S605 to update the knowledge base. If not, a check is made in step S620 to determine if any User Operation was performed. If not, step S605 is executed, otherwise in step S621, the HTML text is obtained from the browser and the KPTAction and KPTDocument structures created in step S612 are updated and ExecuteAction(ActL) for the UserAction is executed in step S622 and the process moves to step S605 to update the knowledge base.

Figure 24:
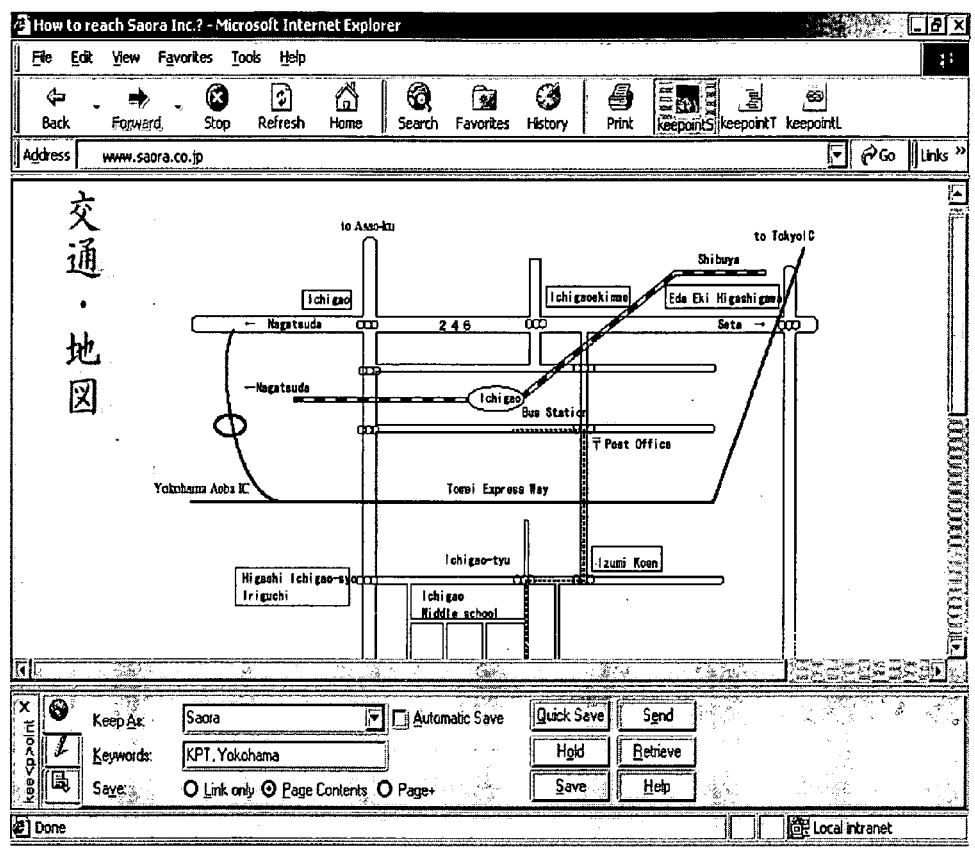
FIG. 24 shows an example User Interface of this embodiment.

For example, when the browser 201 displays an HTML page as shown in FIG. 27, the keywords embedded in the Meta Name tag (i.e., KPT, Yokohama), which are not normally displayed by the browser are extracted and displayed in the keywords field, as shown in FIG. 24.

Figure 7:
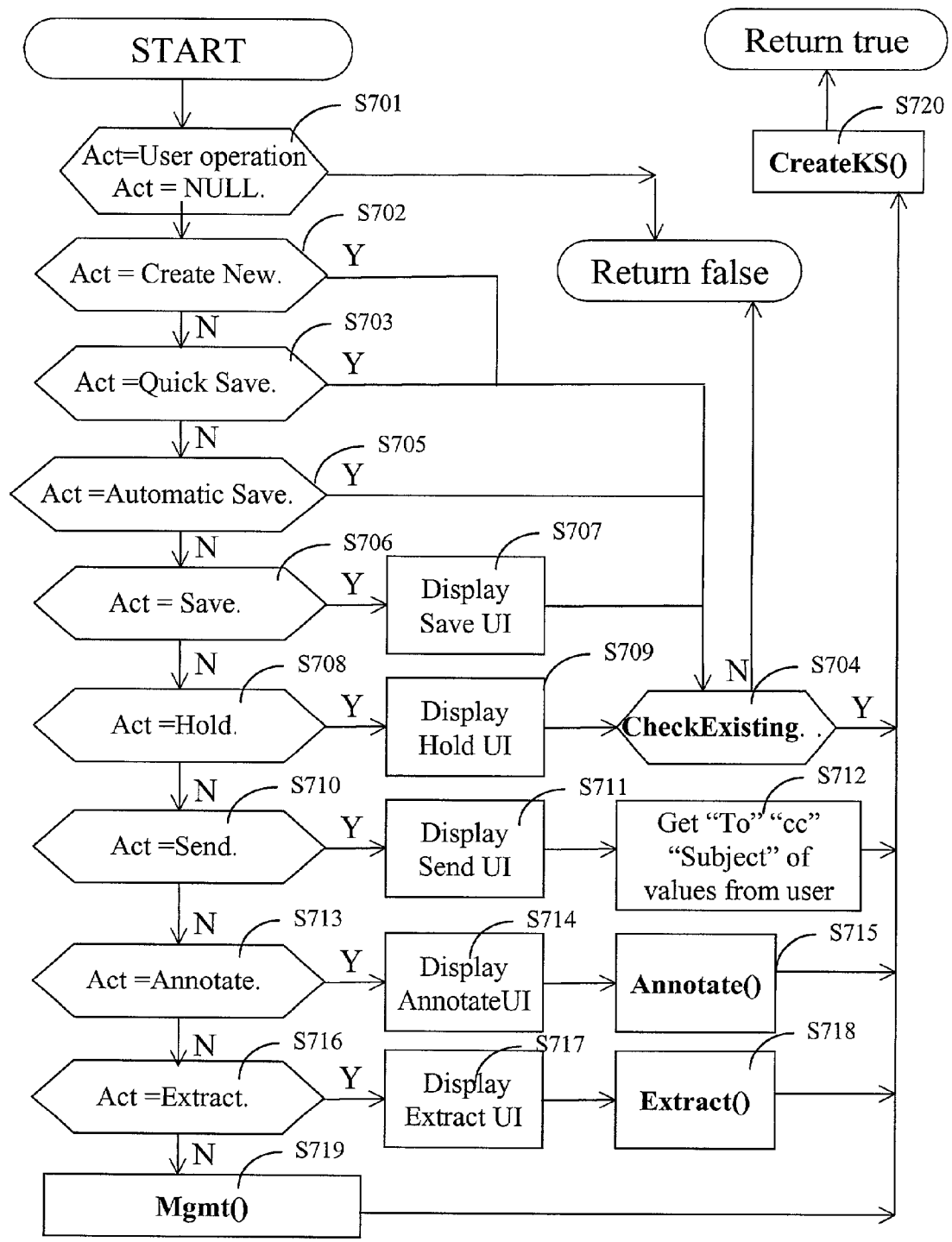
FIG. 7 is a flowchart of the procedural steps of UserAction.
Figure 25:
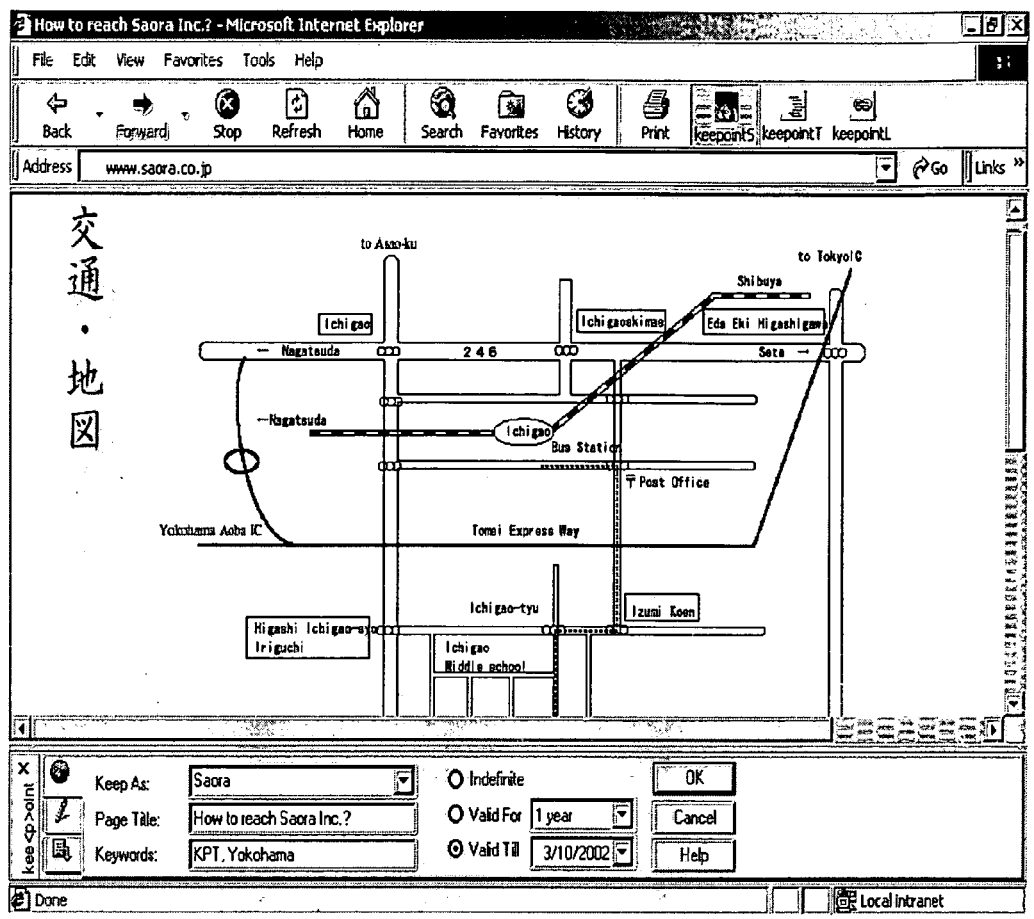
FIG. 25 shows an example User Interface of Save UI.
Figure 31:
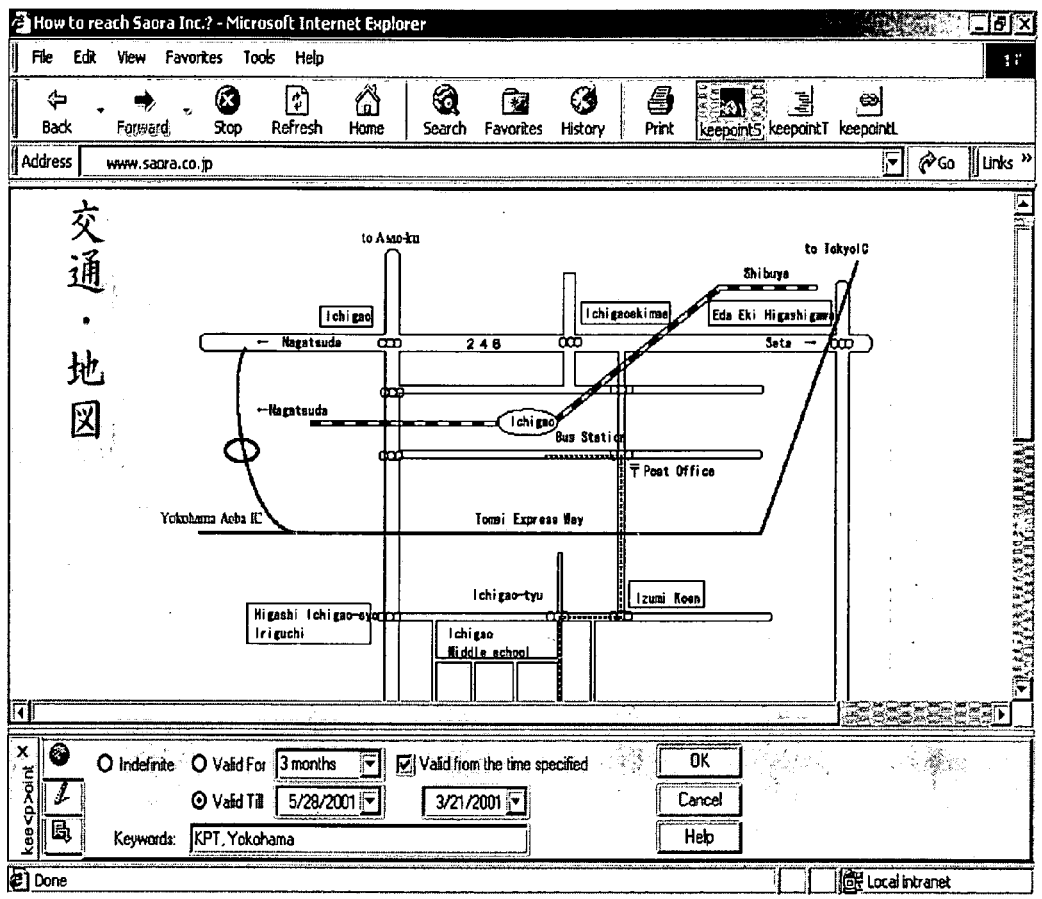
FIG. 31 shows an example User Interface of Hold UI.

FIG. 7 is a flowchart of the procedural steps of S620 UserAction. A check is first made in step S701 to set Act equal to the User operation performed by user and to determine if Act is equal to NULL. If so, the process returns false. If it is not NULL, the process proceeds to step S702, a check is made to determine whether Act is Create New. If so, the process proceeds to step S704. If not, the process proceeds to step S703, a check is made to determine whether Act is Quick Save. If so, the process proceeds to step S704. If not, a check is made in step S705 to determine whether Act is Automatic Save. If so, the process proceeds to step S704. If not, a check is made in step S706 to determine whether Act is Save. If Act is Save, Save UI, an example of which is shown in FIG. 25, is displayed in step S707 and proceeds to step S704. If not, a check is made in step S708 to determine if the Act is Hold. If so, Hold UI, an example of which is shown in FIG. 31 is displayed in step S709 and proceeds to step S704. In step S704, a check is made to determine if the information being saved or held is already exists using CheckExisting( ), which is explained in detail later and if so, proceeds to step S720, otherwise return false.

Figure 32:
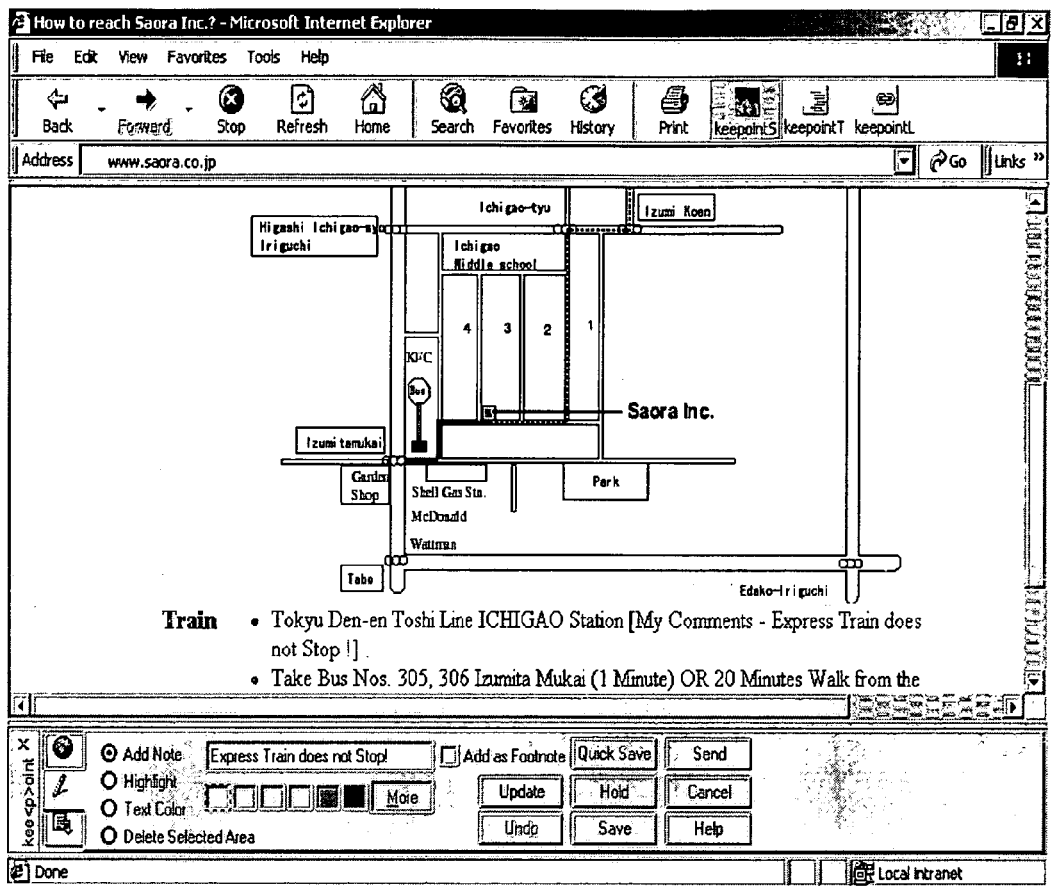
FIG. 32 shows an example User Interface of the Annotation UI.
Figure 34:
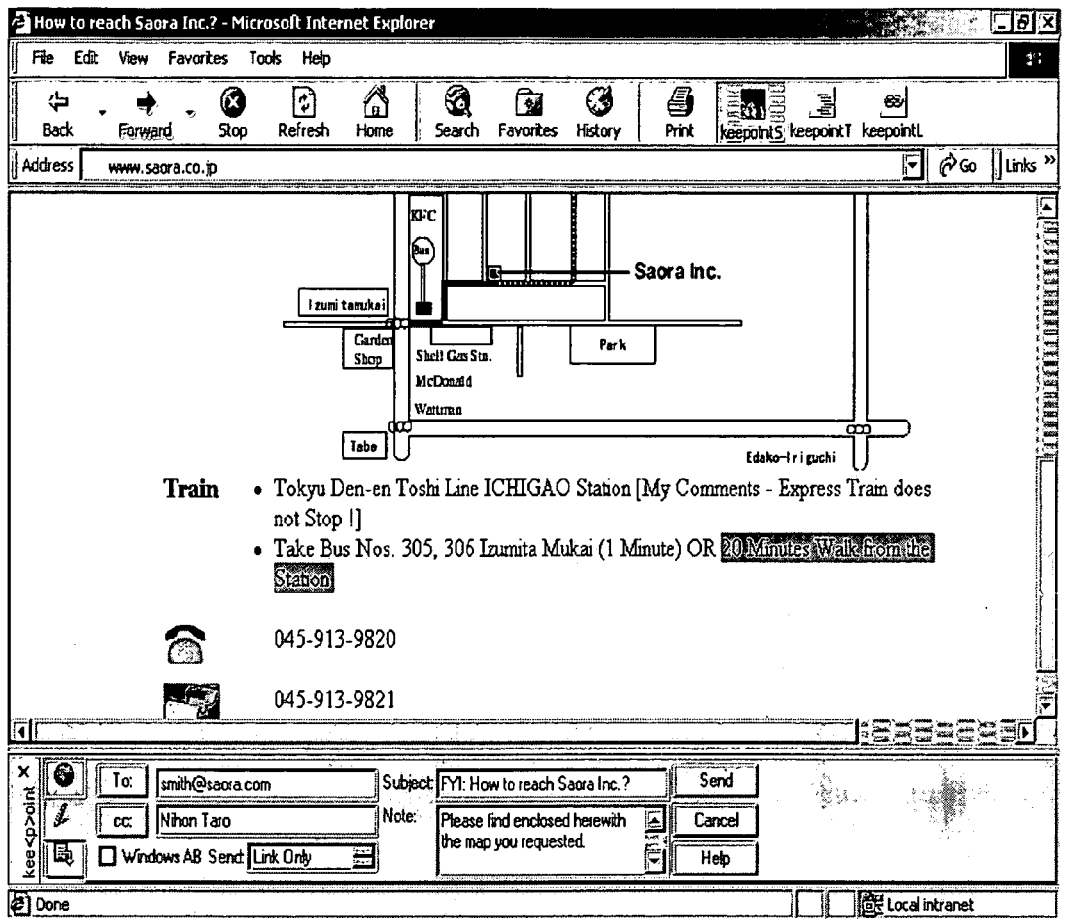
FIG. 34 shows an example User Interface of Send UI.

In step S708, if Act is not Hold, a check is made in step S710 to determine if the Act is Send. If so, Send UI, an example of which is shown in FIG. 34, is displayed in step S711 and the recipients (To, CC) information, Subject, Contents and/or the like are obtained from the user in step S712 and proceeds to step S720. If not, a check is made in step S713 to determine if Act is Annotate. If so, Annotate UI, an example of which is shown in FIG. 32 is displayed in step S714 and the actual Annotations executed using Annotate( ), which is explained in detail later, in step S715 and proceeds to step S720. If not, a check is made in step S716 to determine if Act is Extract.

Figure 35:
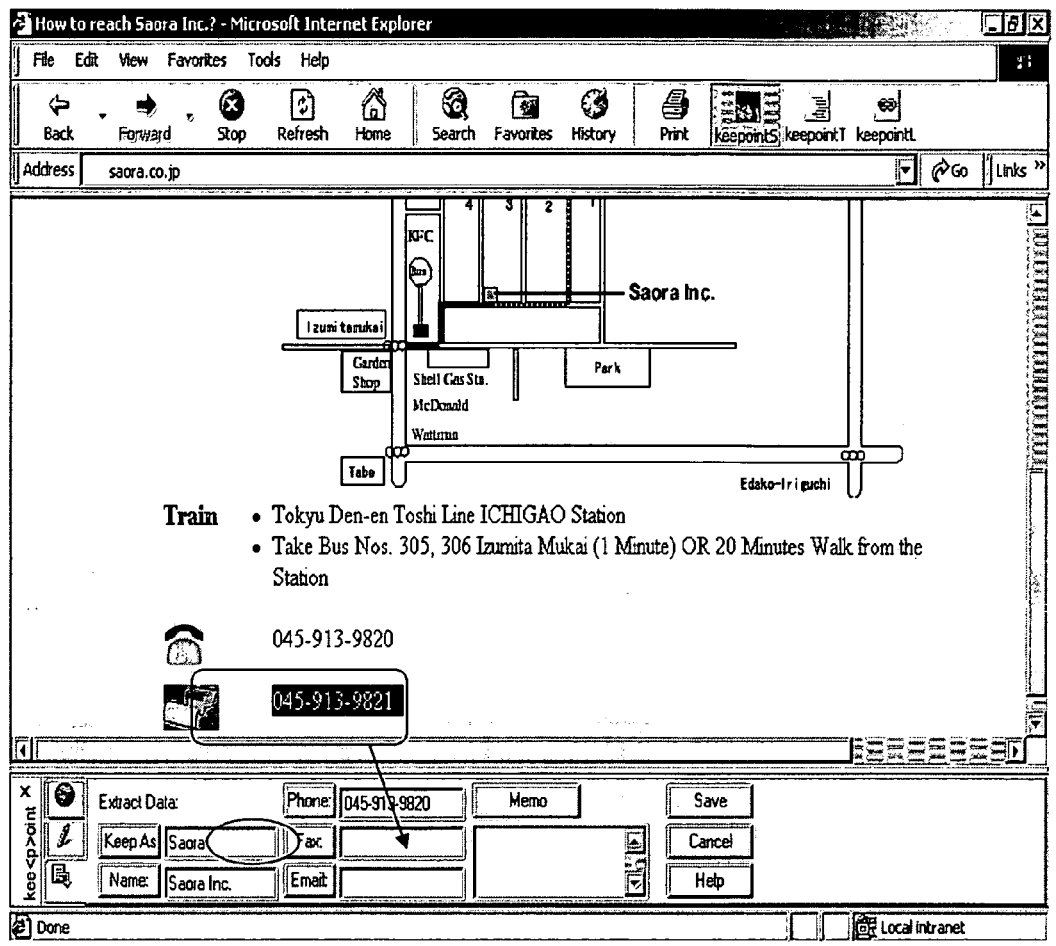
FIG. 35 shows an example User Interface of Extract Data UI.

If so, Extract UI, an example of which is shown in FIG. 35, is displayed in step S717 and the actual Extract information executed using Extract, which is explained in detail later, in step S718 and proceeds to step S720. If not, Mgmt( ), which is explained in detail later is executed in step S719 and proceeds to step S720. In step S720, createKS( ) is executed to create the associated knowledge structures, which are explained in detail later and the process returns true.

Figure 8:
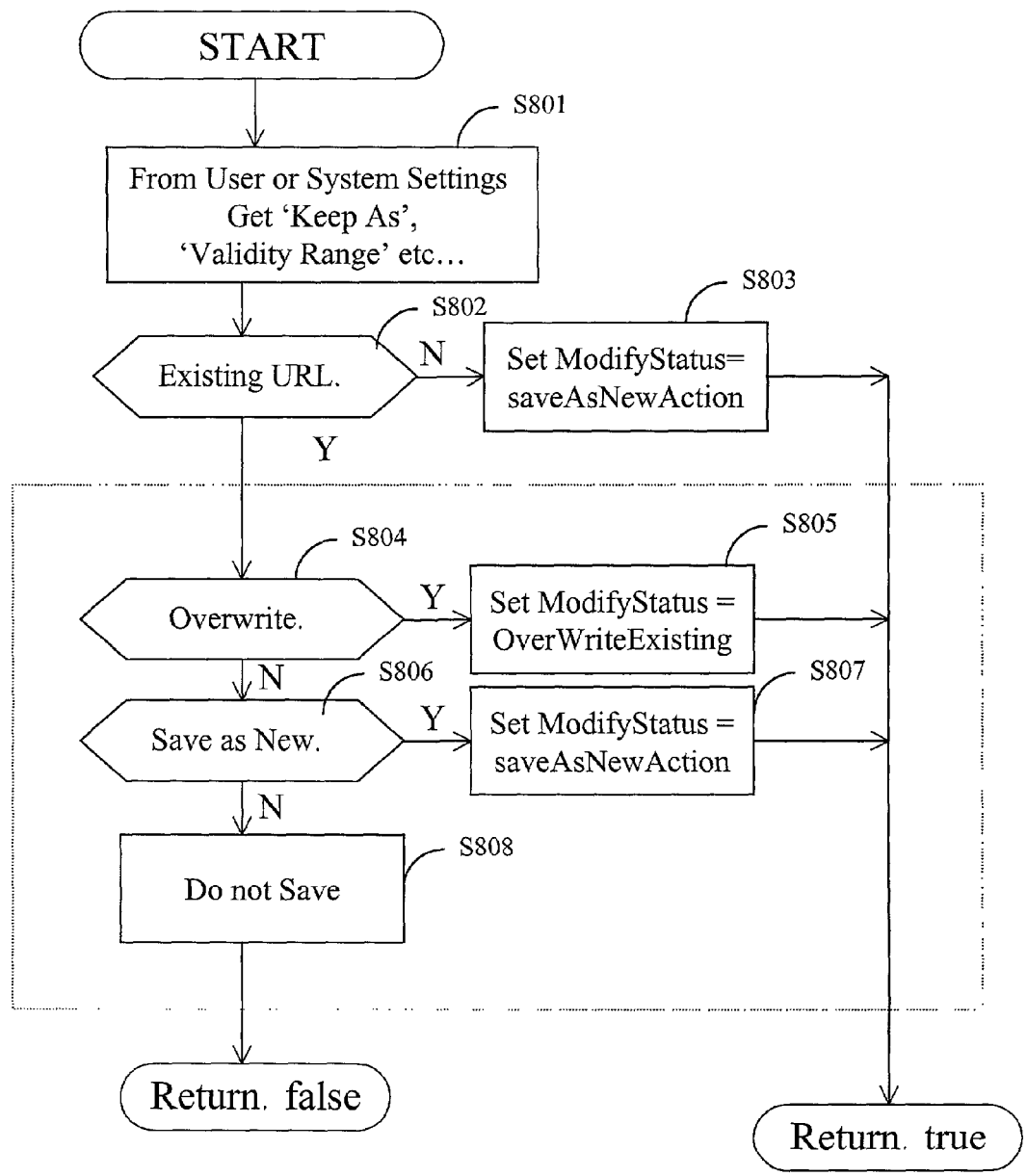
FIG. 8 is a flowchart of the procedural steps of CheckExisting( ).
Figure 48:
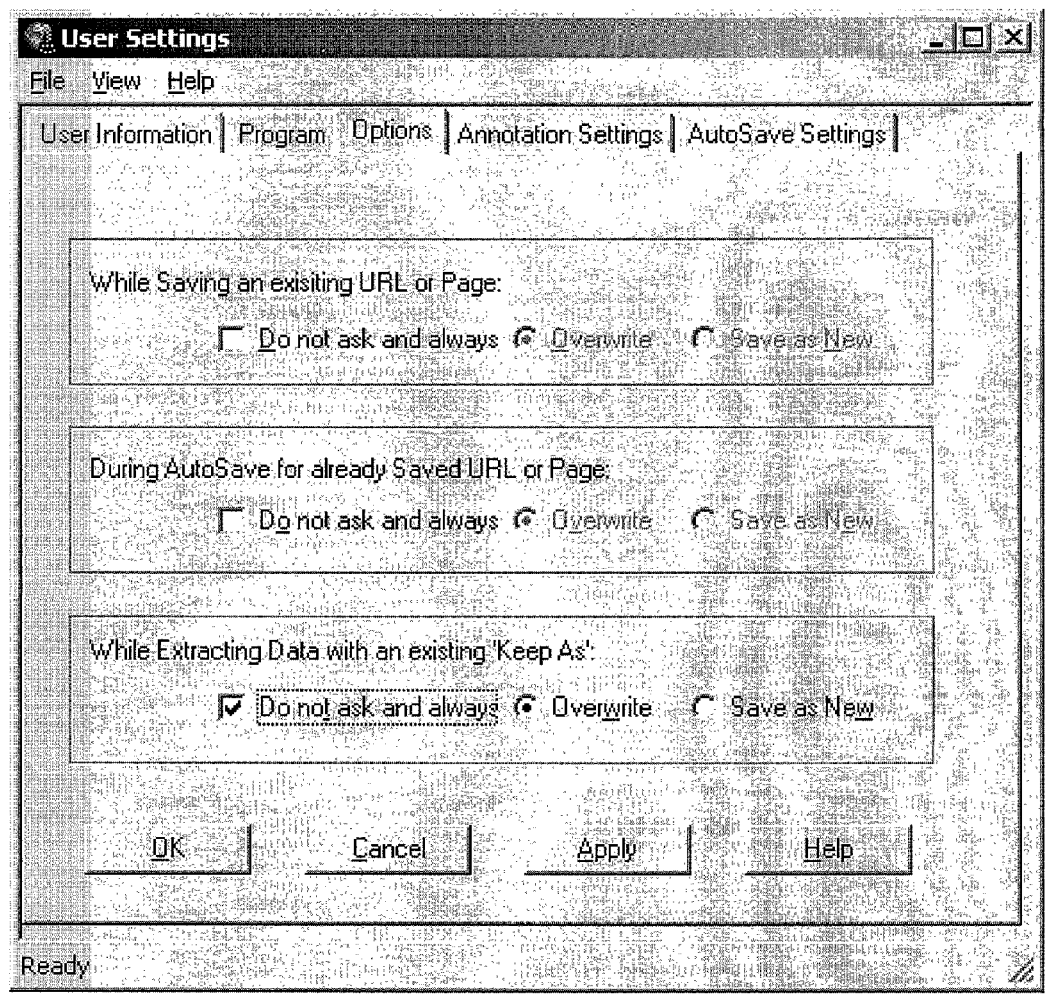

FIG. 8 is a flowchart of the procedural steps of S704, CheckExisting( ) of this embodiment to check if the information already exists in the knowledge base or not. In step 801, the values of Keep As, Validity Range etc. . . . are either obtained from the user or from the system settings. In step S802, a check is made to determine whether the URL already exists. If URL does not exist, the process proceeds to step S803 where Modifystatus is set to SaveAsNewAction is set to and returns true. If URL exists, a check is made in step S804 to determine if the information needs to be over-written (i.e., update or modify the previous information). This is done either by asking the user, whether he would like to overwrite the existing information, save as new do not save or based on the user settings as shown in FIG. 48. If so, in step S805, ModifyStatus is set to OverWriteExisting and the process returns true. If not, a check is made in step S806 to determine if the information needs to be saved as new, (i.e., without modifying the existing information, save the current information as a separate entity). If so, ModifyStatus is set to saveAsNewAction and the process returns true. If not, the process returns false.

Figure 9:
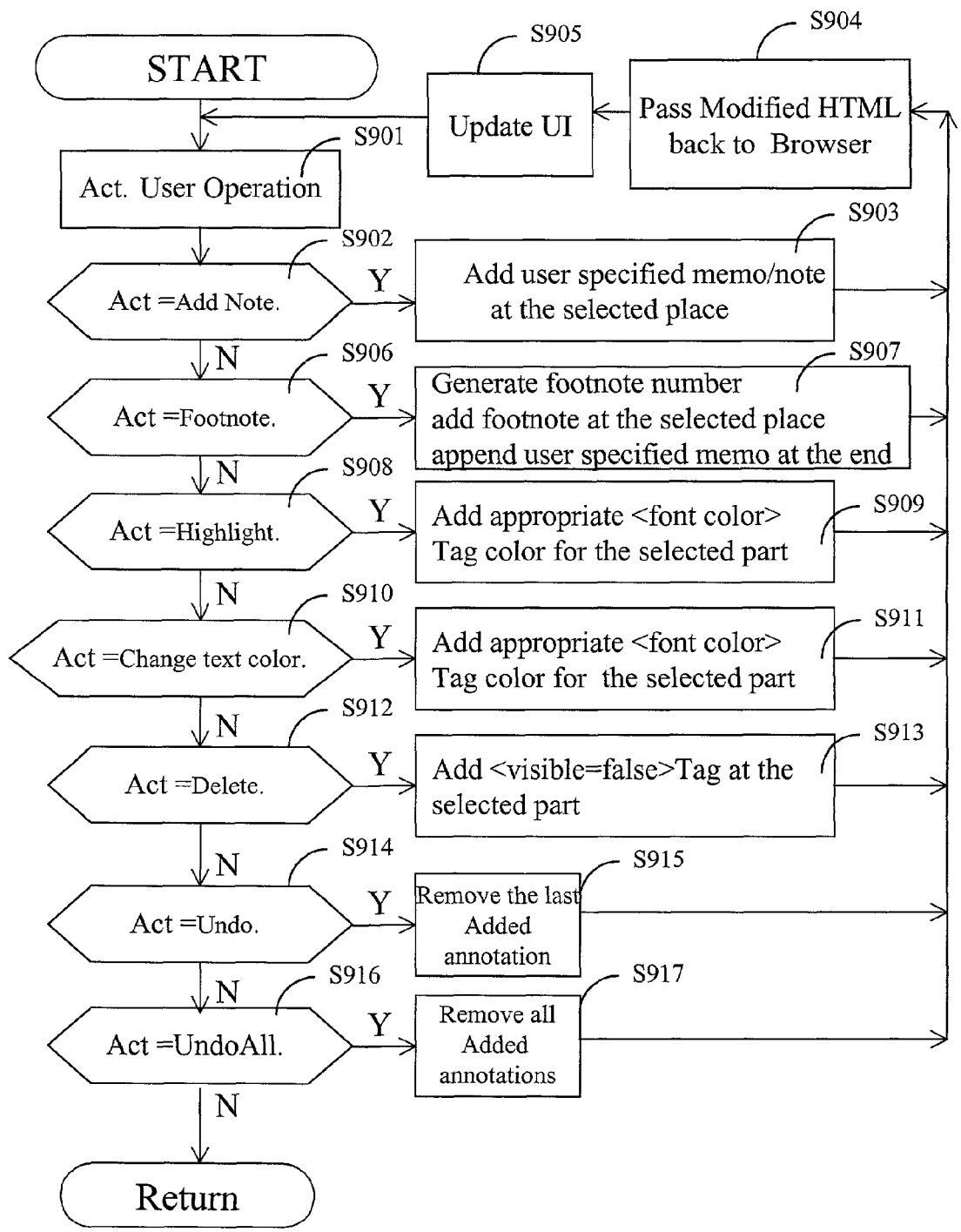
FIG. 9 is a flowchart of the procedural steps of Annotateo( ).
Figure 49:
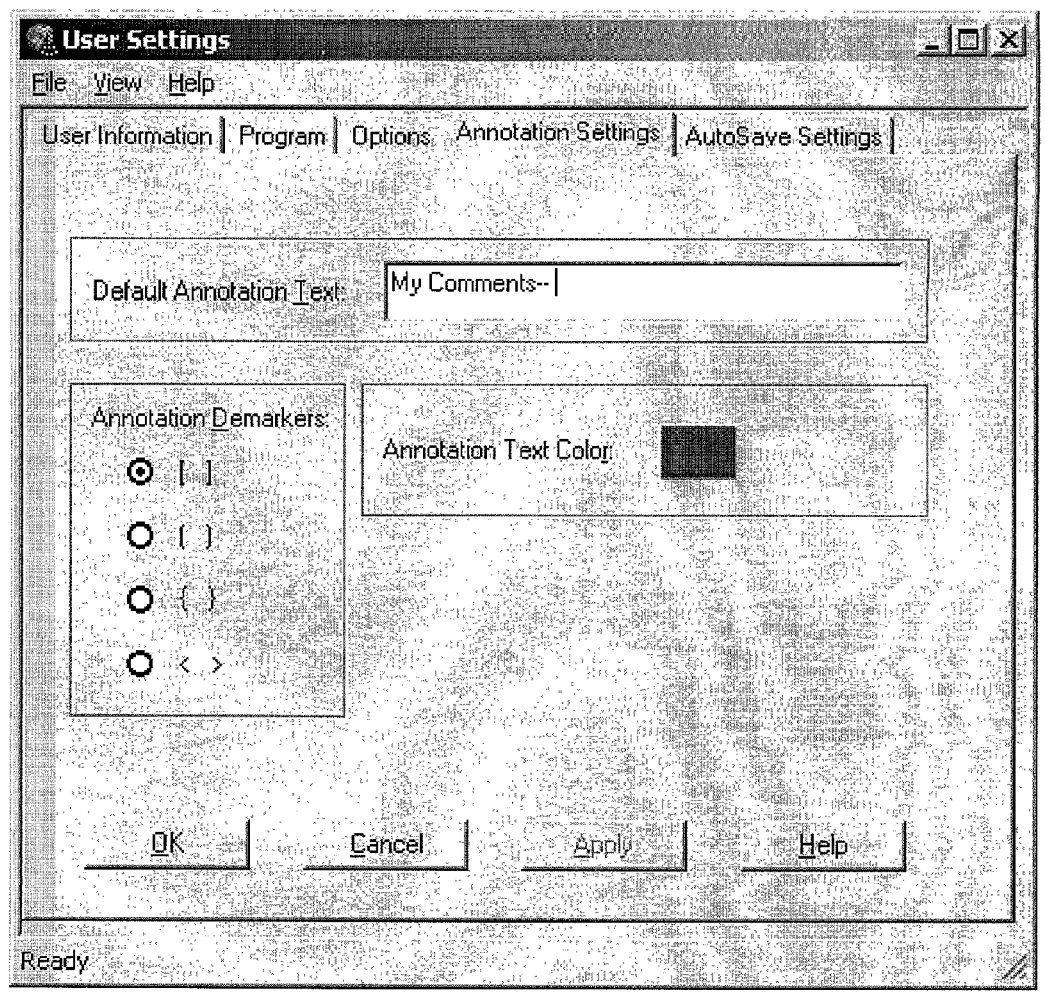

FIG. 9 is a flowchart of the procedural steps of S715 Annotate( ) of this embodiment and FIG. 32 shows an example user interface for Annotating a web page currently being browsed. In step S901, the user-performed operation is set to Act. A check is made in step S902 to determine if Act is Add Note. If so, the user specified memo/note is added to the selected place in step S903 and goes to step S904. If not, a check is made in step S906 to determine if the Act is Footnote. If so, the footnote number is created based on a sequence and the footnote number is added to the selected place in the page and the actual contents of the footnote are added to the end of the page in form of a table and proceeds to step S904. The notes added to the page are added based on user settings, example of which is shown in FIG. 49, to set the "annotation demarkers", "default annotation text", the color of annotation etc. The annotations are added as standard HTML tags and the results of the actual annotation for example text in FIG. 27 are shown in FIG. 33. Also, as can be seen in FIG. 32, the annotation to be added "Express Train does not Stop", is prepared using the default annotation text "My Comments" and enclosed with the annotation demarkers []. This is done to enable later for the user and/or the system to distinguish the user annotations from the actual or original HTML text. If Act is not Footnote in step S906, a check is made in step S908 to determine if the Act is Highlight. If so, a Font tag<font bgcolor= . . . >is added around the selected text with the background color set to the selected color in step S909 and proceeds to step S904. If not, a check is made in step S910 to determine if the Act is Change text color. If so, a Font tag<font color=. . .>is added around the selected text with the foreground color set to the selected color in step S911 and proceeds to step S904. If not, a check is made in step S912 to determine if Act is Delete. If so, the tag is modified to<visible=false>to hide the selected part of the text in step S913 and proceeds to step S904. If not, a check is made in step S914 to determine if Act is Undo.

If so, the last performed annotation is undone and proceeds to step S904. If not, a check is made in step S916 to determine if Act is UndoAll. If so, all the annotation performed by the user on this page during this session are removed and proceeds to step S904. If not the function returns. In step S904, the modified HTML tag page is passed back to the browser, which will render and update the UI in step S905 and return to step S901. If Act is none of the ones specified in the flowchart, the function returns.

Figure 10:
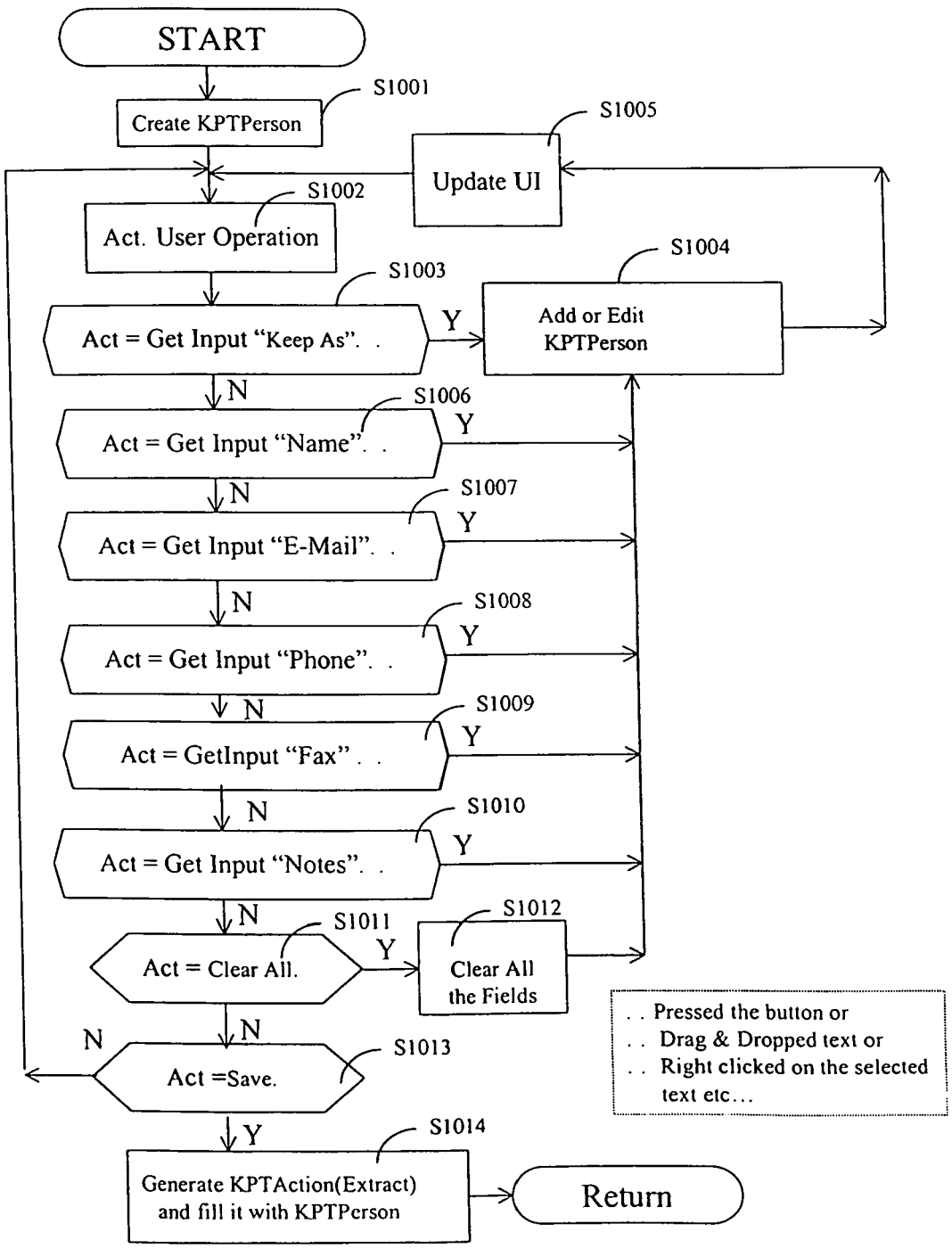
FIG. 10 is a flowchart of the procedural steps of Extracto( ).

FIG. 10 is a flowchart of the procedural steps of S718, Extracto of this embodiment. In step S1001, an instance of the knowledge structure for person—KPTPerson is created. In step S1002, the User operation is set to Act. An example User interface to describe some of the action is shown in FIG. 35. First a check is made to determine the type of Act (i.e., if Keep As, Name, Email, Phone, Fax, Notes) was input by the user (steps S1003, S1007~S1010).

This action can be performed in various ways, like first selecting the text to be extracted and pressing a predefine button, as shown in FIG. 35, or dragging and dropping the text to be extracted to the appropriate field or by right clicking on the selected text and specifying it to be the extracted data. If so, the KPTPerson knowledge structure is modified appropriately in step S1004 and the UI gets updated in step S1005 and the process returns to S1002. If the Act is Clear All (step S1011), all the fields are cleared in step S1012 and process proceeds to S1004. If the Act is Save (step S1013), a new action KPTAction is created of type Extract as shown in FIG. 36 and the KPTPerson is filled as associate object and the process returns.

Figure 11:
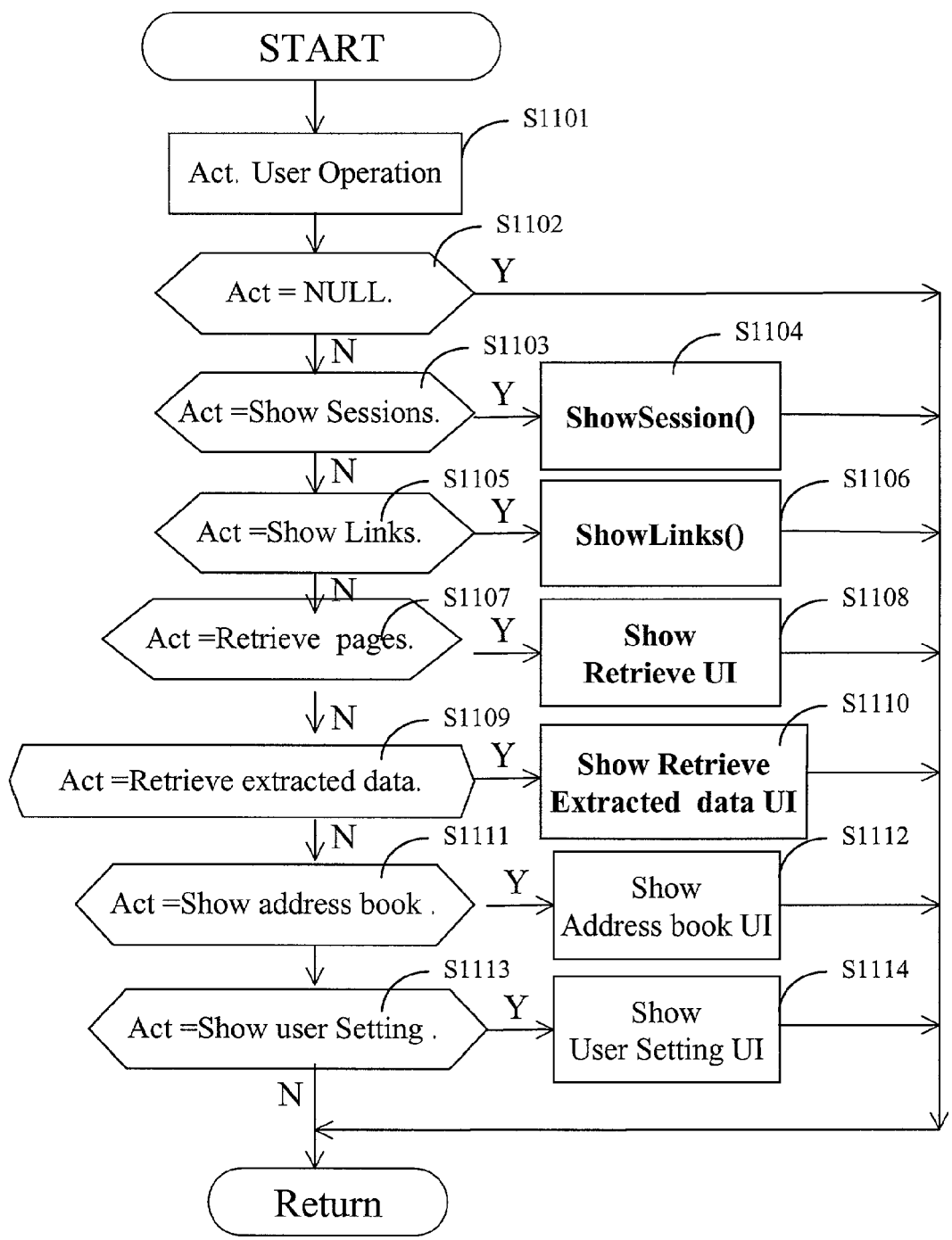
FIG. 11 is a flowchart of the procedural steps of Mgmt( ).
Figure 41:
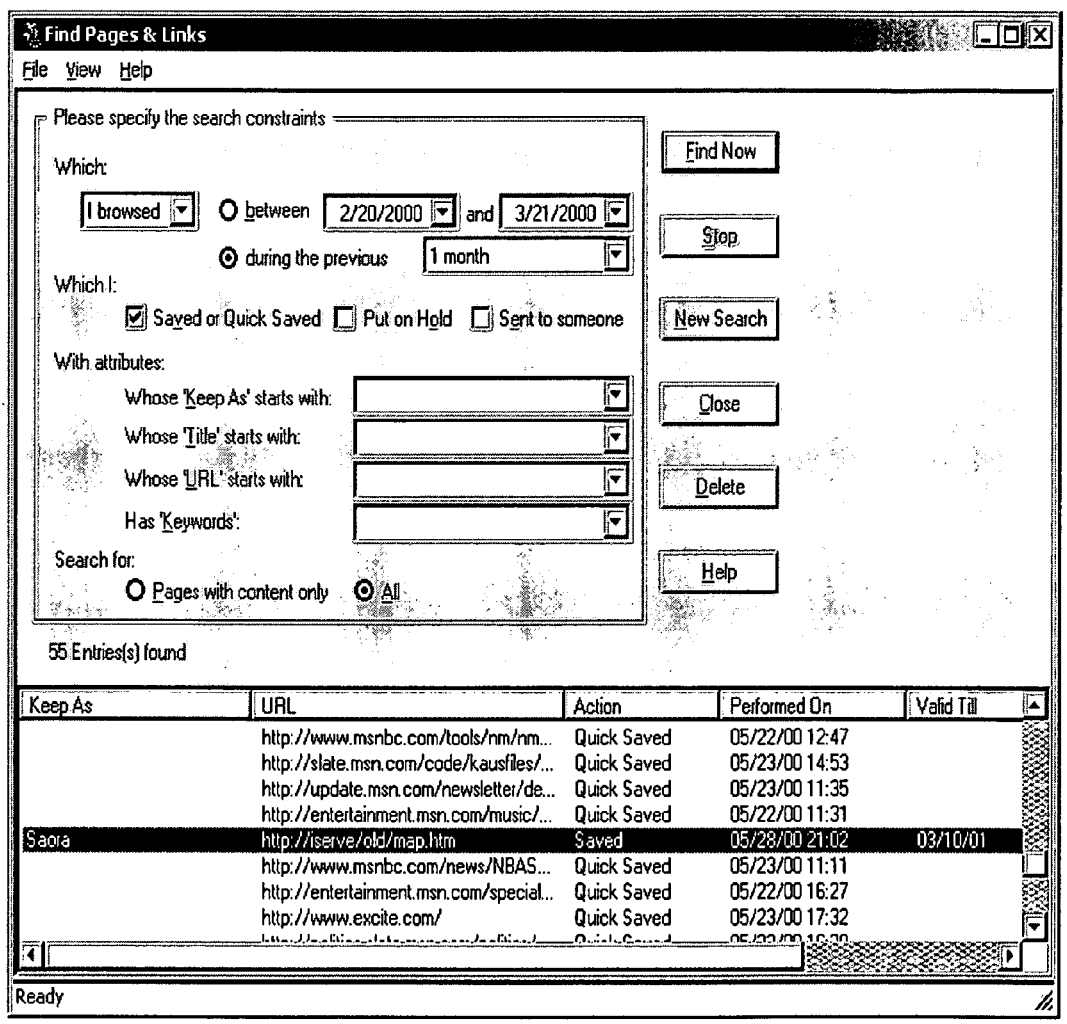
FIG. 41 shows an example Retrieve or Find UI.
Figure 43:
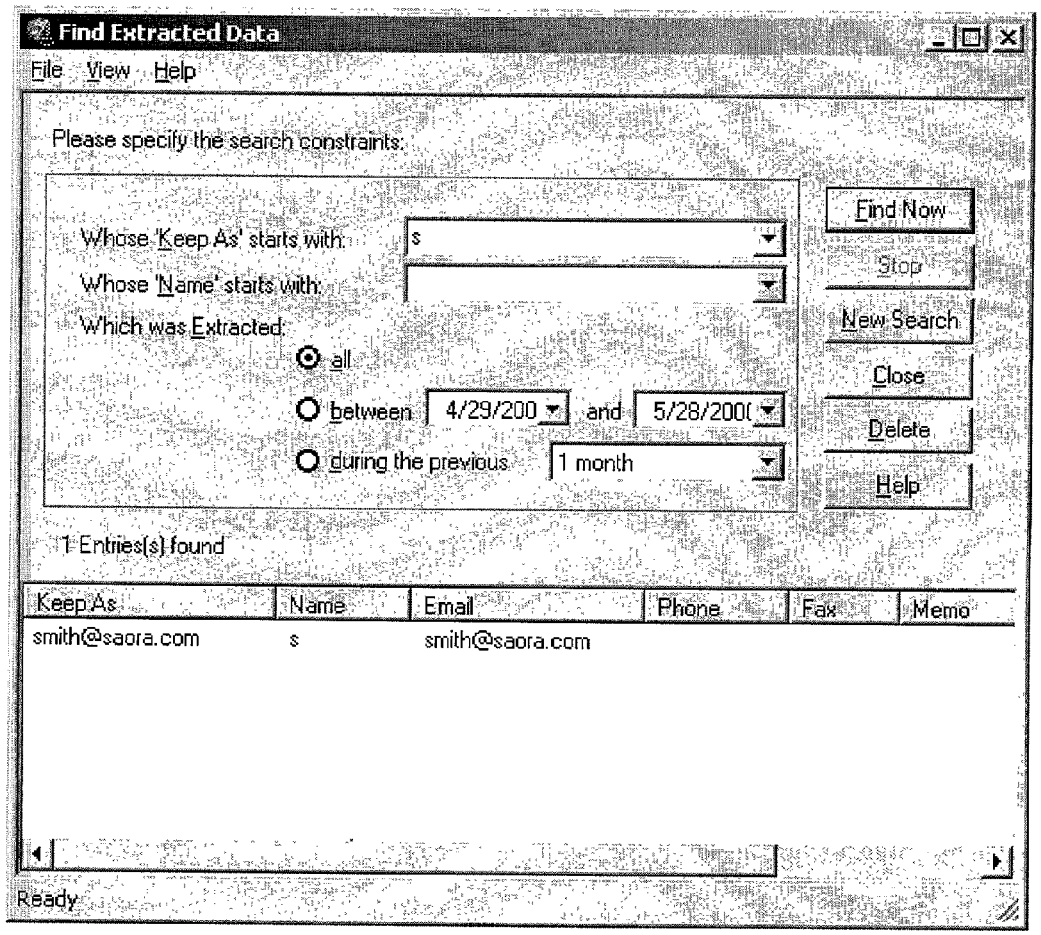
FIG. 43 shows an example Retrieve Extracted Data or Find UI.
Figure 44:
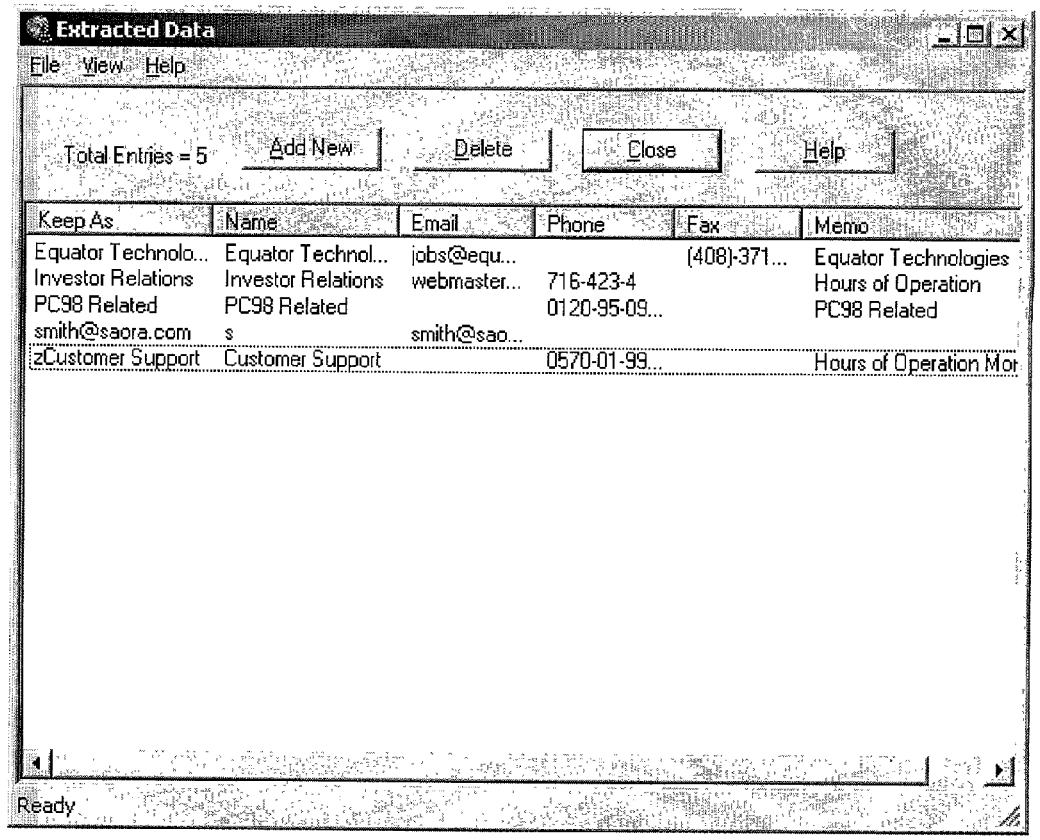
FIG. 44 shows an example Address book UI.

FIG. 11 is a flowchart of the procedural steps of S719 Mgmt of this embodiment. In step S1101, Act is set to the user-performed operation. In step S1102, a check is made to determine if Act is NULL. If so, the process returns. If not, a check is made in step S1103 to determine if Act is Show Sessions. If so, ShowSession( ) as explained later is executed in step S1104 and the process returns. If not, a check is made in step S1105 to determine if the Act is Show Links. If so, ShowLinks( ) as explained later is executed in step S106 and the process returns. If not, a check is made in step S1107 to determine whether Act is Retrieve pages. If Act is to retrieve a page, the process proceeds to step S1108 where RetrieveUI is displayed, example of which is shown in FIG. 41. If not, a check is made in step S1109 to determine if Act is Retrieve extracted data. If so, Show Retrieve Extracted data UI is displayed, an example of which is shown in FIG. 43. If not, a check is made in step S1111 to determine if Act is Show address book. If so, Show Address book UI is displayed, an example of which is shown in FIG. 44 and the process returns.

Figure 12:
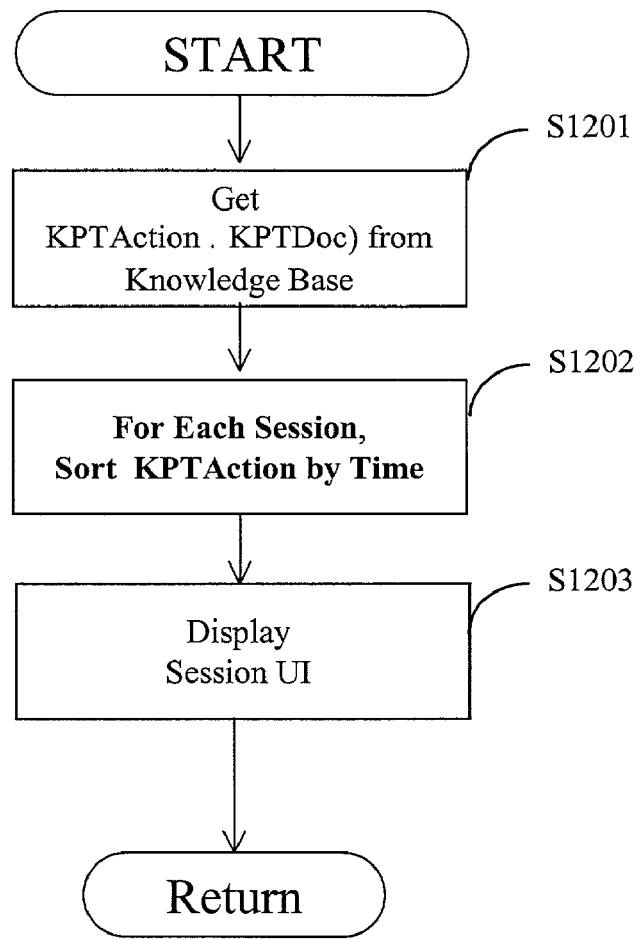
FIG. 12 is a flowchart of the procedural steps of ShowSession.
Figure 37:
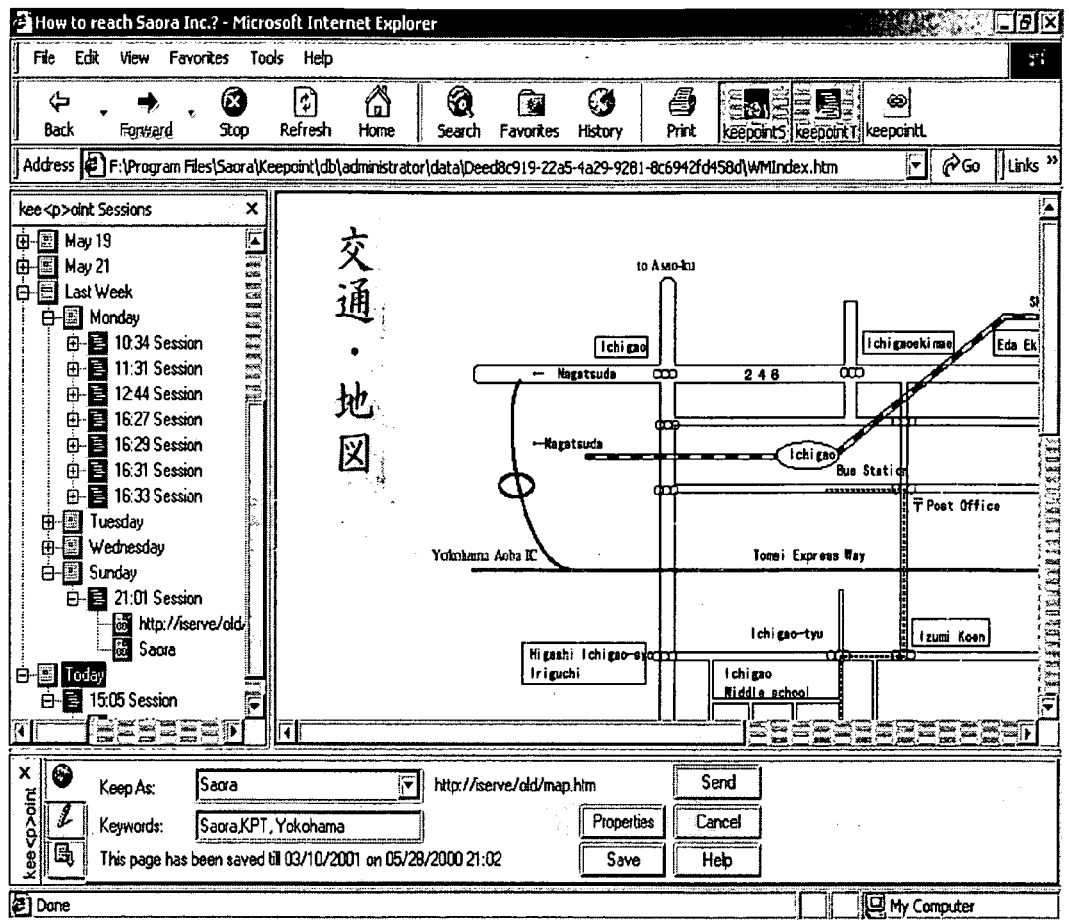
FIG. 37 shows an example User Interface of Session UI.

FIG. 12 is a flowchart of the procedural steps of S1104, ShowSession of this embodiment. In step S1201, all the KPTAction and the associated KPTDocument are got from Knowledge Base. In step S1202, KPTAction is sorted for each session by time as explained in detail later, in FIG. 60. In step S1203, Session UI is displayed, an example of which is shown in FIG. 37 and the process returns.

Figure 13:
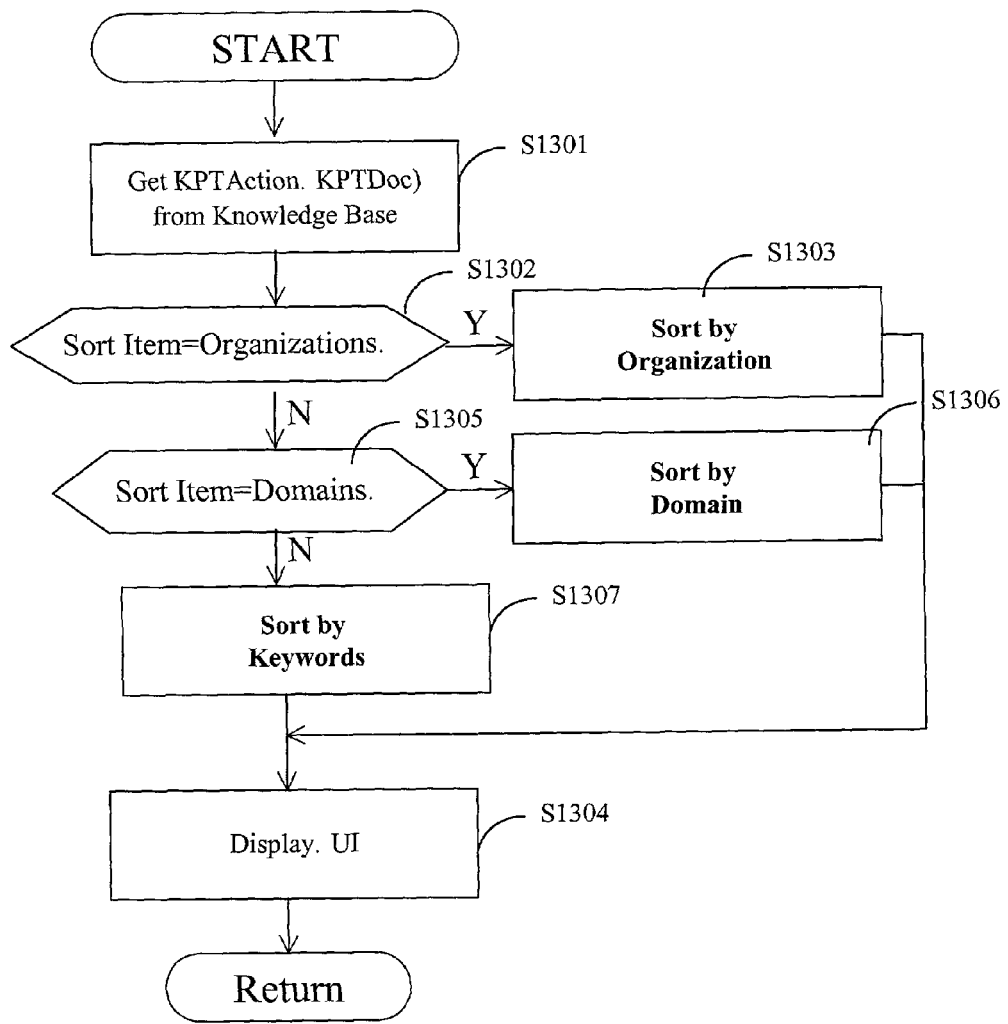
FIG. 13 is a flowchart that procedural steps of ShowLinks.
Figure 38:
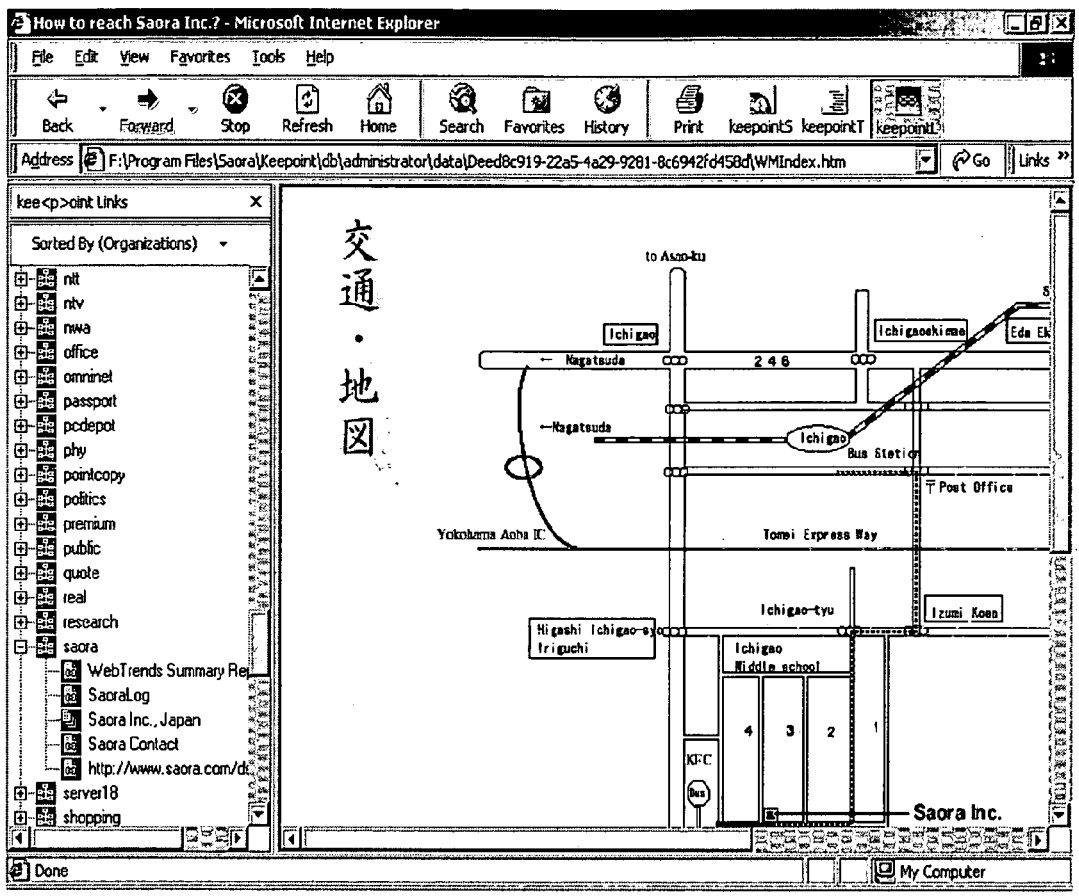
FIGS. 38, 39, and 40 show examples User Interface of Get All Links UI.
Figure 39:
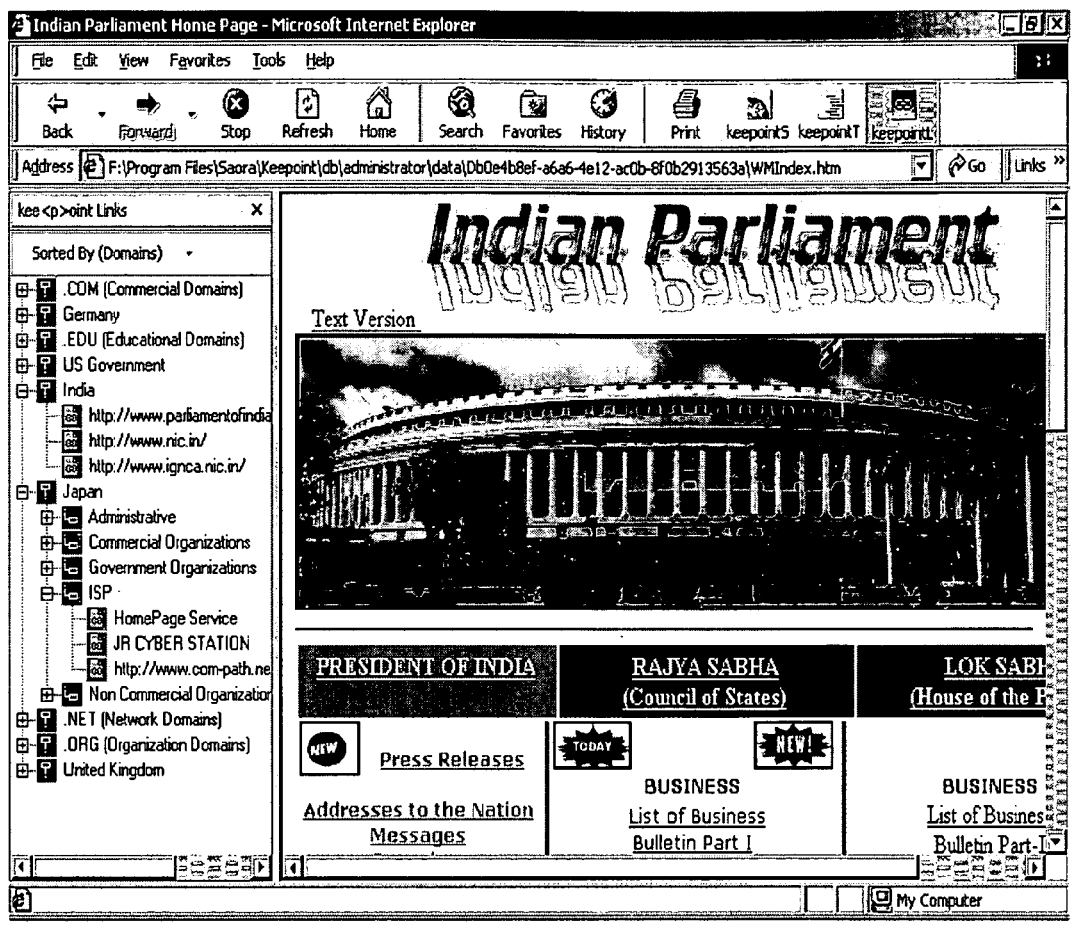
Figure 40:
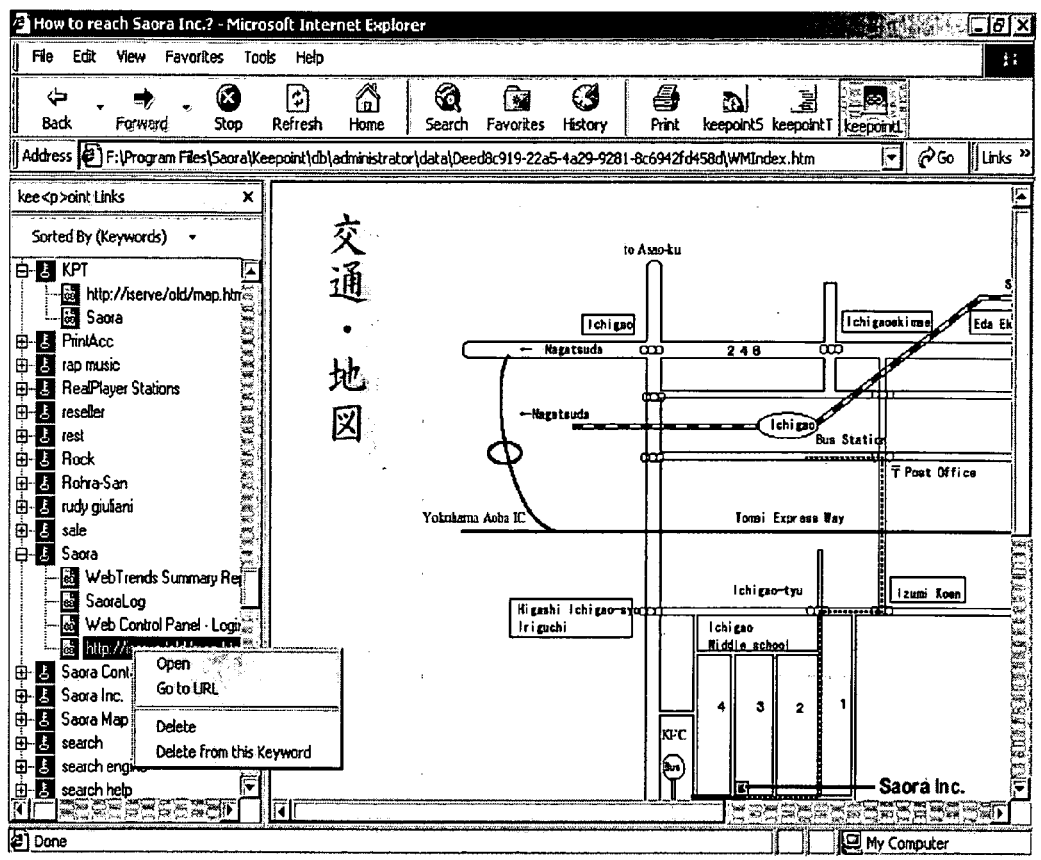

FIG. 13 is a flowchart that procedural steps of S1106, ShowLinks of this embodiment. In step S1301, all the KPTAction and the associated KPTDocument are got from knowledge base. In step S1302, a check is made to determine if the Sort Item is equal to Organizations. If so, the information is sorted by Organization, as explained in detail later in FIG. 59, in step S1303 and proceeds to S1304, where it is displayed, an example of which is shown in FIG. 38. If not, a check is made in step S1305 to determine if the sorting is by Domains. If so, the information is sorted by Domain, as explained in detail later in FIG. 58, in step S1306 and proceeds to step S1304, where it is displayed, an example of which is shown in FIG. 39. If not, the information is sorted by Keywords, as explained in detail later in FIG. 54, in step S1307 and proceeds to step S1304, where it is displayed, an example of which is shown in FIG. 40 and the process returns.

Figure 14:
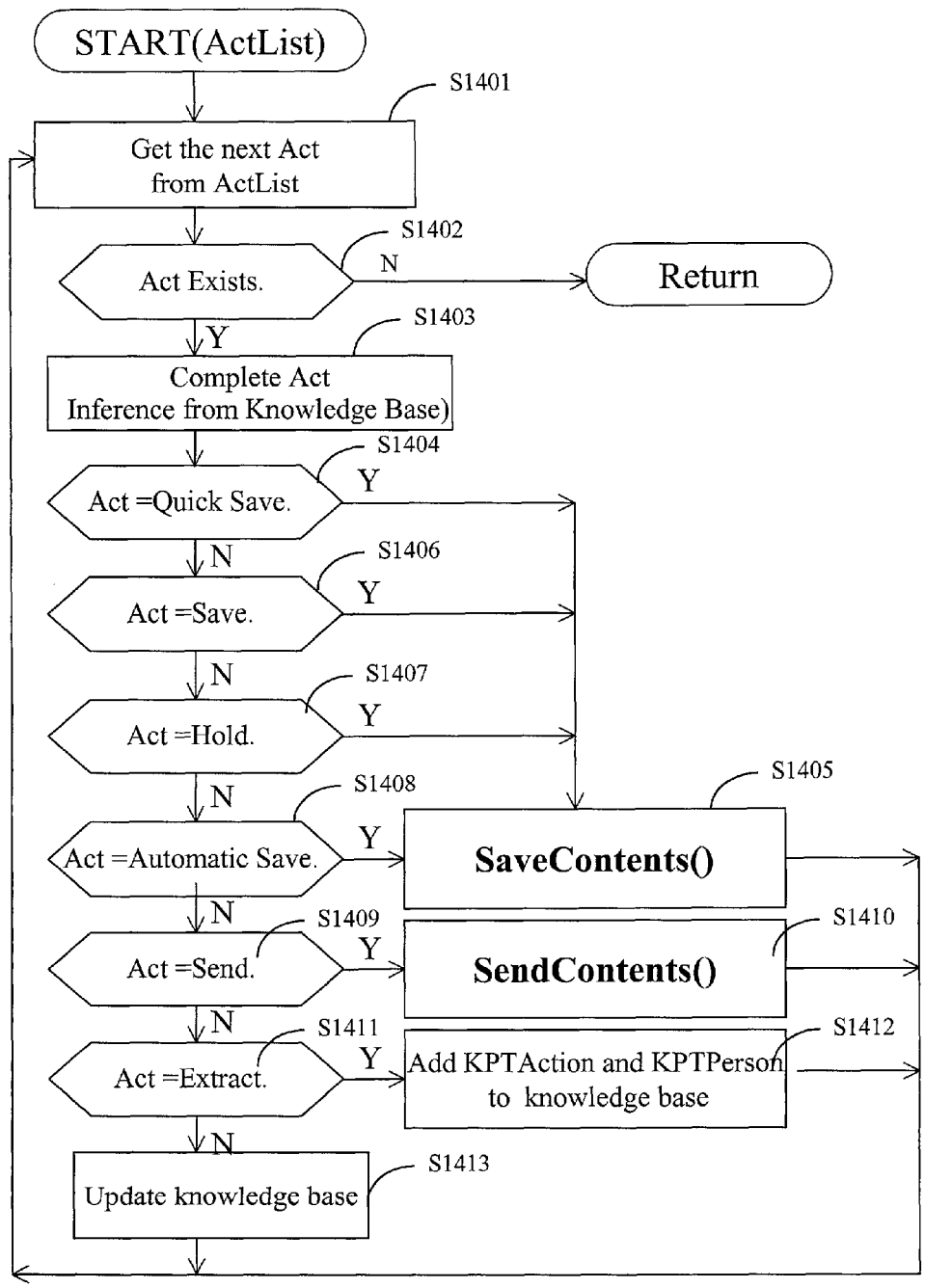
FIG. 14 is a flowchart of the procedural steps of ExecuteAction.
Figure 17:
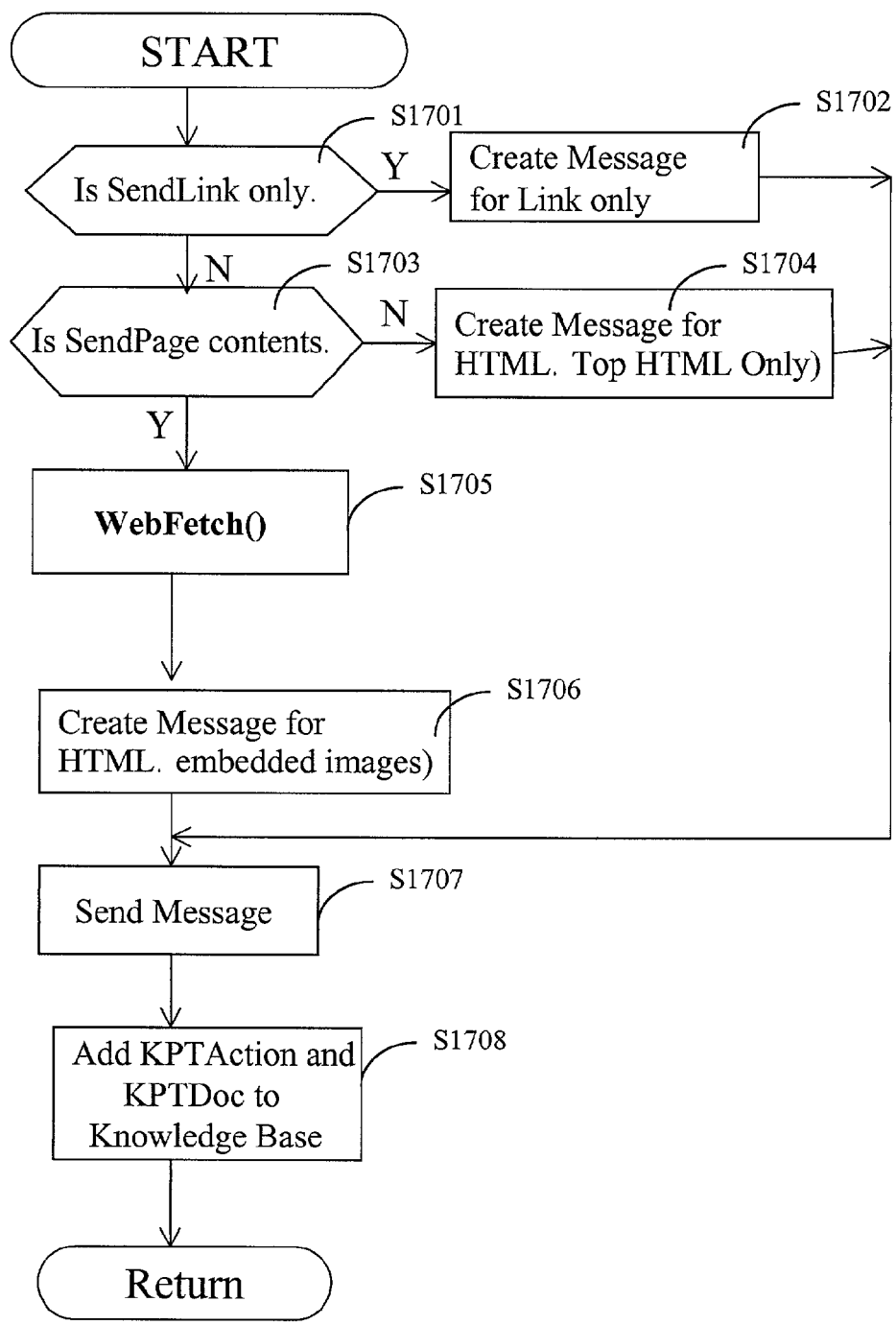
FIG. 17 is a flowchart of the procedural steps of SendContents.

FIG. 14 is a flowchart of the procedural steps of S622, ExecuteAction of this embodiment. In step S1401, the next Act is got from the ActList. In step S1402, a check is made to determine if Act exists. If not, the process returns. Otherwise, in step S1403 inference is made using the knowledge base to complete the Act. A check is made in steps S1404~S1408 to determine if Act is Quick Save or Save or Hold or Automatic Save and if either one of them is true, step S1405, SaveContents as explained later in FIG. 15. is executed and goes to step S1413. Otherwise a check is made in step S1409 to determine if Act is send. If so, SendContents, as explained later in FIG. 17 is executed and goes to step S1413. If not, a check is made in step S1411 to check if Act is Extract. If so, the KPTAction and the corresponding KPTPerson are added to the knowledge base in step S1412 and in step S1413 the knowledge base is updated and the process returns to step S1401 to fetch the next action from the ActList, till there are no more action left to be processed, at which stage the process returns.

Figure 15:
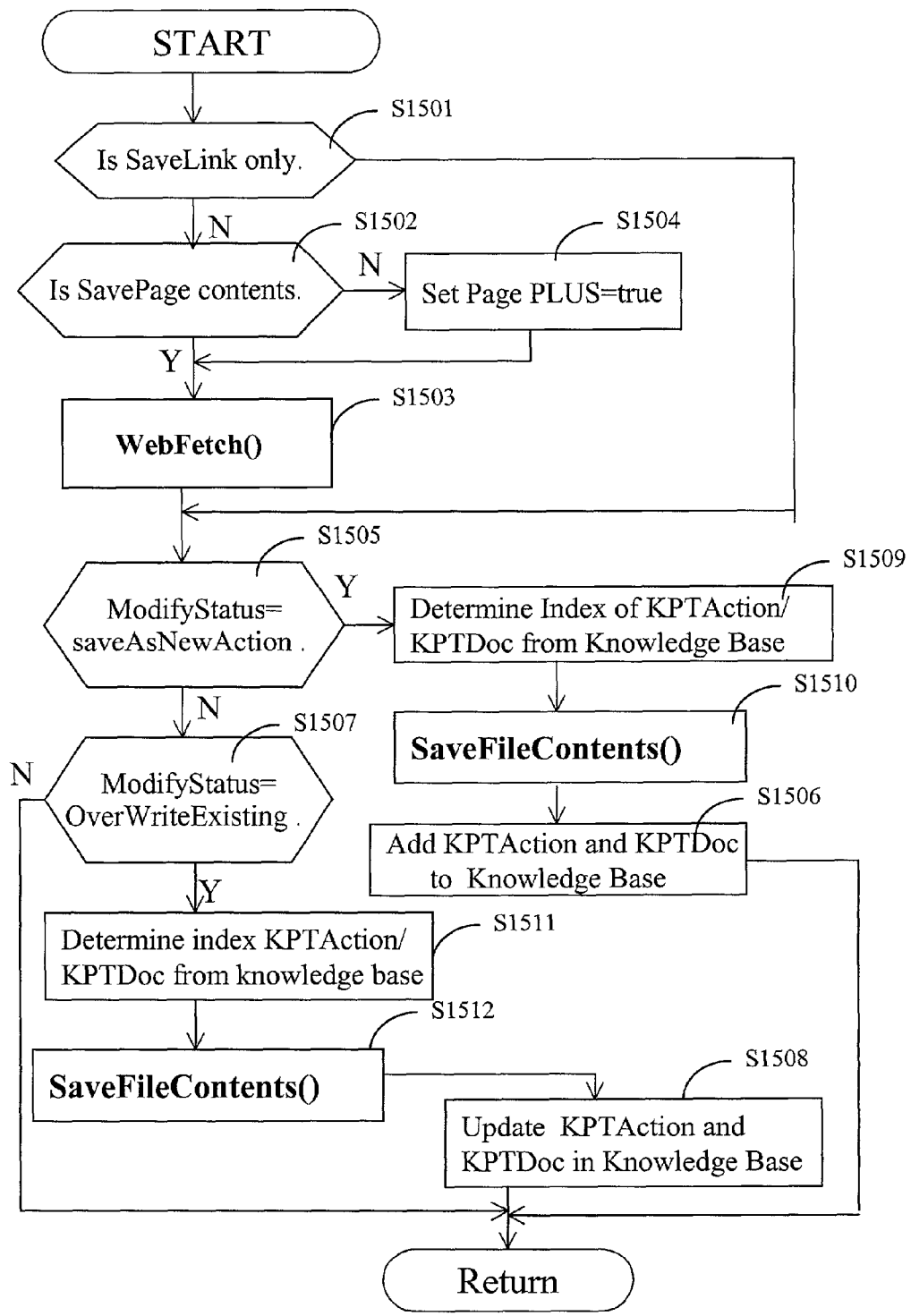
FIG. 15 is a flowchart of the procedural steps of SaveContents.

FIG. 15 is a flowchart of the procedural steps of SaveContents in step S1405 of this embodiment. A check is made in step S1501 to determine if it is a SaveLink only operation. If so, process proceeds to step S1505. Otherwise, a check is made to determine if it is a SavePage contents operation in step S1502. If so, Page PLUS is set to true in step S1504. In either case, step S1503, WebFetch( ) is executed, which is explained in detail later in FIG. 16, in step S1503. In step S1505, a check is made to determine if ModifyStatus is saveAsNewAction or not. If so, indices of KPTAction and the associated KPTDocument is determined from Knowledge Base in step S1509 and SaveFileContents( ) is executed as explained in FIG. 65, in step S1501. The KPTAction and KPTPerson are added to Knowledge Base in step S1506 and the process returns. If ModifyStatus is not saveAsNewAction, check is made in step S1507 to determine if it is OverWriteExisiting. If not the process returns, otherwise, in step S1511 indices of KPTAction and the associated KPTDocument is determined from Knowledge Base in step S1511 and SaveFileContents( ) is executed as explained in FIG. 65, in step S1502. The KPTAction and KPTPerson are updated in the Knowledge Base in step S1508 and the process returns.

Figure 16:
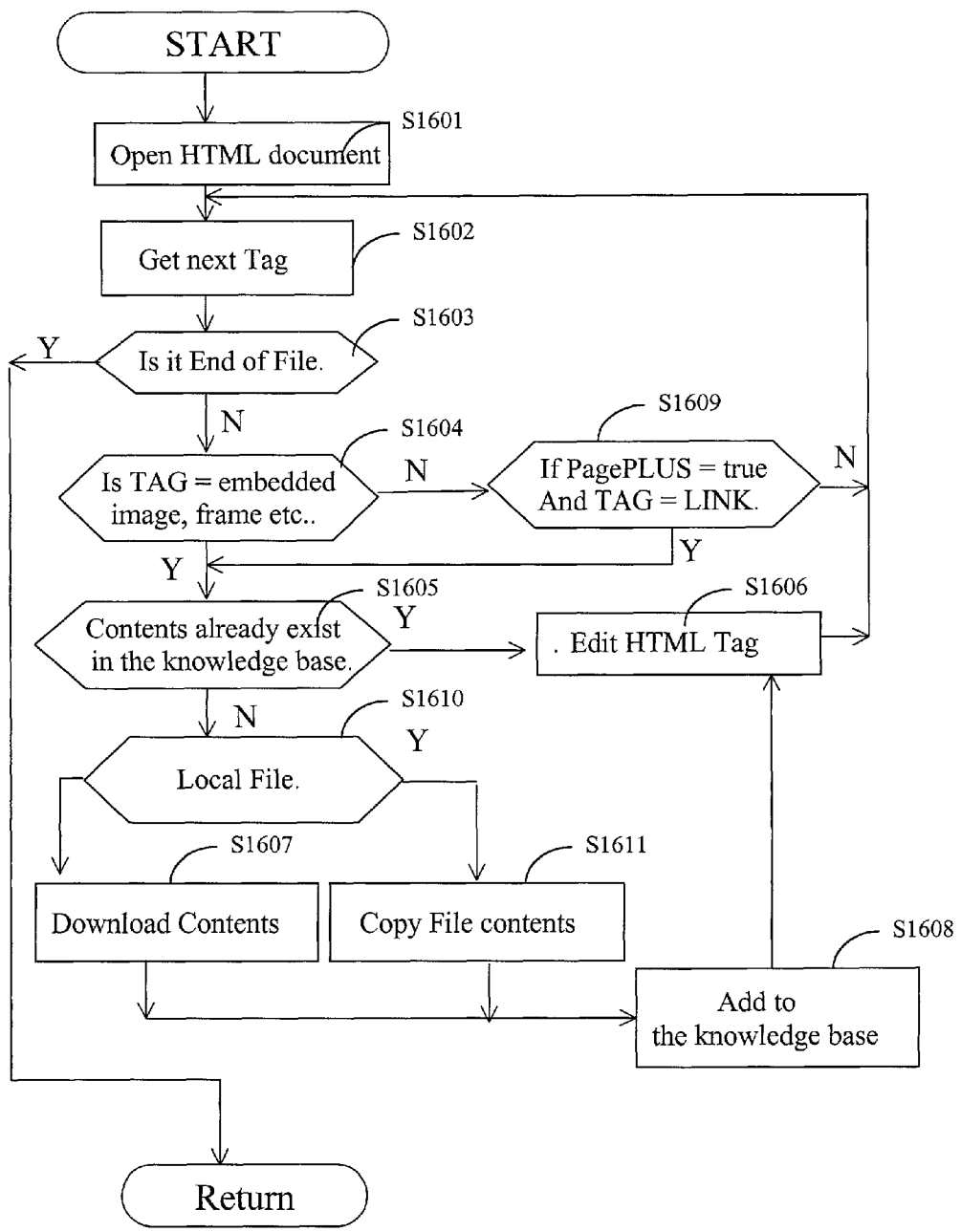
FIG. 16 is a flowchart of the procedural steps of WebFetch.

FIG. 16 is a flowchart of the procedural steps of WebFetch in step S1504 of this embodiment. In step S1601, HTML document obtained from the browser is opened. In step S1602, next tag is got. In step S1603, a check is made to determine if the end of file has been reached. If so the process returns. If not, a check is made to determine if the tag is for an embedded image, frame etc. in step S1604. If so, step S1605 is executed. If not, a check is made in step S1609 to determine if PagePLUS is true and the Tag type is of LINK. If not the process returns back to step S1602 to fetch the next tag. Otherwise, step S1605 is executed in which a check is made to see if the contents (i.e., embedded images etc.) already exist in our knowledge base and they are up to date in step S1605. If so, the HTML tag is edited in step S1606 to change the absolute or original path to the local path of the system where the file exists and process returns to step S1602. If not, a check is made to determine if the file to be fetched is a local file in step S1610. If so, the file contents are just copied, using a simple file copy command in step S1611, otherwise the contents are downloaded from the internet in step S1607. In either case step S1608 is executed, wherein the knowledge base is modified to update the information downloaded etc. and process returns to step S1602 to fetch the next tag in the HTML document. The process continues till end of file is reached at which instant the process returns.

FIG. 17 is a flowchart of the procedural steps of SendContents in step S1410 of this embodiment. In step S1701, a check is made whether the contents to be sent are SendLink only. If so, a message is created with the given Link in step S1702 and proceeds to step S1707. If not so, a check is made to determine if the contents to be sent are SendPage (i.e., send the HTML page including the embedded images etc.), in step S1703. If not so, a message for only top HTML is created and proceeds to step S1707. Otherwise, Webfetch( ) is executed as explained in FIG. 16 in step S1705. In step S1707, the created message is sent and the knowledge structures KPTAction and KPTDocument are added to knowledge base in step S1708 and the process returns.

Figure 18:
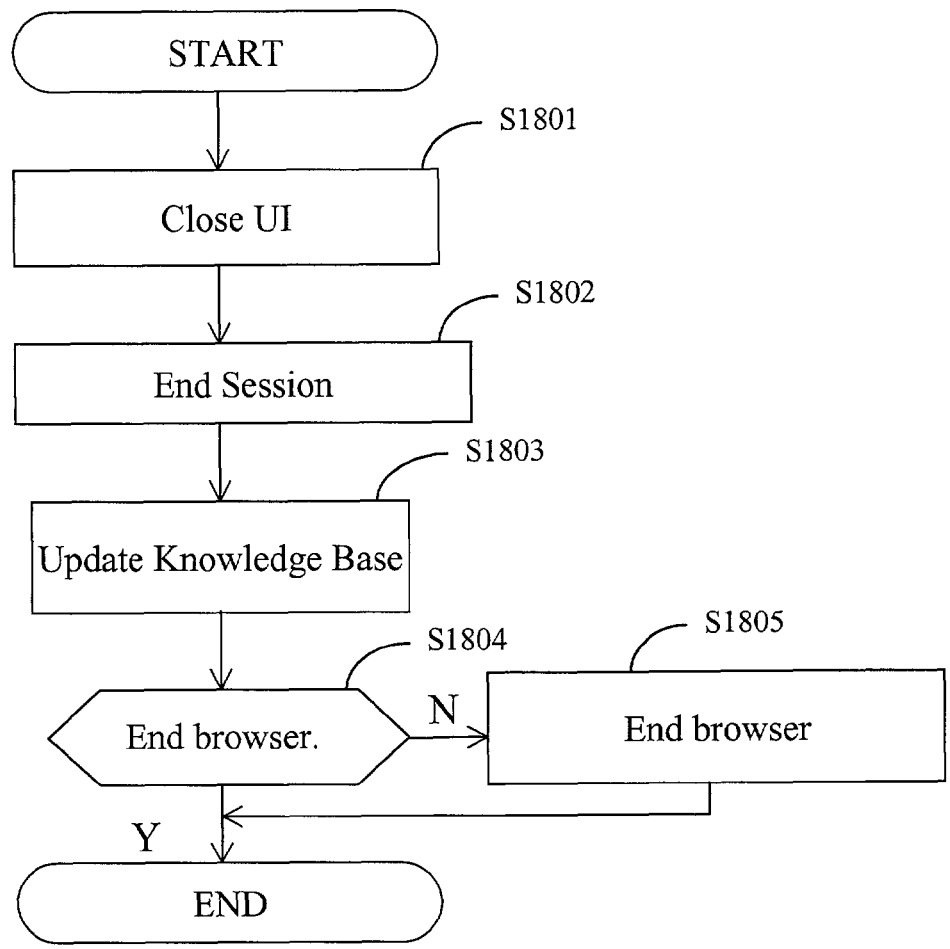
FIG. 18 is a flowchart of the procedural steps of TERMINATE.

FIG. 18 is a flowchart of the procedural steps of TERMINATE of step S403 of this embodiment. In step S1801, the UI on display are closed. In step S1802, all the current sessions are ended. In step S1803, Knowledge base is updated. A check is made in step S1804 to determine if browser needs to be ended or terminated. If so, the browser will be terminated in step S1805 and the process ends.

FIG. 19 shows an example of the knowledge structures in the knowledge base. (a), (b), (c) are the knowledge structure definitions for KPTConcept, KPTPerson and KPTDocument respectively.

FIG. 20 shows an example of the knowledge structures in the knowledge base. (a), (b) are the knowledge structure definitions for KPTAction and KPTContent respectively.

FIG. 21 shows an example content of the knowledge base. (a), (b) are the contents of the knowledge base for KPTDocument and KPTAction respectively.

FIG. 22 shows an example content of the knowledge base. (a), (b) are the contents of the knowledge base for KPTPerson and KPTContent respectively.

FIG. 23 shows an example content of the Domain knowledge base.

FIG. 24 shows an example User Interface of one embodiment. The keywords obtained in step S612—KPT, Yokohama are displayed in the UI as shown in step S618.

FIG. 25 shows an example User Interface of Save UI displayed in step S707, when Save is selected in FIG. 24, to get the validity or the period of time for which the contents needs to be saved.

FIG. 26 shows example results of the knowledge structures (a), (b) created in Step S612 and for KPTAction and KPTDocument respectively.

FIG. 27 shows an example HTML text obtained from the browser. In step S621, the system obtains the HTML text like shown in this figure and in steps S1604 to S1608, downloads the embedded files, which happens to be image files with '.gif' extension for the example HTML file shown.

FIG. 28 shows example results of the knowledge structures. These knowledge structures are created and updated to knowledge base in step S1608 for the example HTML text shown in FIG. 27.

FIG. 29 shows example modified HTML text. The original HTML text obtained from the browser, shown in FIG. 27 is modified by the system in step S1606 and the resultant HTML text is shown in this figure. As can be seen from this figure, the embedded links are modified to reflect the path where the system stores the embedded contents.

FIG. 30 shows example results of the knowledge structures created in step S1506 of this embodiment.

FIG. 31 shows an example User Interface of Hold UI, displayed in step S709, when Hold is selected in FIG. 24, to get the validity or the period of time for which the contents needs to be held by the system.

FIG. 32 shows an example User Interface of the Annotation UI displayed in step S714, when Annotation is selected to annotate, edit the HTML text from within the browser, without opening a separate window or application for the same purpose.

FIG. 33 shows example modified HTML text after user has performed annotations. The example shows the modified HTML text after adding notes directly on to the page in step S903. As can be seen from the figure, no special or custom tags are created, only standard HTML tags are added and hence, the contents of the annotations can be viewed using any standard browser.

FIG. 34 shows an example User Interface of Send UI, displayed in step S711, when Send is selected in FIG. 24, to get the recipients—"To", "Cc", "Subject" etc. . . . As can be seen from the figure, the annotated page in FIG. 33 can be sent to any recipient from within the browser and since no special or custom tags are added for annotations, the contents of the page can be viewed by the recipient using any standard browser FIG. 35 shows an example User Interface of Extract Data UI, displayed in step S717, when Extract is selected in FIG. 24, to allow the extraction of specified data.

FIG. 36 shows example results of knowledge structures created in step S1412 to be updated to the knowledge base.

FIG. 37 shows an example User Interface of Session UI. In step S1202, for each session the KPTAction is sorted by Time and the result is as shown in this figure. Also, as can be seen from the figure, being a Retrieved URL, the RetrieveUl message is obtained in step S617 and displayed in S618.

FIG. 38 shows an example User Interface of Get All Links UI. In step S1303, the links are sorted by Organization and the resultant UI is displayed in step S1304 as shown. As can be seen from the figure, if a content has subdomains (e.g., sales.saora.com) then it will appear in multiple places below each of the organization nodes, such as sales, saora, etc.

FIG. 39 shows an example User Interface of Get All Links UI. In step S1306, the links are sorted by Domains and the resultant UI displayed in step S1304 as shown.

FIG. 40 shows an example User Interface of Get All Links UI. In step S1307, the links are sorted by Keywords and the resultant UI displayed in step S1304 as shown. As can be seen from the figure, if a content has multiple keywords then it will appear in multiple places below each of the keyword nodes.

FIG. 41 shows an example Retrieve or Find UI, which is displayed in step S1108.

Figure 42:
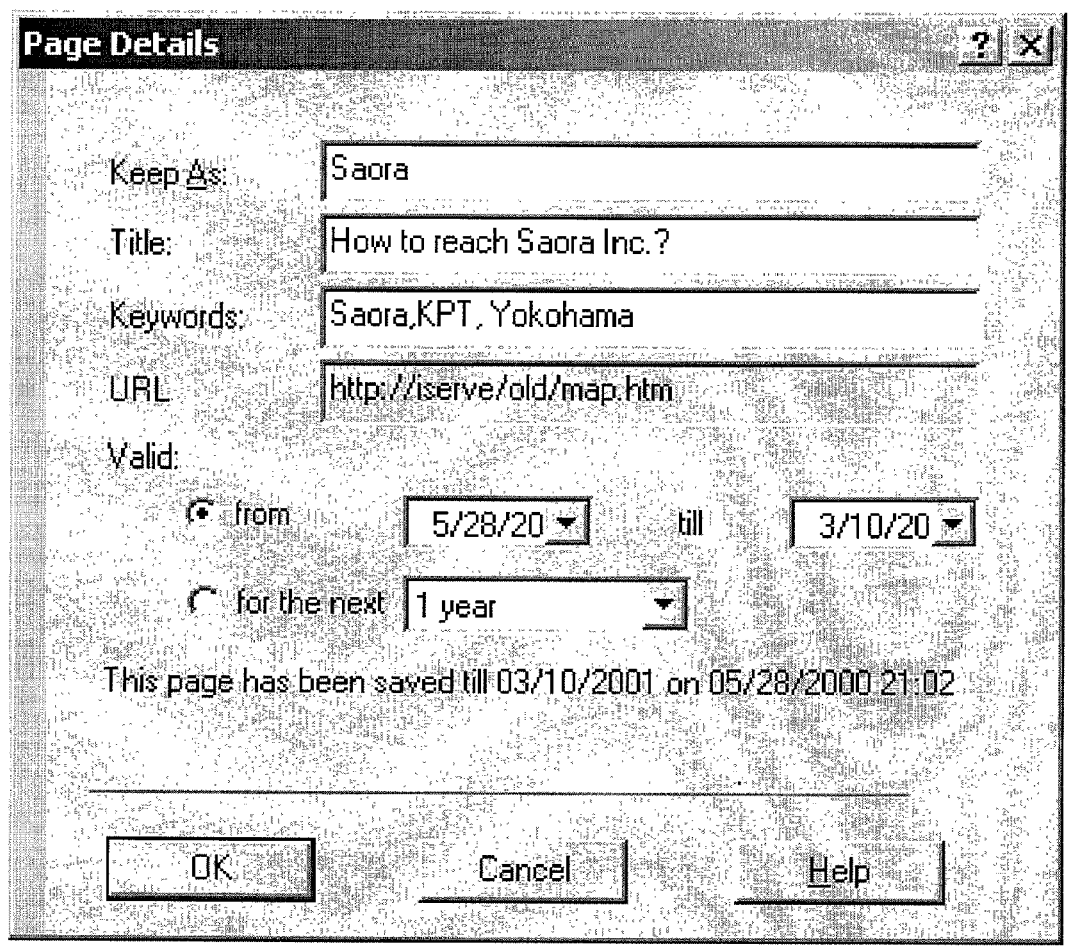
FIG. 42 shows an example of Properties or Attributes UI.

FIG. 42 shows an example Properties or Attributes UI of an entry selected in FIG. 41.

FIG. 43 shows an example Retrieve Extracted Data or Find UI, which is displayed in step S1110.

FIG. 44 shows an example Address book UI, which is displayed in step S1112.

Figure 45:
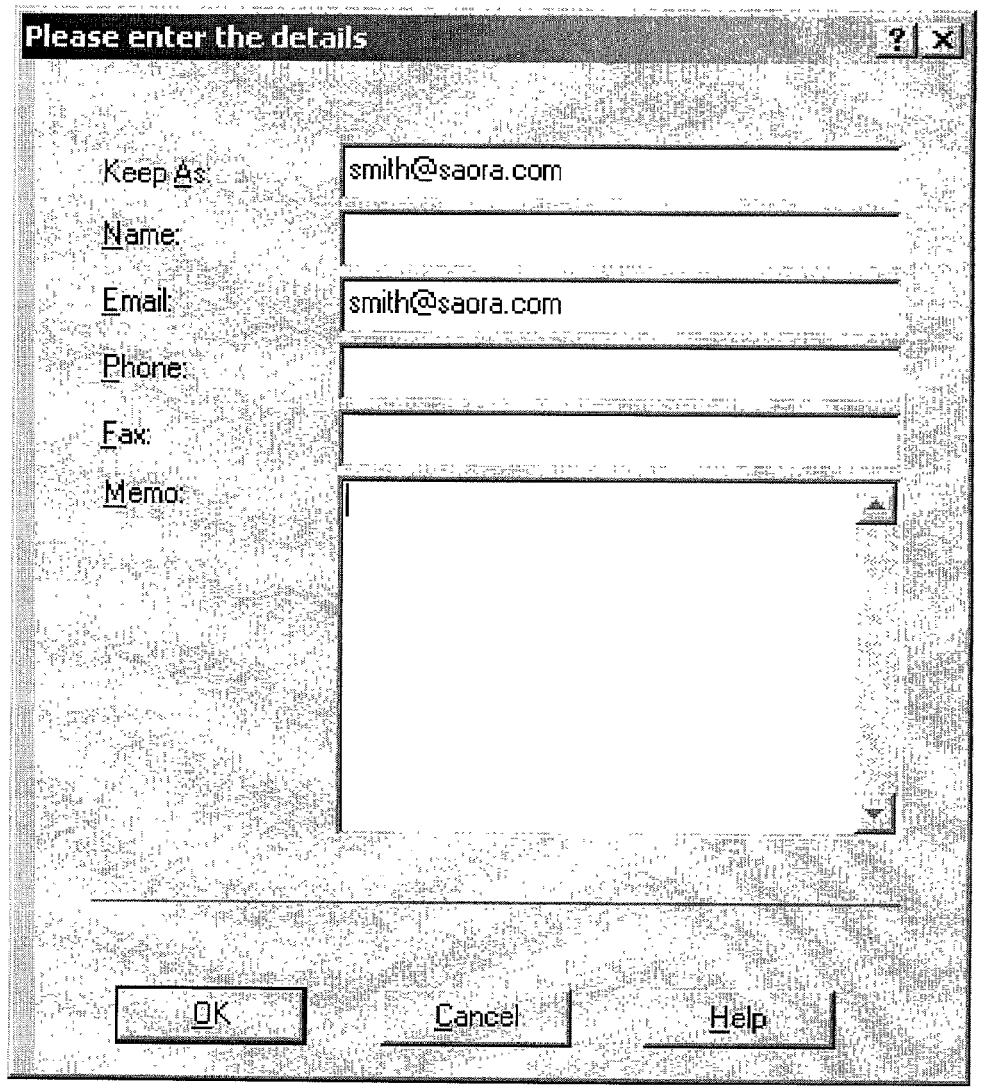
FIG. 45 shows an example of Properties or Attributes UI.
Figure 46:
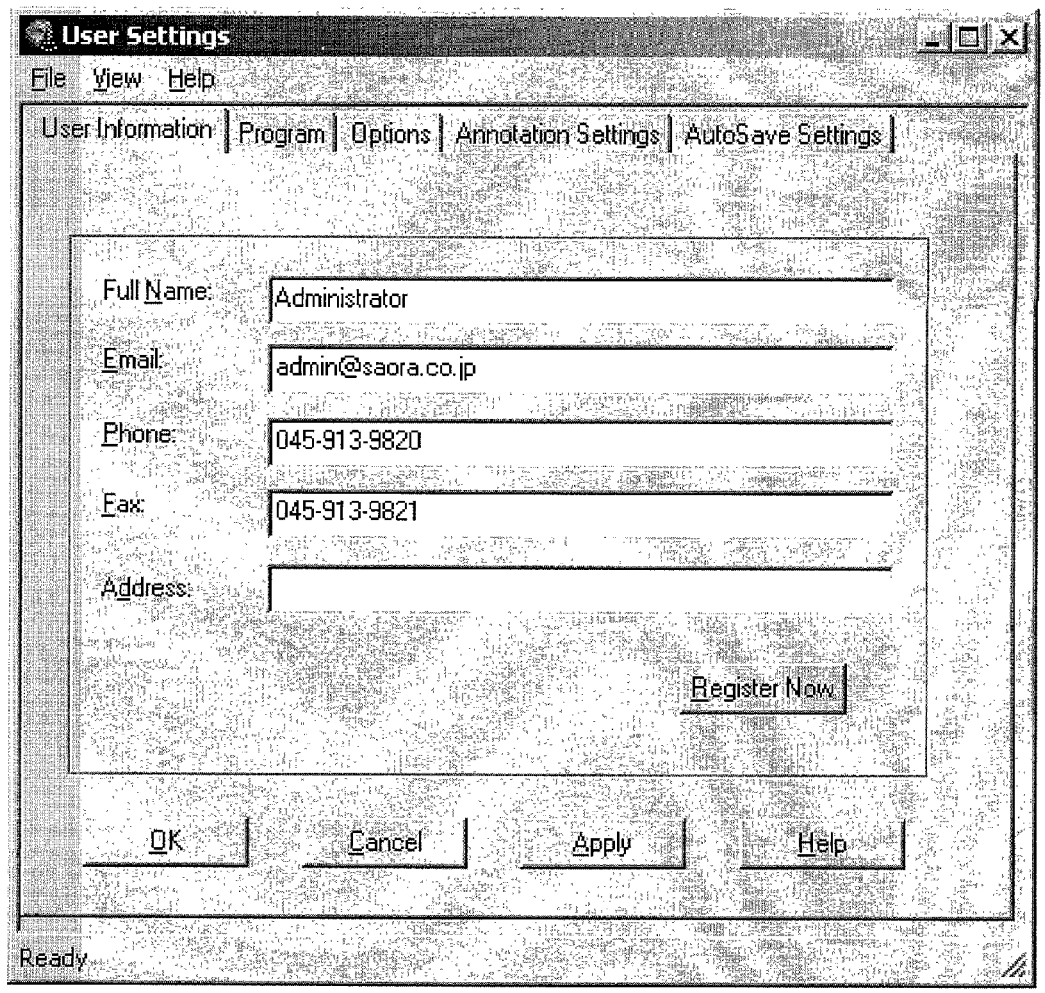
FIGS. 46 to 50 show some examples of User Settings UI.
Figure 47:
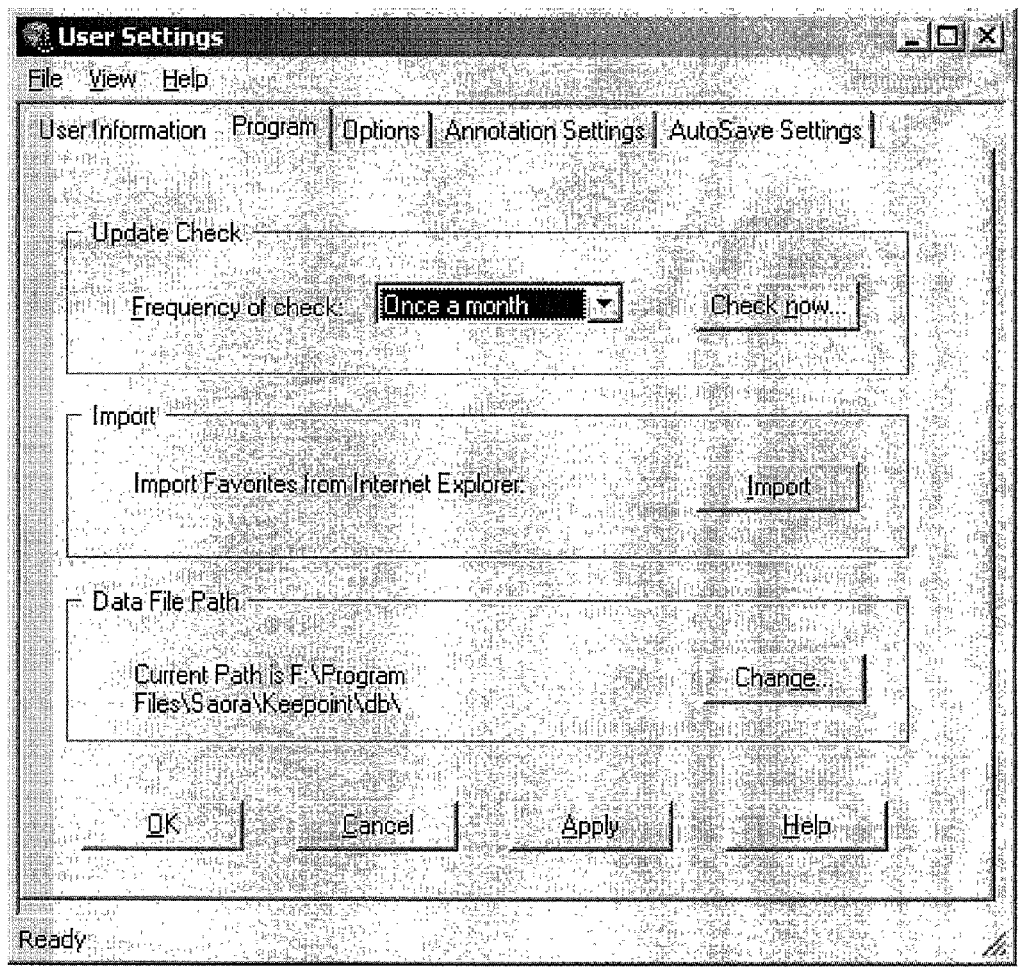

FIG. 45 shows an example Properties or Attributes UI of an entry selected in FIG. 44.

FIGS. 46 to 50 show some examples of User Settings UI, displayed in step S1114 of this embodiment.

Figure 51:
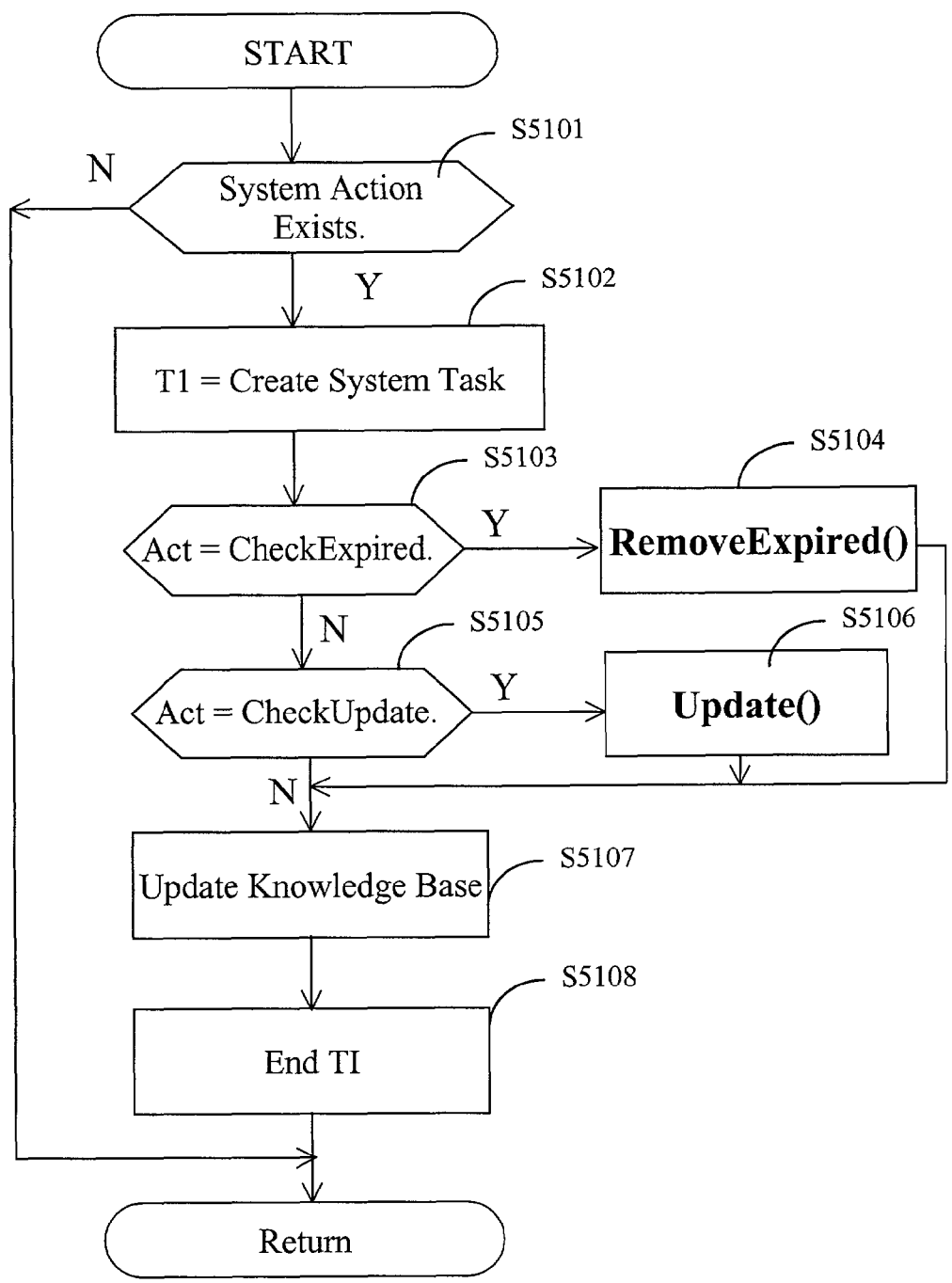
FIG. 51 is a flowchart of the procedural steps to see if any system task needs to be executed.

FIG. 51 is a flowchart of the procedural steps of S619 of this embodiment, in which a check is made to see if any system task needs to be executed. In step S5101, a check is made to determine if any system action exists, which needs to be executed. If no such action exists, the process is terminated and returns. If system action exists, system task T1 is created in step S5102. A check is made in step S5103 to determine if the system action is CheckExpired. If so, RemoveExpired is executed in step S5104 to remove the information whose validity period has expired. If not, a check is made in step S5105 to determine if the system action is CheckUpdate. If so, Update is executed in step S5016 to update the version of the system. After the completion of the above steps, knowledge base is updated in step S5107 and system task T1 is terminated in step S5108 and the process returns.

Figure 52:
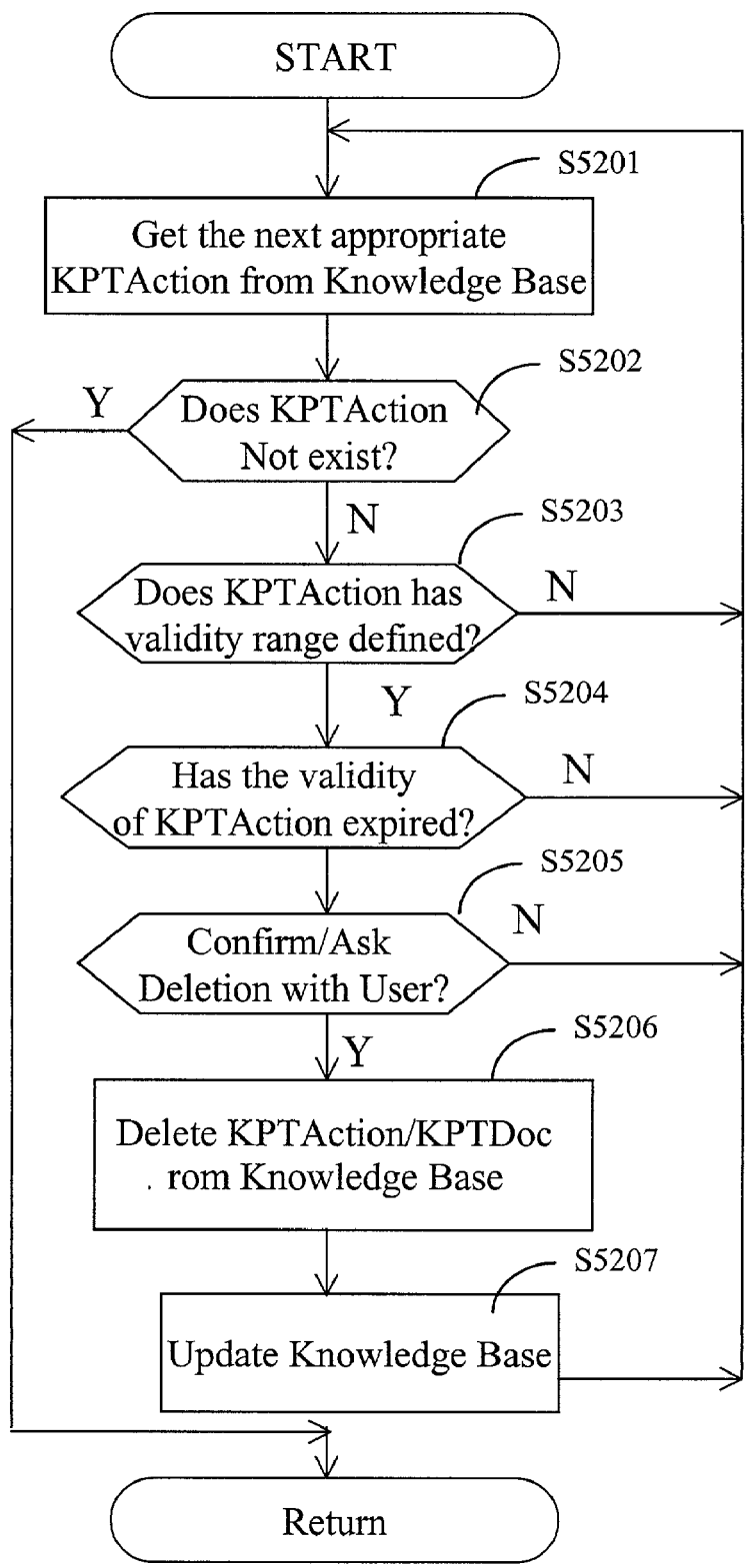
FIG. 52 is a flowchart of the procedural steps of RemoveExpired.

FIG. 52 is a flowchart of the procedural steps of RemoveExpired S5104 of this embodiment. Referring to the figure, in step S5201, a valid or active KPTAction is fetched from the knowledge base. In step S5202, a check is made to determine if no KPTAction was found in the previous step. If so, the process terminates and returns. If not, a check is made in step S5203 to determine if the validity period of the KPTAction is defined. If not, the control goes back to step S5202 to fetch the next valid or active KPTAction from the knowledge base and the process continues. If so, a check is made in step S5204 to determine if the validity period of the KPTAction has expired. If not, the control goes back to step S5201 otherwise, a confirmation is made to the user or based on user settings without asking the user every time, to verify if the found action can be deleted, in step S5205. If so, in step S5206 the KPTAction and the associated KPTDocument is deleted from the knowledge base and in step S5207 the knowledge base is updated and the control goes back to step S5201 to fetch the next valid or active KPTAction from the knowledge base and the process continues till no more actions are found.

Figure 53:
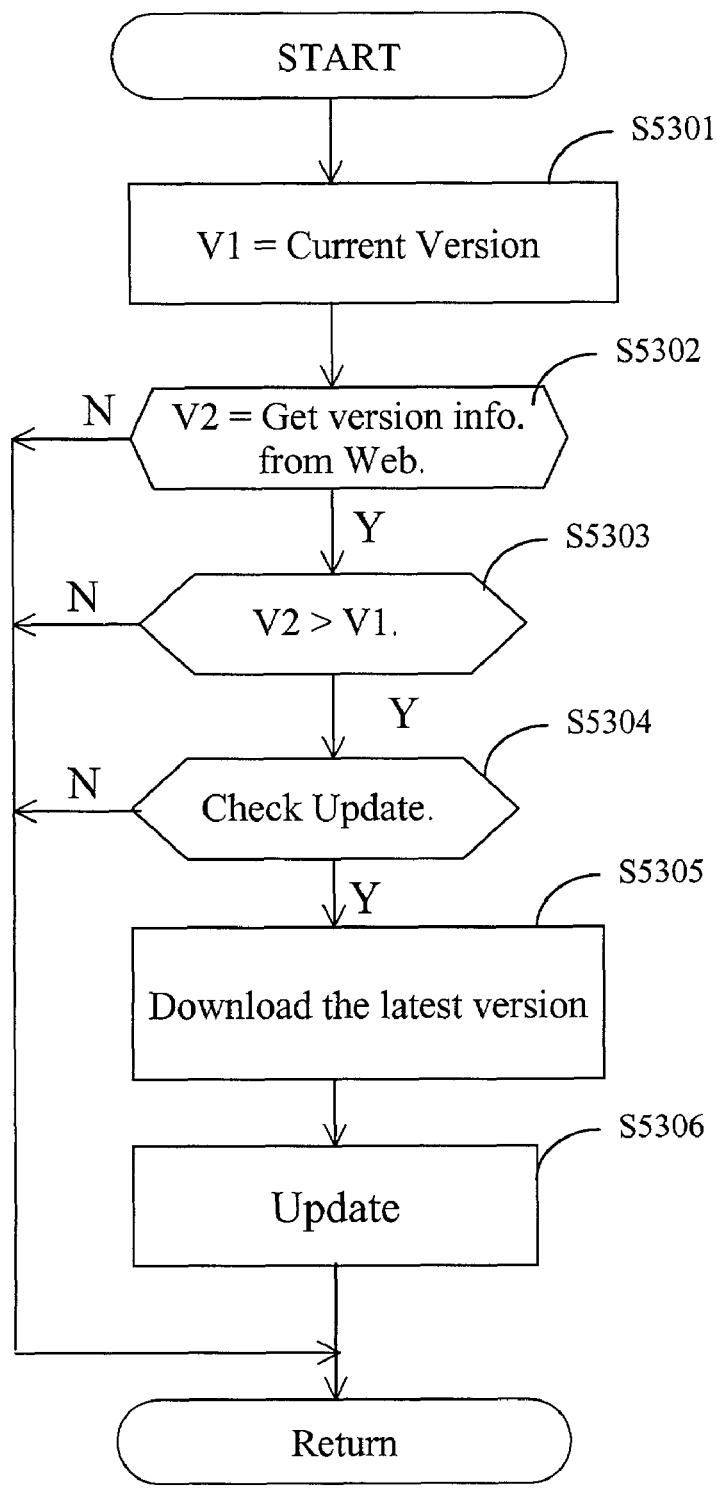
FIG. 53 is a flowchart of the procedural steps of CheckUpdate.

FIG. 53 is a flowchart of the procedural steps of CheckUpdate S5106 of this embodiment. In step S5301, the current version of the system, V1 is obtained. In step S5302 a check is made to determine if the version V2 can be obtained from the website. If not, the process terminates and returns. If so, a check is made to determine if version V2 is greater than V1. If not, the process terminates and returns. If so, a check is made in step S5304, to see if user a confirmation is required, in which case after confirming from the user, the latest version is downloaded in step S5305 and the system updates itself in step S5306 and the process returns.

Figure 54:
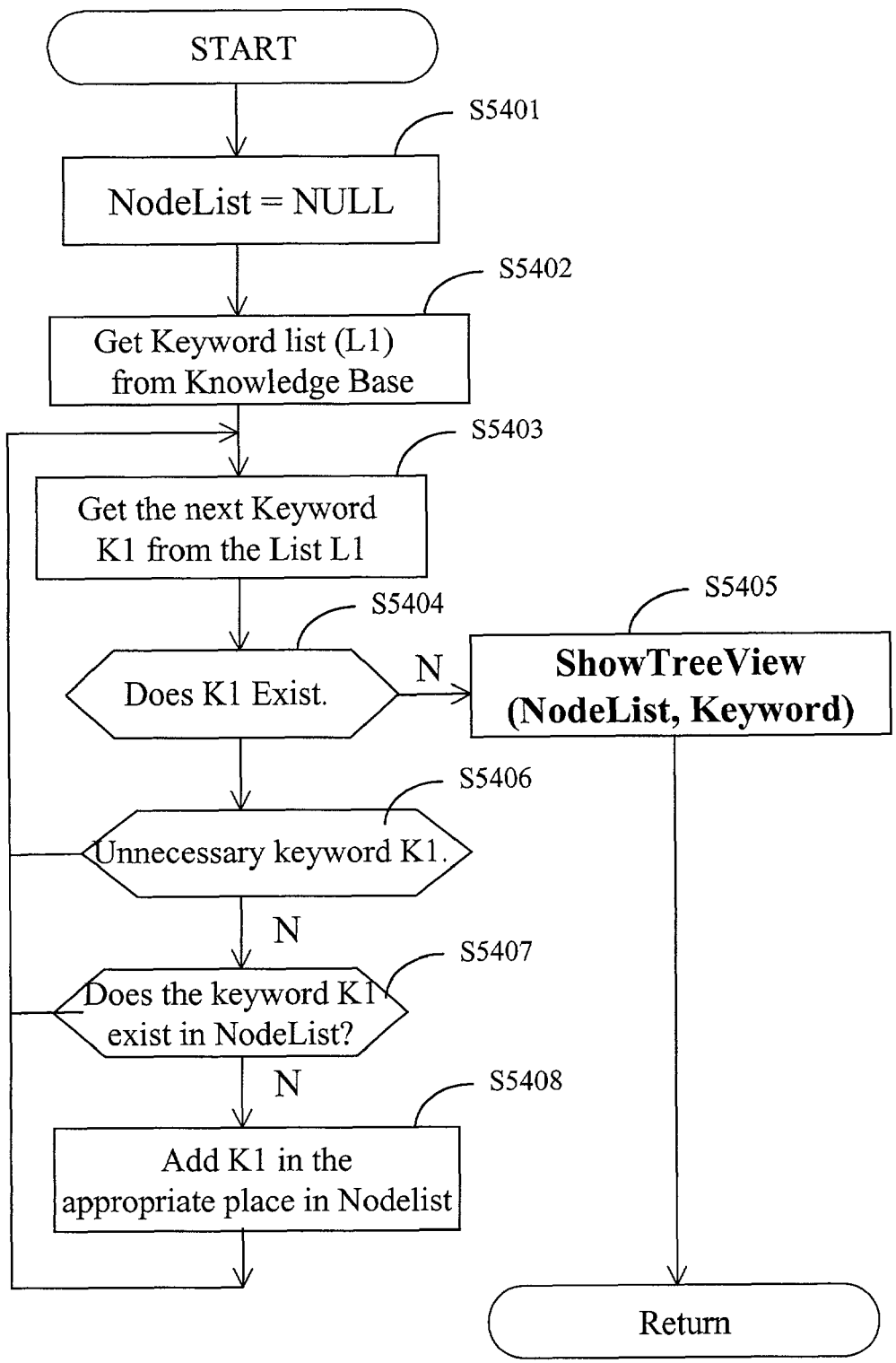
FIG. 54 is a flowchart of the procedural steps of Sort by keywords.

FIG. 54 is a flowchart of the procedural steps of Sort by keywords S1307 of this embodiment. Initially in step S5401 the NodeList is set to NULL. In step S5402, the list of all keywords L1, is retrieved from the knowledge base. In step S5403, the next keyword K1 is fetched from the list of keywords L1. A check is made in step S5404 to determine if K1 exists. If so, a check is made in step S5406 to determine if it is a required keyword. If not, the control goes back to step S5403. If so, a check is made in step S5407 to determine if the keyword K1 already exists in the NodeList. If so, the control goes back to step S5403. If not, the keyword K1 is added at the appropriate place in the NodeList in step S5408 and control goes back to step S5403 to fetch the next keyword from the list. If K1 does not exist in step S5404, implying that all the keywords in the NodeList were processed and hence in step S5405, ShowTreeView (NodeList, Type) is executed with Type=Keyword, whose details are explained in FIG. 55 and the example results are shown in FIG. 40, wherein the keywords in the NodeList are displayed in the sorted order.

Figure 55:
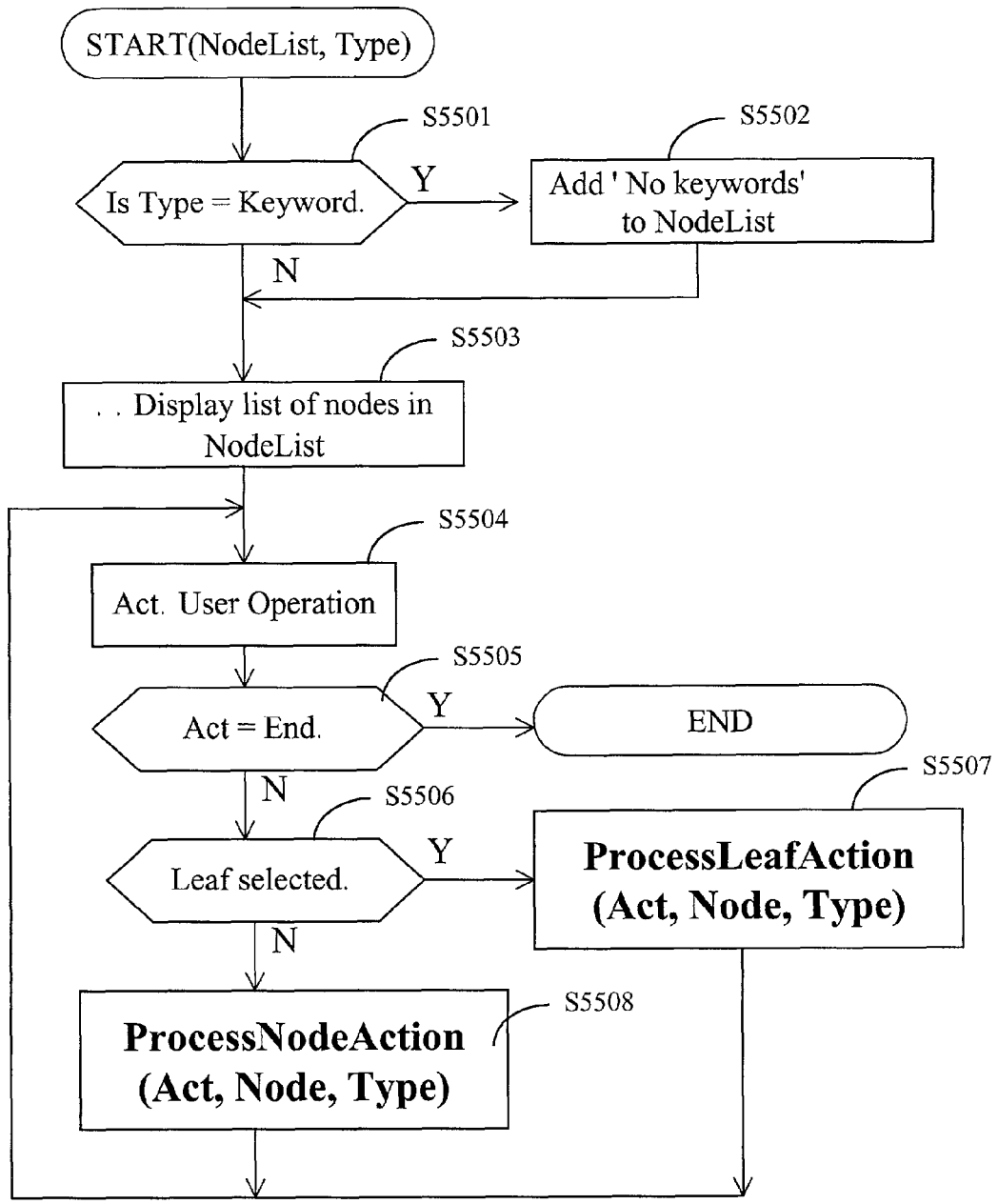
FIG. 55 is a flowchart of the procedural steps of ShowTreeView.

FIG. 55 is a flowchart of the procedural steps of ShowTreeView S5405 of this embodiment. First in step S5501, a check is made to determine if Type is Keyword. If so, no keyword is added to the NodeList in step S5502. In step S5503, the list of nodes in the NodeList is displayed. In step S5504, the process waits for user operation or Action Act and in step S5505, a check is made to determine if the Act is End, in which case the process returns. If not, a check is made in step S5506 to determine if a Leaf was selected. If so ProcessLeafAction (Act, Node, Type) is executed in step S5507. If not, ProcessNodeAction(Act, Node, Type) is executed in step S5508 and the process returns to step S5504.

Figure 56:
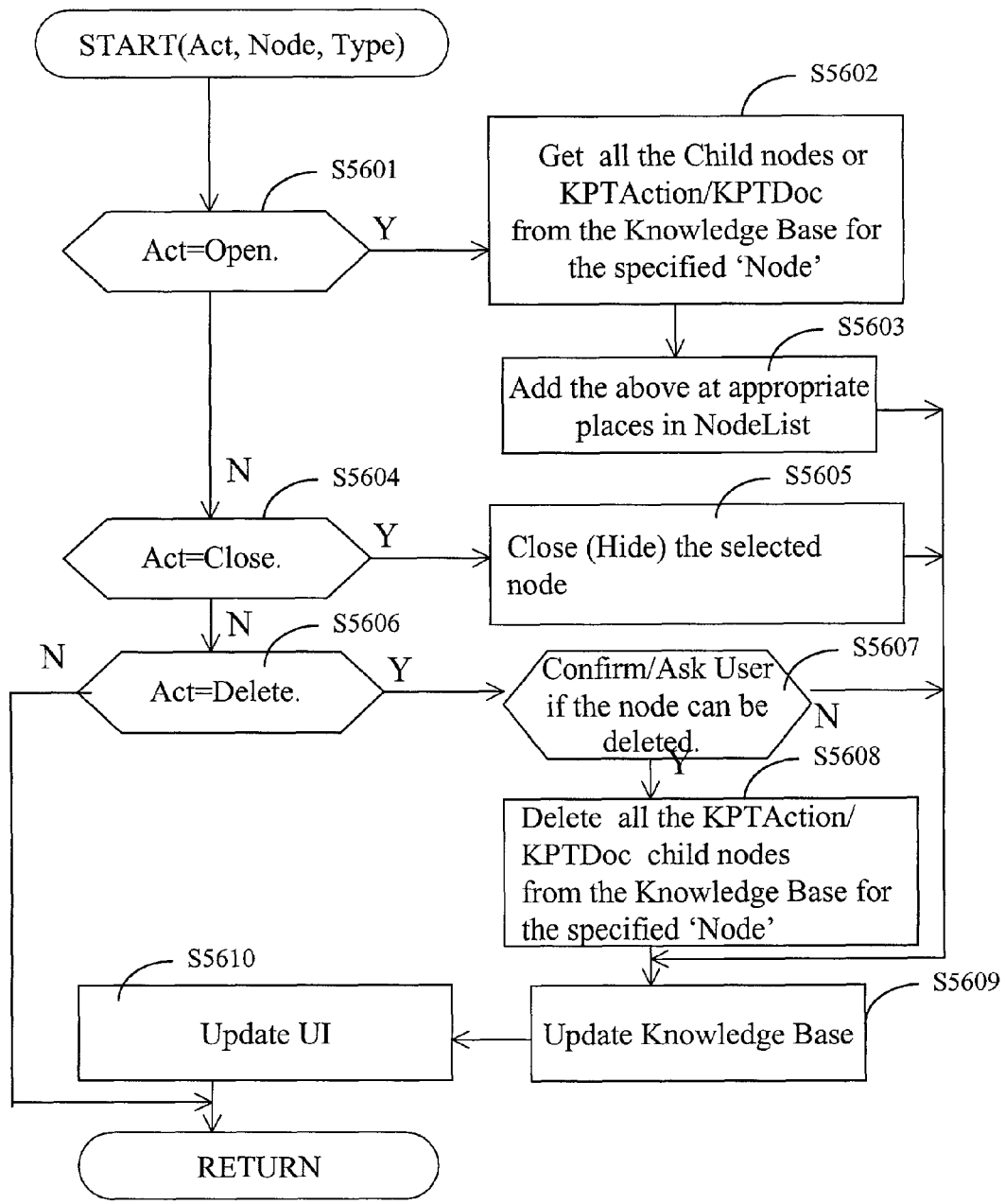
FIG. 56 is a flowchart of the procedural steps of ProcessLeafAction.

FIG. 56 is a flowchart of the procedural steps of ProcessLeafAction(Act, Node, Type) of step S5507 of this embodiment. A check is made in step S5601, if the Act is Open. If so, all the child nodes and all the actions KPTAction and associated KPTDocument are fetched in step S5602, from the knowledge base for the selected node and added to the NodeList at appropriate places in step S5603 and continues to step S5609. If not, a check is made in step S5604, if the Act is Close. If so, all the child nodes below the selected node are closed or hidden in step S5605 and continues to step S5609. If not, a check is made to determine if the Act is Delete. If so, a confirmation is sought from the user, if required, in step S5607 and if delete is not to be performed, it continues to step S5609, else all the KPTAction and associated KPTDocument for all the child nodes below the selected node is deleted from the knowledge base in step S5608 and continues to step S5609. In step S5609, the knowledge base is updated based on the type of action performed and in step S5610 the user interface is updated to reflect the updates made in the knowledge base. If in step S5606, the action is not Delete, the process returns.

Figure 57:
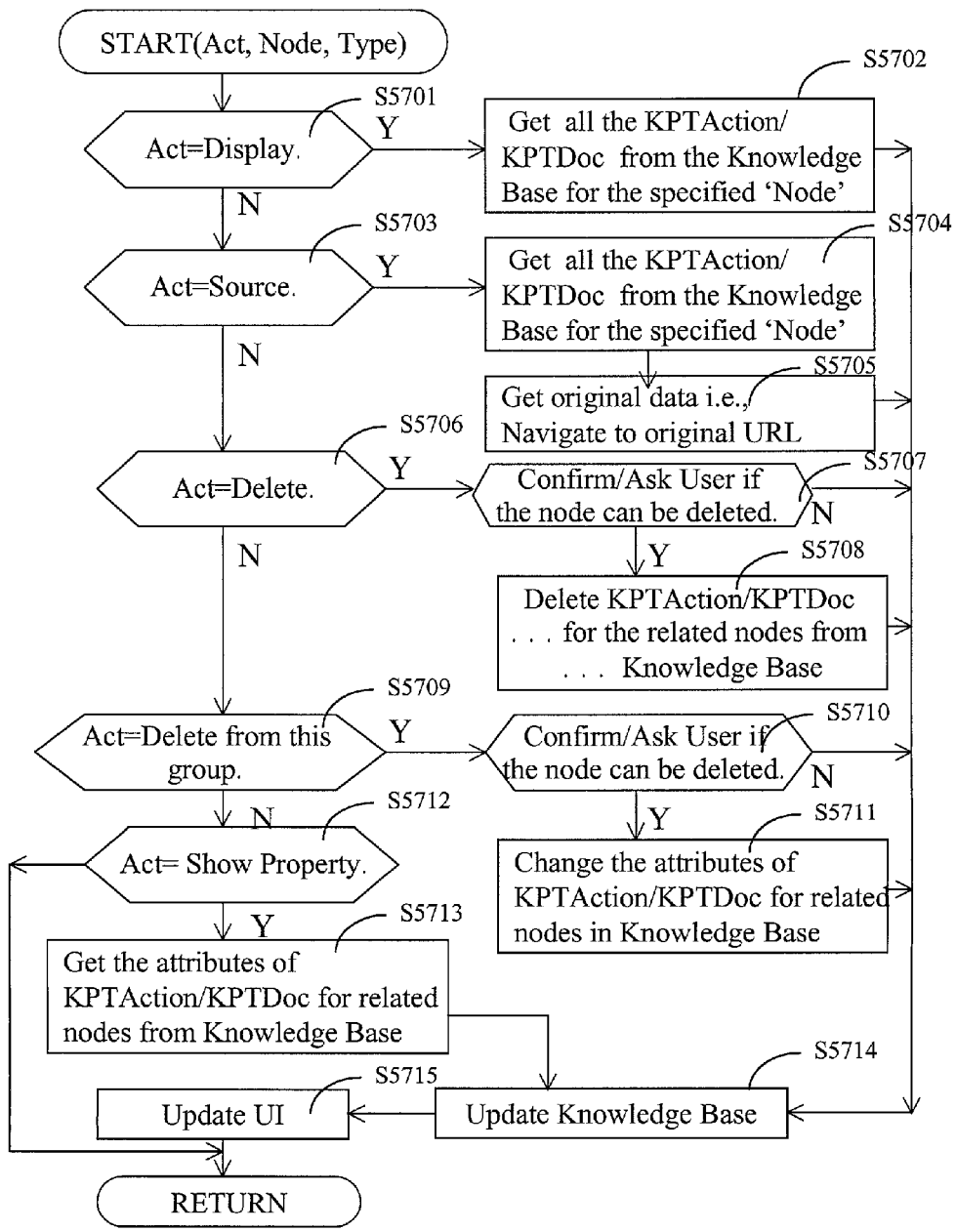
FIG. 57 is a flowchart of the procedural steps of ProcessNodeAction.

FIG. 57 is a flowchart of the procedural steps of ProcessNodeAction (Act, Node, Type) of step S5508 of this embodiment. A check is made in step S5701 to determine if the Act is Display (i.e., to display the contents of the stored page), if contents are stored, otherwise, the original page needs to be displayed. If so, KPTAction and associated KPTDocument are fetched from the knowledge base for the selected node and added to the NodeList at appropriate place in step S5702 and continues to step S5714. If not, a check is made in step S5703 to determine if the Act is Source (i.e., to display the contents of the original page). If so, the KPTAction and associated KPTDocument are fetched from the knowledge base for the selected node in step S5704 and fetches the contents of the page from the original location or URL in step S5705 and continues to step S5714. If not, a check is made to determine if the Act is Delete in step S5706. If so, a confirmation is sought from the user, if required, in step S5707 and if delete is not to be performed, it continues to step S5714, else in step S5708, the associated KPTAction and KPTDocument are deleted from the knowledge base and continues to step S5714. If not, a check is made in step S5709 to determine if the Act is Delete from this group. If so, a confirmation is sought from the user, if required, in step S5710 and if delete is not to be performed, it continues to step S5714, else in step S5711, the associated attributes or properties of KPTAction and KPTDocument are modified in the knowledge base and continues to step S5714. If not, a check is made in step S5712 to determine if the Act is Show Property. If so, the associated properties or attributes of the KPTAction and KPTDocument for the associated node are fetched from the knowledge base in step S5713 and continues to step S5714. In step S5714, the knowledge base is updated based on the type of action performed and in step S5715 the user interface is updated to reflect the updates made in the knowledge base. If in step S5712, the action is not Show Property, the process returns.

Figure 58:
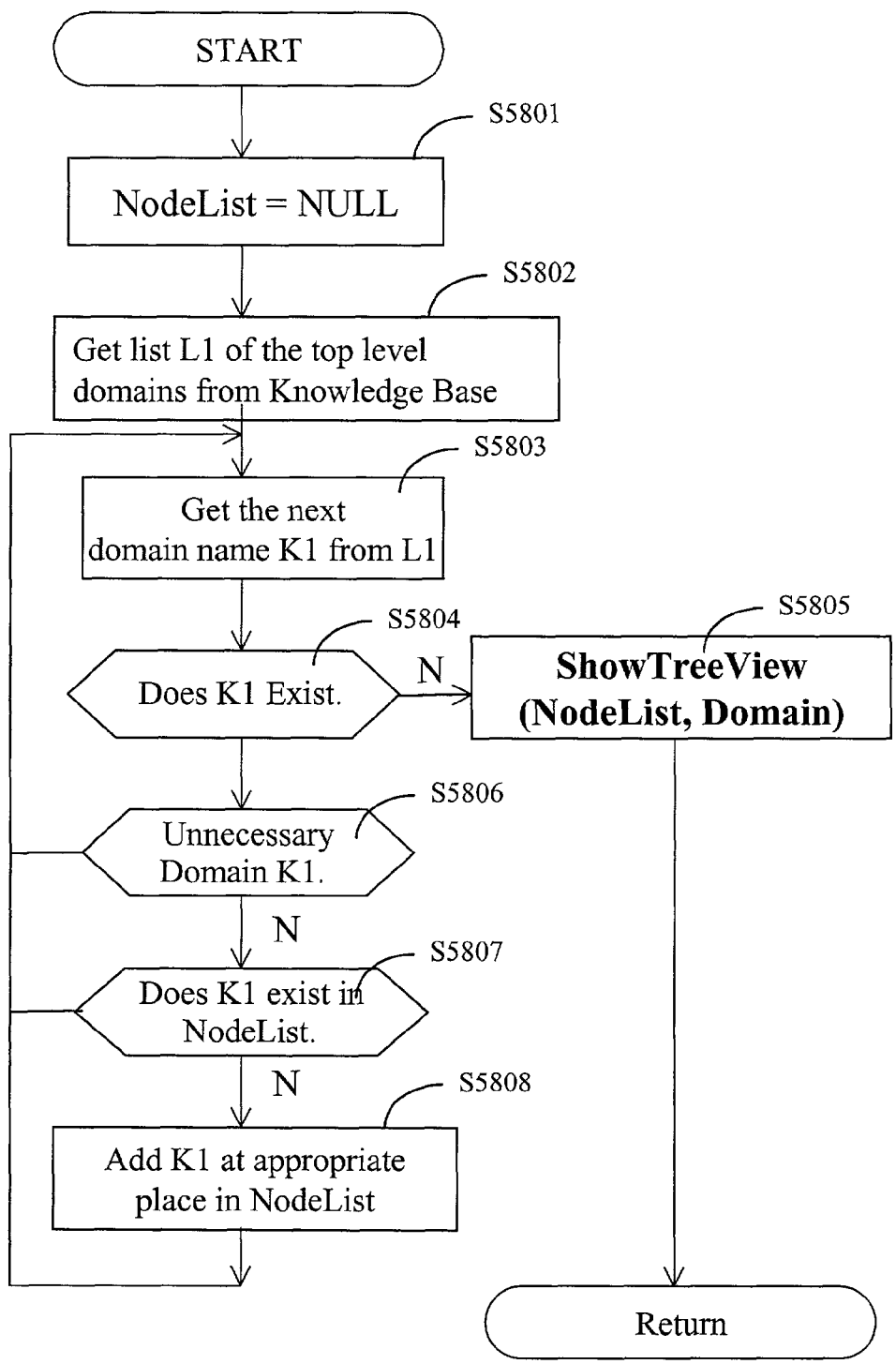
FIG. 58 is a flowchart of the procedural steps of Sort by Domain.

FIG. 58 is a flowchart of the procedural steps of Sort by Domain step S1306 of this embodiment. Initially the NodeList is set to NULL in step S5801. In step S5802, the entire top-level domain list L1 is fetched from the knowledge base. In step S5803, the next domain name K1 in list L1 is fetched. A check is made in step S5804 to determine if the domain name K1 exists. If so, a check is made in step S5806 to determine if the domain name K1 is unnecessary or not required domain. If so, it continues to step S5803 to fetch the next domain name from the list. If not, a check is made in step S5807 to determine if the K1 is already present in L1, if so, it continues to step S5803 otherwise the domain name K1 is added to the NodeList at the appropriate place in step S5808 and then continues to step S5803. In step S5804, if K1 does not exist, implying that all the items in the list L1 have been processed, FIG. 55 ShowTreeView(NodeList, Type), with Type=Domain is executed in step S5805 and the example results are shown in FIG. 39, wherein the Domains in the NodeList are displayed in the sorted order.

Figure 59:
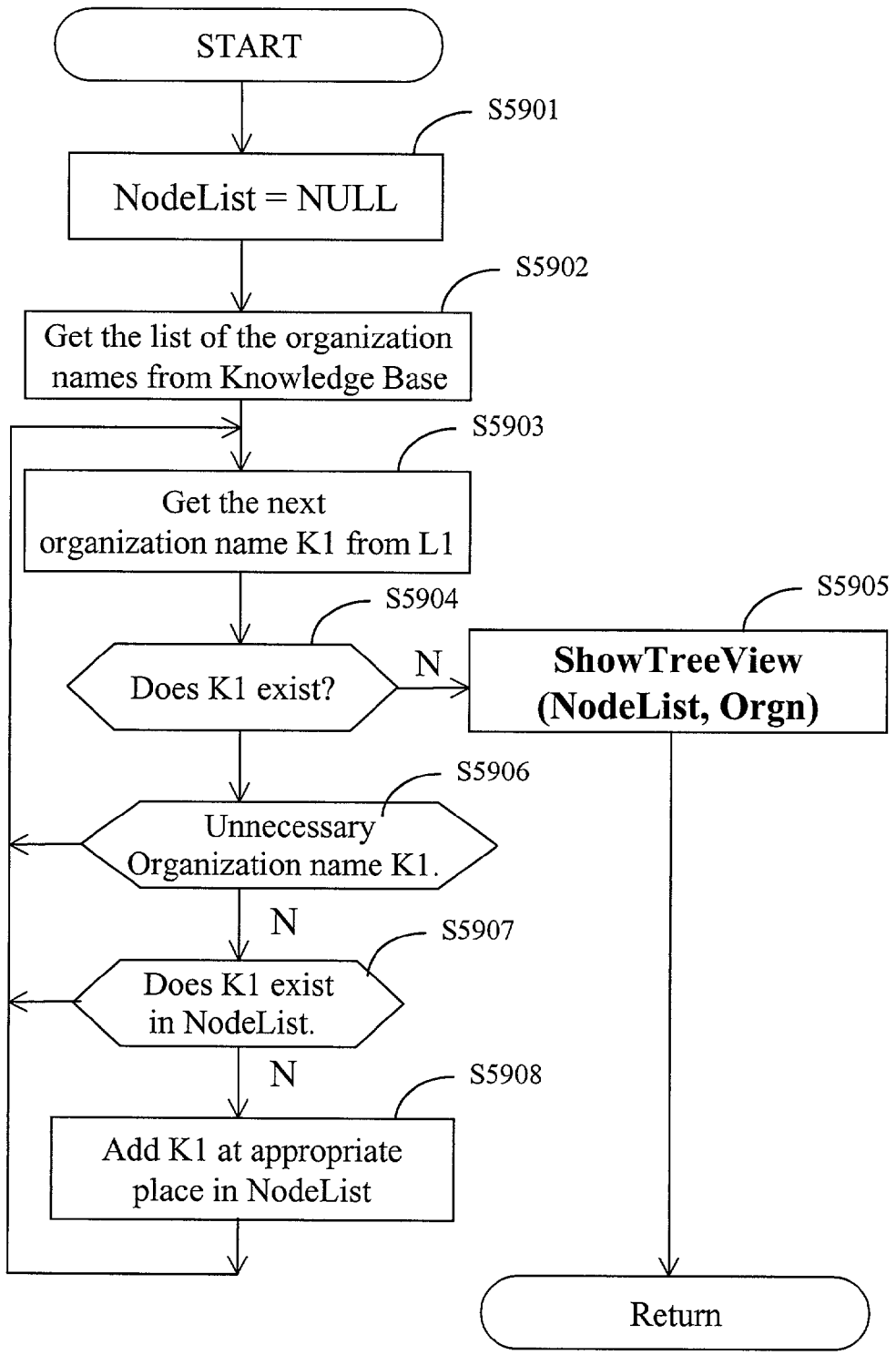
FIG. 59 is a flowchart of the procedural steps of Sort by Organization.

FIG. 59 is a flowchart of the procedural steps of Sort by Organization step S1303 of this embodiment. Initially the NodeList is set to NULL in step S5901. In step S5902, list of all the organizations L1 are fetched from the knowledge base. In step S5903, the next organization name K1 in list L1 is fetched. A check is made in step S5904 to determine if the organization name K1 exists. If so, a check is made in step S5906 to determine if the organization name K1 is unnecessary or not required entry. If so, it continues to step S5903 to fetch the next organization name from the list. If not, a check is made in step S5907 to determine if the K1 is already present in L1. If so, it continues to step S5903 otherwise the organization name K1 is added to the NodeList at the appropriate place in step S5908 and then continues to step S5903. In step S5904, if K1 does not exist, implying that all the items in the list L1 have been processed, FIG. 55 ShowTreeView (NodeList, Type), with Type=Orgn is executed in step S5905 and the example results are shown in FIG. 38, wherein the Organizations in the NodeList are displayed in the sorted order.

Figure 60:
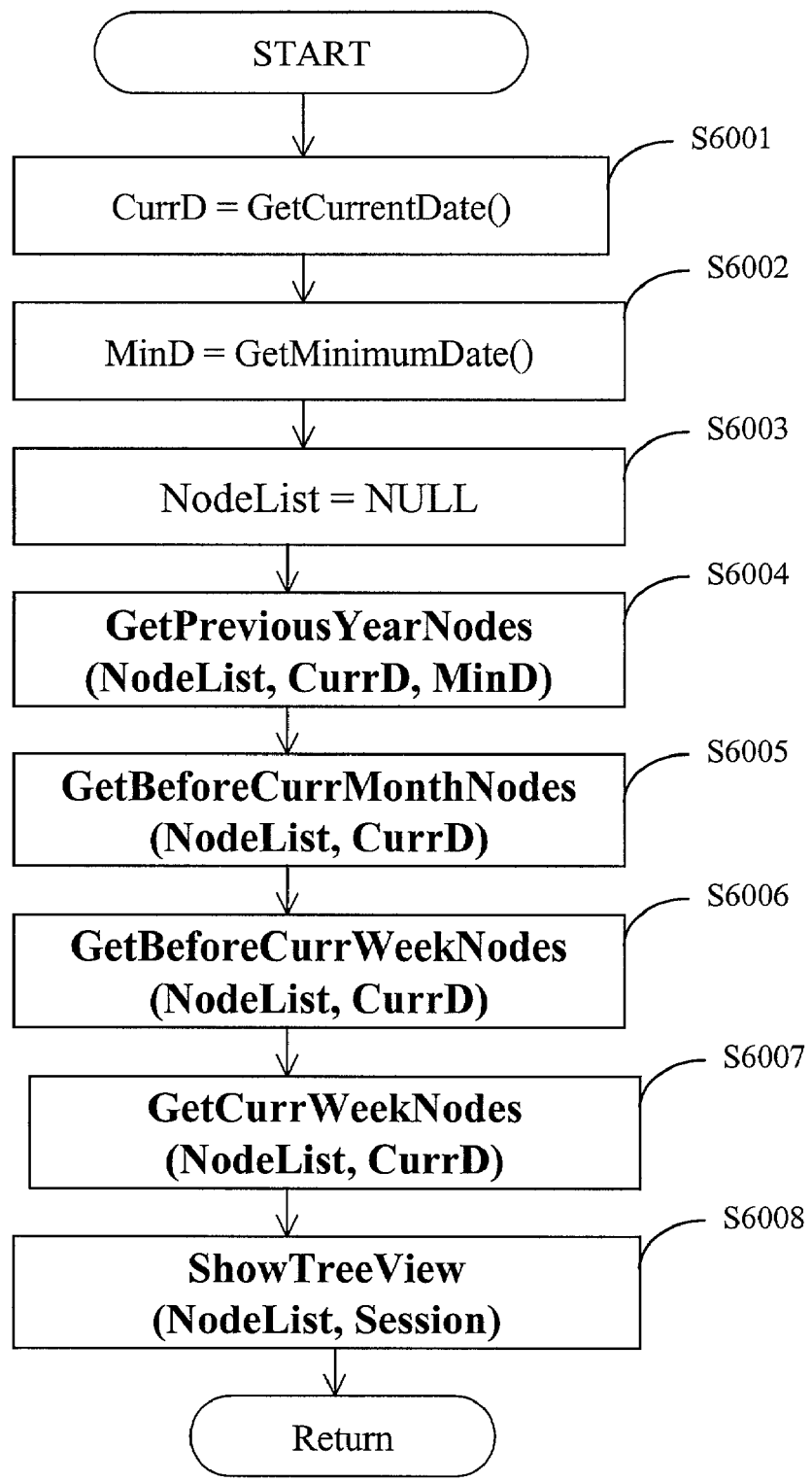
FIG. 60 is a flowchart of the procedural steps of For Each Session, Sort KPTAction by Time.
Figure 61:
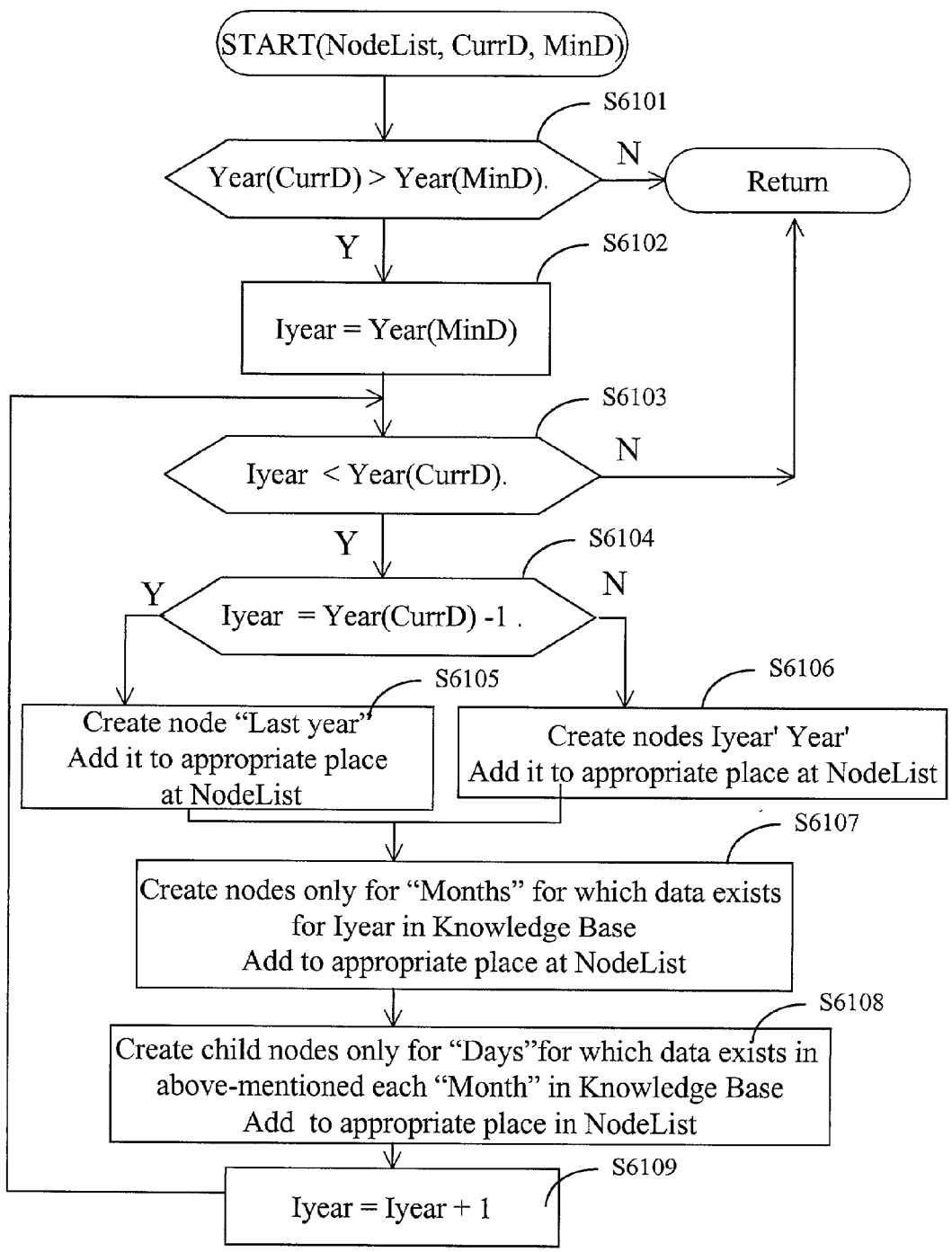
FIG. 61 is a flowchart of the procedural steps of GetPreviousYearNodes.
Figure 62:
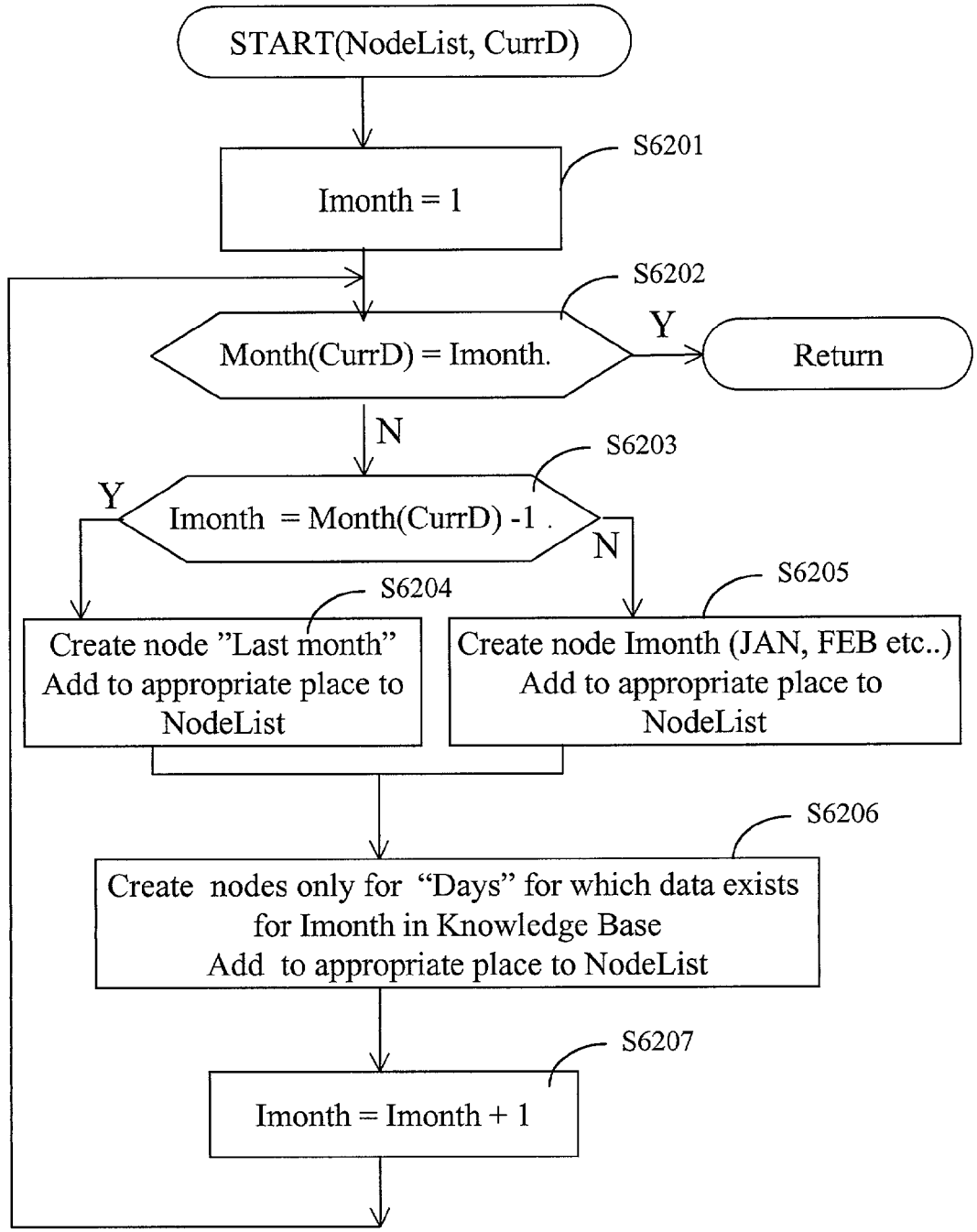
FIG. 62 is a flowchart of the procedural steps of GetBeforeCurrMonthNodes.
Figure 63:
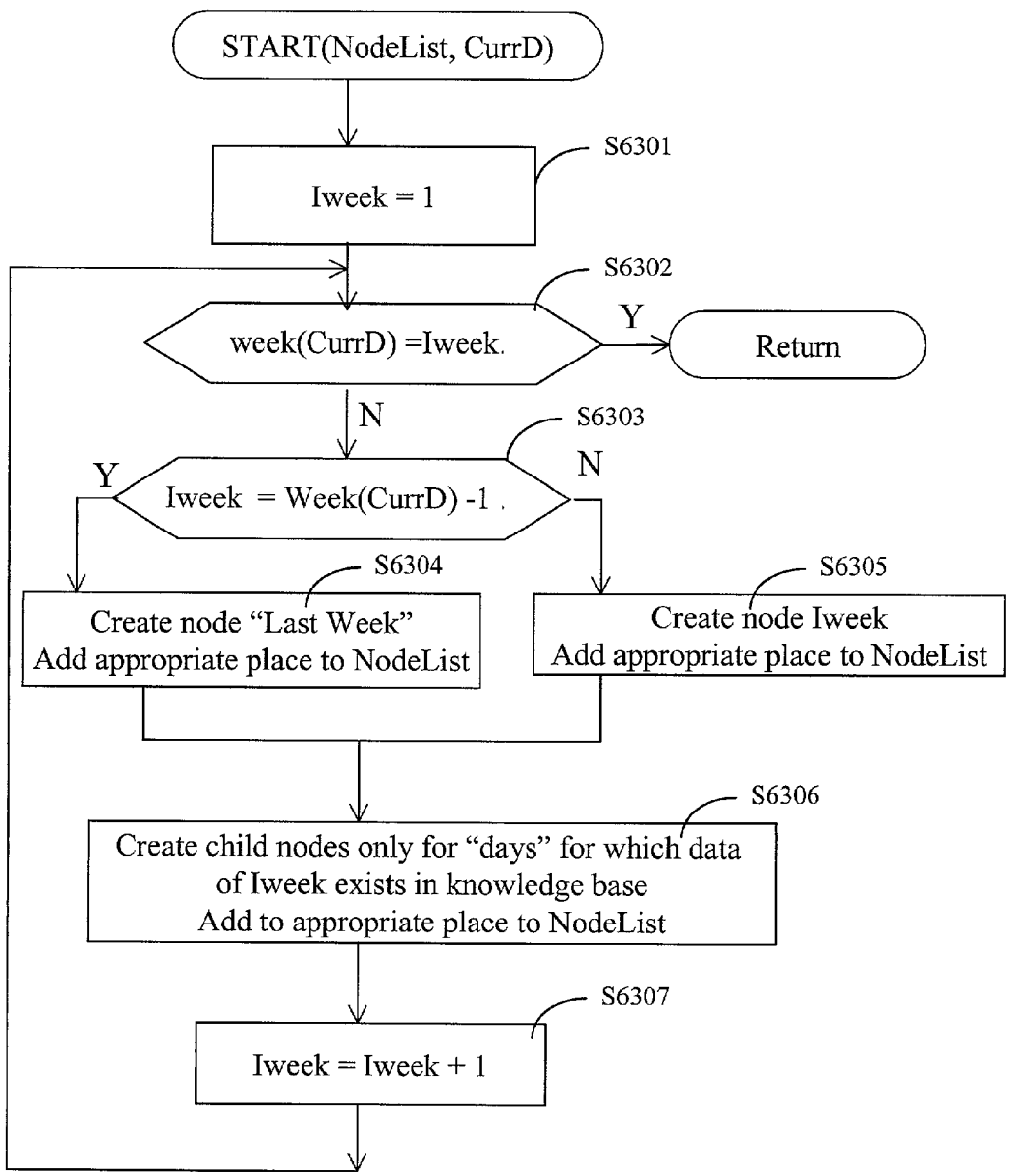
FIG. 63 is a flowchart of the procedural steps of GetbeforeCurrWeekNodes.
Figure 64:
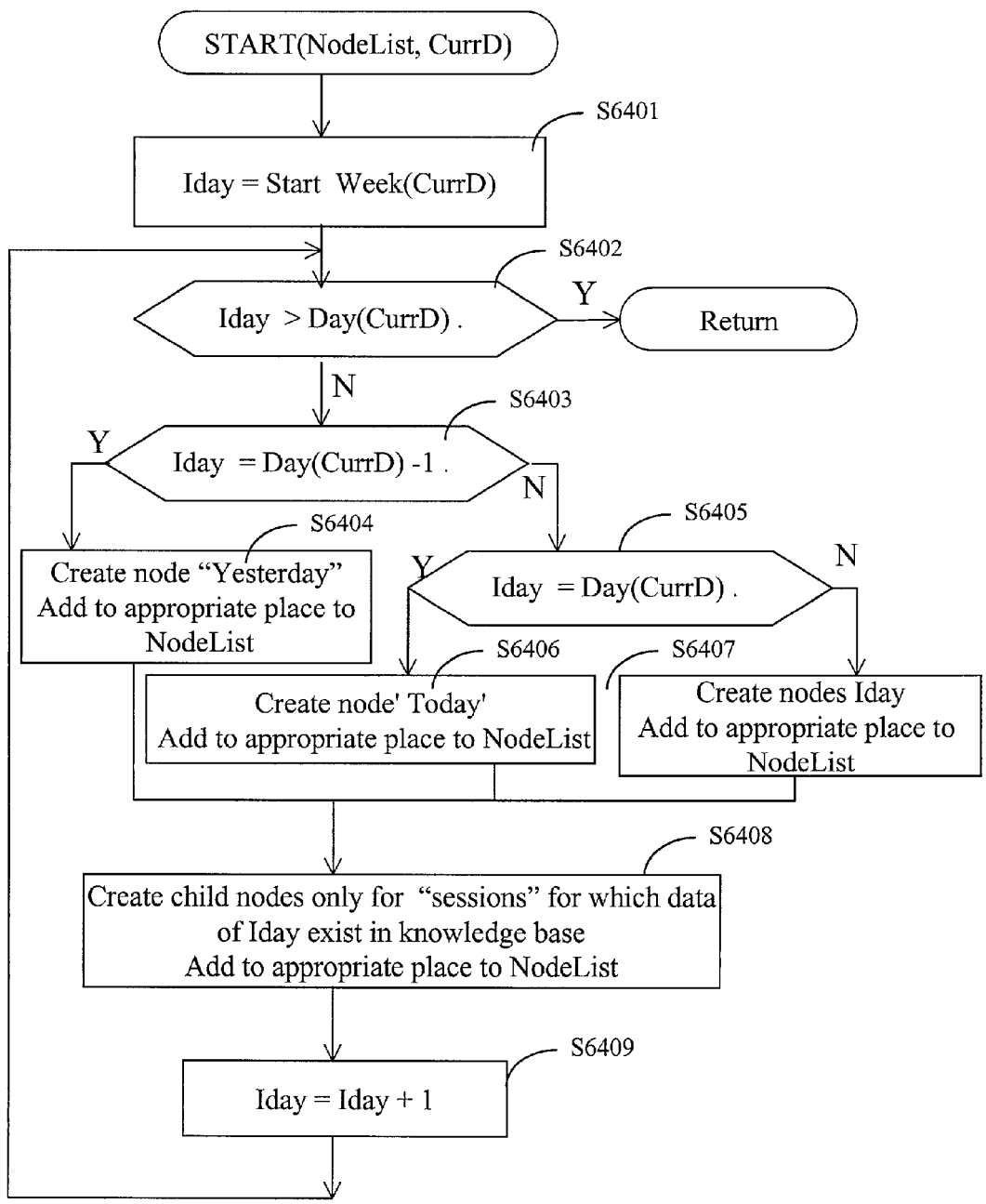
FIG. 64 is a flowchart of the procedural steps of GetCurrWeekNodes.

FIG. 60 is a flowchart of the procedural steps of For Each Session, Sort KPTAction by Time, step S1202 of this embodiment. Initially, in step S6001, the CurrD is set to GetCurrentDate( ), which the current date of the system. In step S6002, the MinD is set to GetMinimumDate( ), which the minimum or earliest date for which information exists in the knowledge base. In step S6003, the NodeList is set to NULL. In step S6004, GetPreviousYearNodes(NodeList, CurrD, MinD) as detailed in FIG. 61 is executed. In step S6005, GetBeforeCurrMontNodes(NodeList, CurrD) as detailed in FIG. 62 is executed. In step S6006, GetBeforeCurrWeekNodes (NodeList, CurrD) as detailed in FIG. 63 is executed. In step S6007, GetCurrWeekNodes(NodeList, Curr D) as detailed in FIG. 64 is executed. In step S6008, ShowTreeView (NodeList, Type) with Type=Session is executed as detailed in FIG. 55 and the example results are shown in FIG. 37, wherein the Sessions in the NodeList are displayed in sorted order.

FIG. 61 is a flowchart of the procedural steps of GetPreviousYearNodes (NodeList, CurrD, MinD) of step S6004 of this embodiment. A check is made in step S6101 to determine if Year(CurrD)>Year(MinD) (i.e., the year part of CurrD is greater than the year part of MinD). If not, the process returns. If so, Iyear is set to Year(MinD) (i.e., year part of MinD) in step S6102. In step S6103, a check is made to determine if Iyear<Year(CurrD) (i.e., Iyear is less than the year part of CurrD). If not, the process returns. If so, a check is made in step S6104 to determine if Iyear is equal to Year(CurrD)−1. If so, a node called 'Last year' is created and added to the appropriate place in NodeList in step S6105. If not, nodes for that year (i.e., Iyear) is created (e.g., 1999 etc.) and added to appropriate place in NodeList in step S6106. In either case, the step S6107 is executed, wherein nodes are created only for 'Months' (e.g., January, June etc.) for which data exists for the specified Iyear in the knowledge base and added to appropriate places in NodeList. In step S6108, nodes are created only for 'Days' (e.g., 1, 3, 27 etc.) for each of the above 'Months' for which data exists in the knowledge base and are added to appropriate places in NodeList. In step S6109, Iyear is incremented and the process continues to step S6103, till Iyear becomes greater than or equal to year part of CurrD, at which point the process returns.

FIG. 62 is a flowchart of the procedural steps of GetBeforeCurrMonthNodes (NodeList, CurrD) of step S6005 of this embodiment. Initially, in step S6201, Imonth is set to 1. A check is made in step S6202 to determine if Month(CurrD) (i.e., month part of CurrD) is equal to Imonth. If so, the process returns. If not, a check is made in step S6203 to determine if the values of Imonth and Month(CurrD)−1 are equal. If so, step S6204 is executed in which, a node called 'Last month' is created and added to appropriate place in NodeList. If not, step S6205 is executed in which, the node with Month name (e.g., Jan or Jun etc.) is created and added to appropriate place in NodeList. In either case, after completion, step S6206 is executed, wherein nodes are created only for 'Days' (e.g., 1, 3, 27 etc.) for each of the above 'Months' for which data exists in the knowledge base and are added to appropriate places in NodeList. In step S6207, Imonth is incremented and the process continues to step S6202, till Imonth is equal to the month part of CurrD, at which point the process returns.

FIG. 63 is a flowchart of the procedural steps of GetbeforeCurrWeekNodes (NodeList, CurrD) of step S6006 of this embodiment. Initially, in step S6301, Iweek is set to 1. A check is made in step S6302 to determine if Week(CurrD) (i.e., week part of CurrD) is equal to Iweek. If so the process returns. If not, a check is made in step S6303 to determine if the values of Iweek and Week(CurrD−1) are equal. If so, step S6304 is executed in which, a node called "Last Week" is created and added to appropriate place in NodeList. If not, step S6305 is executed in which the node with Iweek is created (e.g., 1st week, 2nd week etc.) and added to appropriate place to NodeList. In either case after completion, step S6306 is executed, wherein nodes are created only for 'Days' (e.g., 1, 3, 27 etc.) for each of the above 'Weeks' for which data exists in the knowledge base and are added to appropriate places in NodeList. In step S6307, Iweek is incremented and the process continues to step S6302, till Iweek is equal to the week part of CurrD, at which point the process returns.

FIG. 64 is a flowchart of the procedural steps of GetCurrWeekNodes (NodeList, CurrD) of step S6007 of this embodiment. Initially, in step S6401, Iday is set to StartofWeek(CurrD) (i.e., the starting day of the current week). A check is made in step S6402 to determine if Iday is greater than the Day(CurrD) (i.e., the day part of the CurrD). If so, the process returns. If not, in step S6403, a check is made to determine if Iday is equal to Day(CurrD)−1. If so, step S6404 is executed in which, a node called 'Yesterday' is created and added to appropriate place in NodeList and continues to step S6408. If not, step S6405 is executed in which, a check is made to determine if Iday is equal to Day(CurrD) (i.e., current day). If so, step S6406 is executed in which, a node called 'Today' is created and added to appropriate place in NodeList and continues to step S6408. If not, nodes are created only for 'Days' (e.g., 1, 3, 4 etc.) for which data exists in the knowledge base and added to appropriate places in NodeList and continues to step S6408. In step S6408, child nodes are created for sessions of day(s) for which data exists in knowledge base and added to appropriate places to NodeList. Finally in step S6409, Iday is incremented by 1 and the process continues to step S6402, till Iday>Day(CurrD), at which point the process returns.

Figure 65:
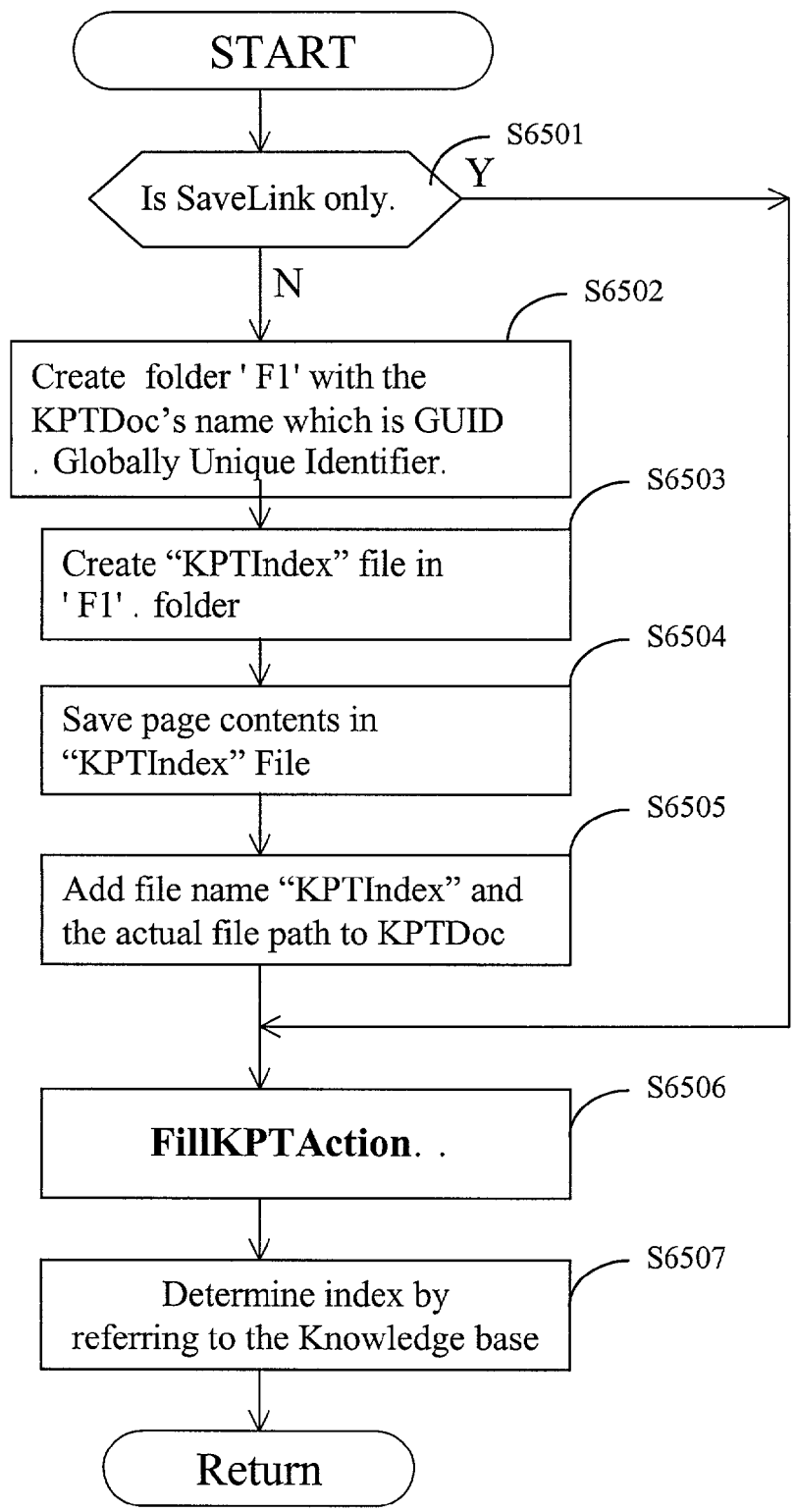
FIG. 65 is a flowchart of the procedural steps of steps S1510, S1512 SaveFileContents.

FIG. 65 is a flowchart of the procedural steps of steps S1510, S1512 SaveFileContents ( ) of this embodiment. A check is made in step S6501 to determine if the contents to be saved is SaveLink only. If so, the process continues to step S6506. In step S6502, a folder F1 with the name based on the KPTDocument's name, which is a Globally unique identifier (GUID) is created, which ensures that the folder to be created is unique within and across the local system. In step S6503, a file called KPTIndex is created in the folder created in previous step. The actual page contents (i.e., HTML text) are saved to the file created in the to previous step. The fully qualified file name (i.e., the folder name and the file name) is stored as the physical URL location of the KPTDocument. In step S6506, FillKPTAction( ) is executed which is explained in detail in FIG. 66 and the other required indices are determined by referring to the knowledge base in step S6507 and the process returns.

Figure 66:
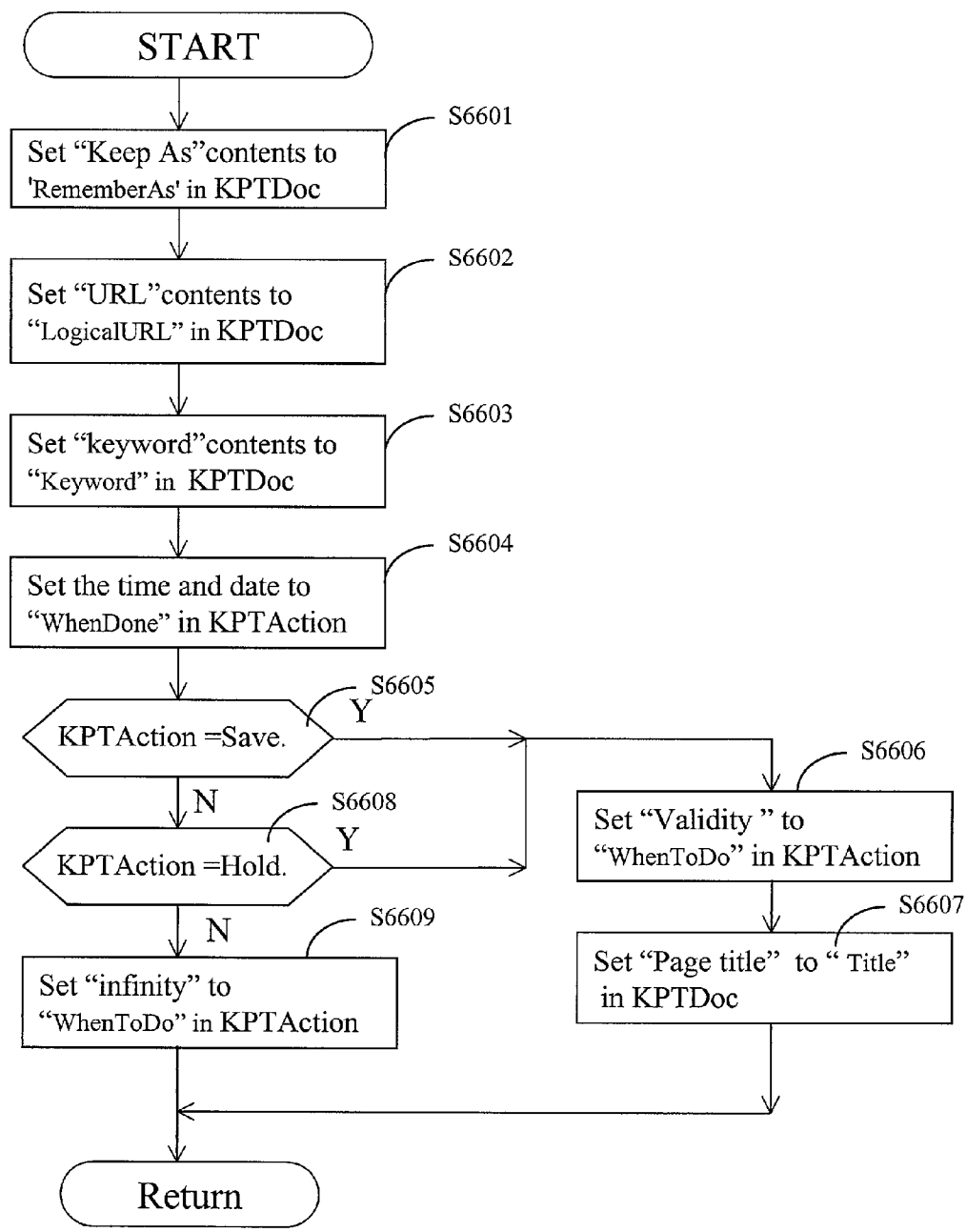
FIG. 66 is a flowchart of the procedural steps of FillKPTAction.

FIG. 66 is a flowchart of the procedural steps of S6506, FillKPTAction( ) of this embodiment. In step S6601, the contents of 'Keep As' are set to 'Remember As' field of KPTDocument. In step S6602, the contents of 'URL' are set to 'LogicalURL' field of KPTDocument. In step S6603, the contents of 'keyword' are set to 'Keyword' field of KPTDocument. In step S6604, the time and date are set to 'WhenDone' field of KPTAction. In step S6605, a check is made to determine if KPTAction is Save. If so, step S6606 is executed. If not, a check is made in step S6608 to determine if KPTAction is Hold. If so, in step S6606, the 'Validity' is set to 'WhenToDo' field of KPTAction and in step S6607, 'Page title' is set to 'Title' of KPTDocument and process returns. If not, step S6609 is executed, in which the 'WhenToDo' field of KPTAction is filled with value 'infinity' and the process returns.

Figure 50:
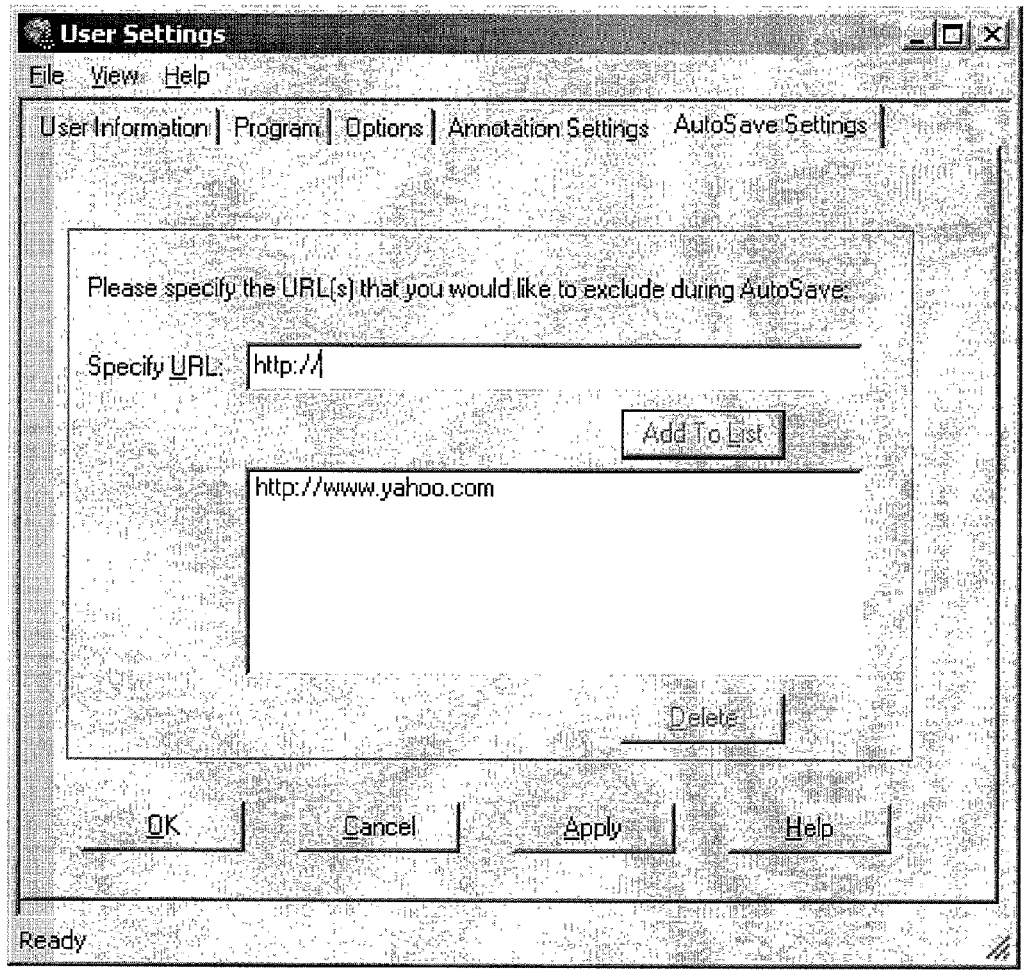

Thus, when the user selects Quick Save, this embodiment does not ask the user for file name or destination folder location and the actual process of saving the information be it page contents, annotated contents, page contents plus including all the links below them are stored in a one-touch operation. Also the same information be it a page or link can be stored multiple times (i.e., store the contents of the same link as many times as the user wishes), without ever specifying the filename, and still be able to retrieve them easily. This is especially useful, for users to keep track of the changes in the contents of the same web page. When user selects Save, user interface like FIG. 25 is shown to obtain optionally information regarding the validity or time period for which the contents needs to be saved. When user selects Hold, user interface like FIG. 31 is shown to obtain optionally information regarding the validity or time period for which the contents needs to be held on to. The Save option is basically for storing the information for long range of time, just like storing it in a file cabinet and Hold option for a short period, (i.e., for transient information), which is required to be for say a week or for a few days (e.g., Event or Show information, Limited Time Offers, etc.). The important part of setting the validity or time period for the information in this embodiment is that it will automatically be deleted, after the validity time expires, thus eliminating the time-consuming clean up operations. The user can, of course, keep the information forever, by specifying the validity as Indefinite. Also, if Automatic Save has been selected then all the information are automatically stored by this embodiment but for the URL(s) which are to be executed as specified by user in FIG. 50, are stored without any user intervention.

Figure 67:
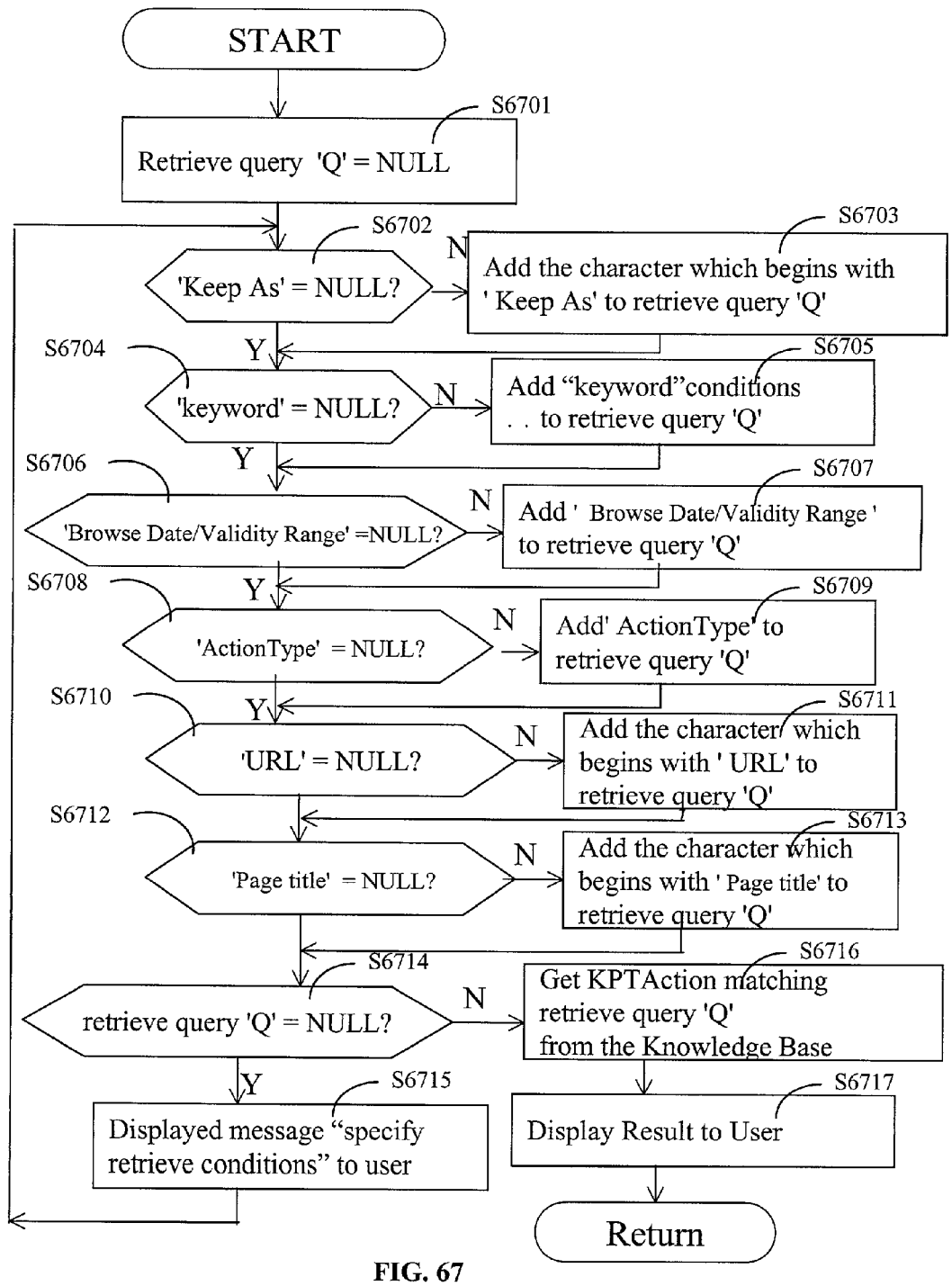
FIGS. 67 and 68 are flowcharts for processing the retrieve conditions and to fetch the appropriate information.

FIG. 41 is an example for User Interface of Search UI, displayed in step S1108. FIG. 67 is the flowchart for processing the retrieve conditions set in FIG. 41 and to fetch the appropriate information. In step S6701, Retrieve Query 'Q' is set to NULL. A check is made in step S6702 to determine if Keep As is NULL. If so, the input characters of keep As are set to Keep As of the Retrieve Query Q in step S6703 to retrieve the matching information starting with the given input and continues to step S6704. If not, a check is made in step S6704 is determine if keyword is NULL. If so, the input keyword is set to keyword of the Retrieve Query Q in step S6705 to retrieve the matching information and continues to step S6706. If not, a check is made in step S6706 to determine if Browse Date/Validity Range is equal to NULL. If so, the input information is set to Browse Date/Validity Range of Retrieve Query Q in step S6707 and continues to step S6708. If not, a check is made in step S6708 to determine if Action Type is null. If so, the input Action Type is set to Action Type of query Q in step S6709 and continues to step S6710. If not, a check is made in step S6710 to determine if input URL is null. If so, the input characters of URL are set to URL of the retrieve query Q in step S6711 to retrieve query Q to retrieve the matching information starting the given input and continues to step S6712. If not, a check is made in step S6712 to determine if the input Page tile is NULL. If so, the input characters of Page title is set to Page Title of the retrieve query Q in step S6713 to retrieve query Q to retrieve the matching information starting the given input and continues to step S6714. If not, a check is made in step S6714 to determine if retrieve query Q is NULL (i.e., if any of the conditions to find was specified). If so, step S6715 is executed in which an error message is displayed to the user and continues to step S6702. If not, step S6716 is executed to retrieve all the matching KPTAction and associated KPTDocument from the knowledge base for the input retrieve query Q and the results are displayed to the user in step S6717 and the function returns.

Figure 68:
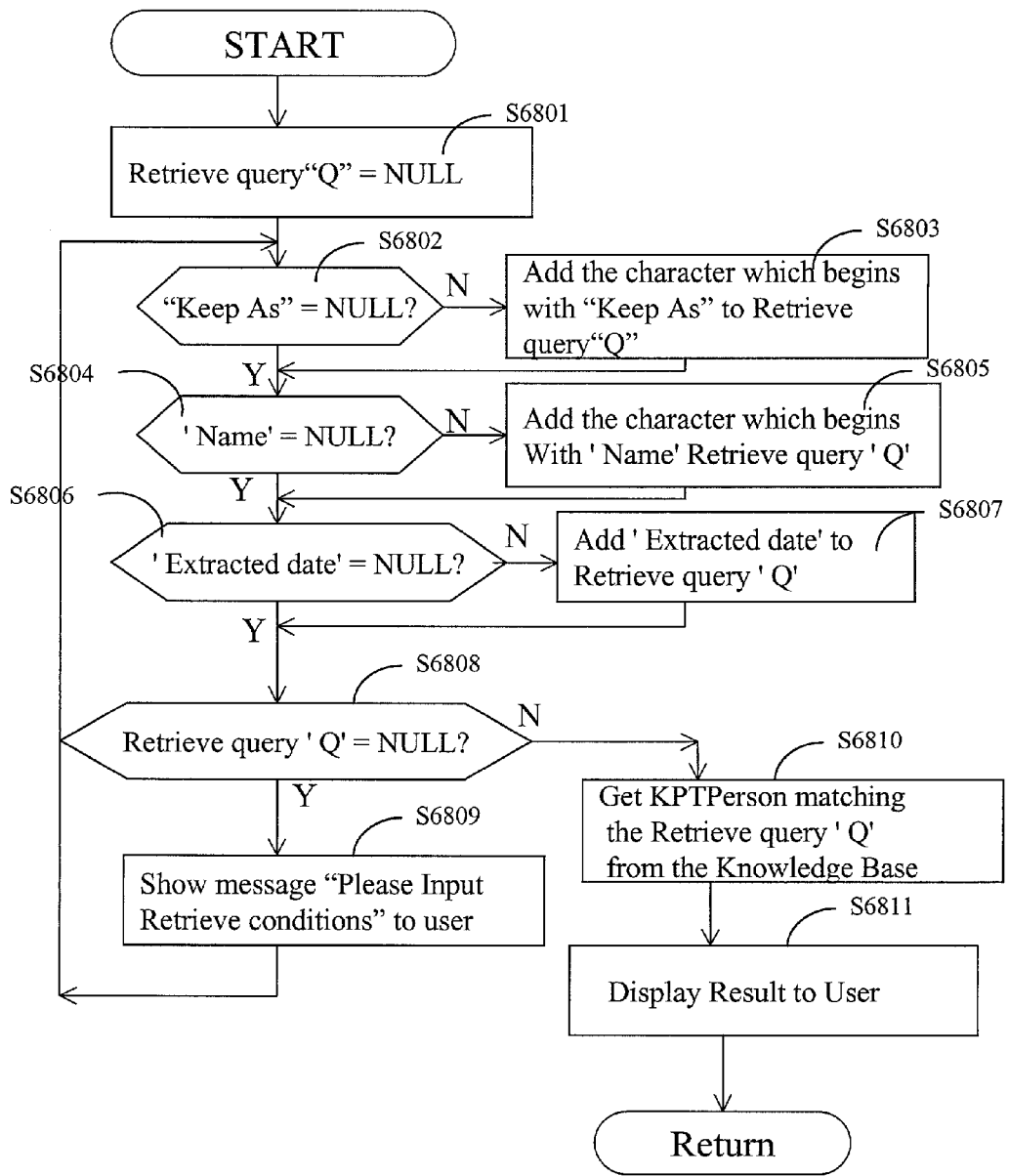

FIG. 43 is an example for User Interface of Search Extracted Data UI for UI displayed in step S1110. FIG. 68 is the flowchart for processing the retrieve conditions set in FIG. 43 and to fetch the appropriate information. In step S6801, Retrieve Query "Q" is set to NULL. A check is made in step S6802 to determine if Keep As is NULL. If so, the input characters of Keep As are set to Keep As of the Retrieve Query "Q" in step S6803 to retrieve the matching information starting with the given input and continues to step S6804. If not, a check is made in step S6804 is determine if Name is NULL. If so, the input Name is set to name of the Retrieve Query "Q" in step S6805 to retrieve the matching information and continues to step S6806. If not, a check is made in step S6806 to determine if Extracted date is NULL. If so, the input information is set to Extracted date of Retrieve Query "Q" in step S6807 and continues to step S6808. If not, a check is made in step S6808 to determine if Retrieve Query "Q" is NULL (i.e., if any of the conditions to find was specified). If so, step S6809 is executed in which an error message is displayed to the user and continues to step S6802. If not, step S6810 is executed to retrieve all the matching KPTAction and associated KPTPerson from the knowledge base for the input retrieve query Q and the results are displayed to the user in step S6811 and the function returns.

FIG. 69 shows example rules for determining the organization indices for a URL. As can be seen from the figure, the parameter, protocol, obvious address, page information is first removed from the URL. By referring to the Domain Knowledge base, whose example is shown in FIG. 23, the domain part of the URL is removed. The remaining LRL is then processed to obtain the Organization indices as shown.

FIG. 70 shows example rules for determining the domain indices for a LRL. As can be seen from the figure, the parameter, protocol, obvious address, page information is first removed from the URL. By referring to the Domain Knowledge base, whose example is shown in FIG. 23, the domain part of the URL is obtained.

Figure 71:
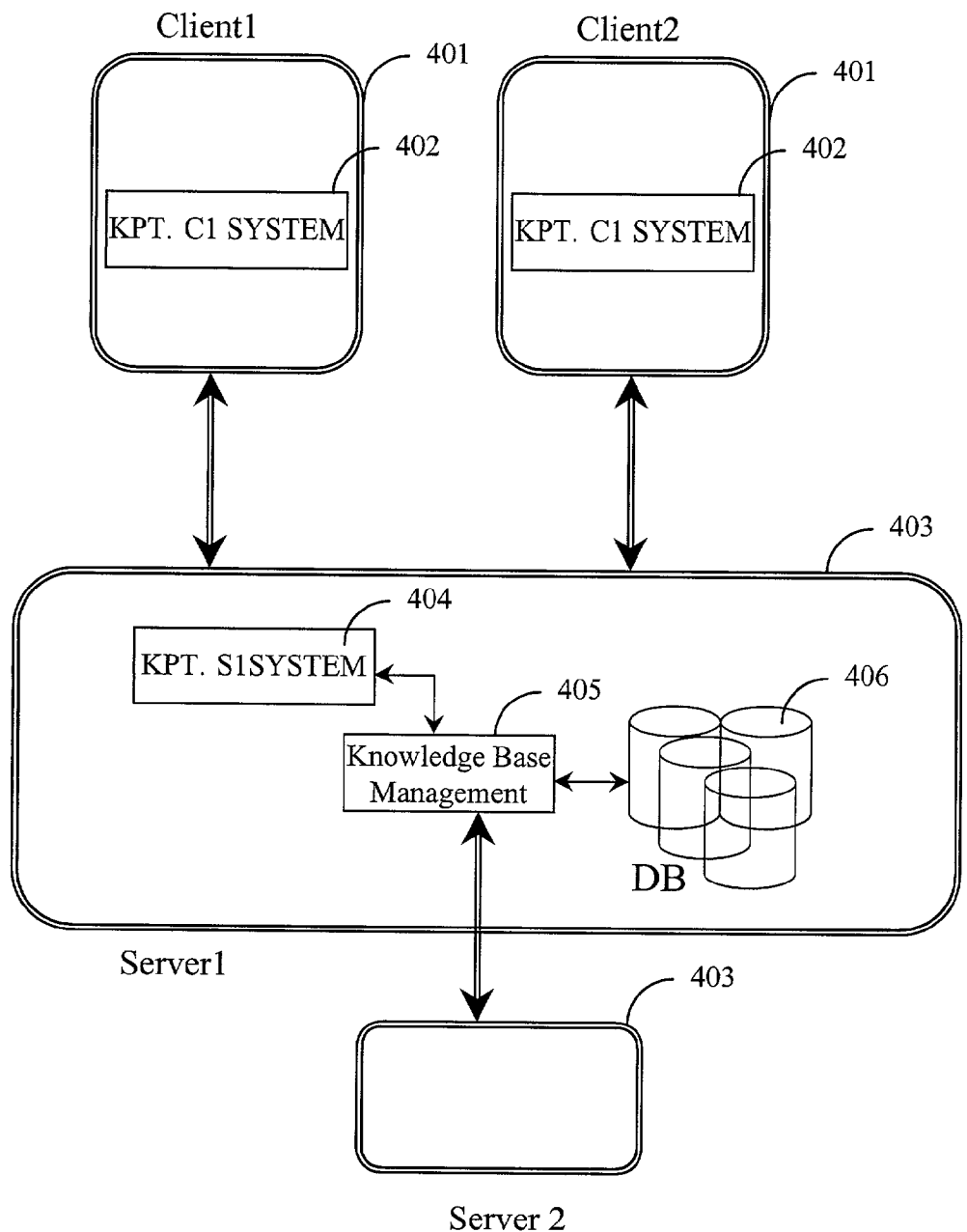
FIG. 71 shows a Client-Server type implementation.

FIG. 71 shows a Client-Server type implementation of this embodiment. The figure illustrates an example Client-Server type implementation of embodiment of FIG. 2. Multiple clients 401 have KPT C1 system 402, and communicate with Server 403. Server 403 is equipped with KPT S1 System 404, knowledge base management 405 and Database 406. Server 403 can also communicate with other servers to access their information stored in database, via knowledge base management.

Figure 72:
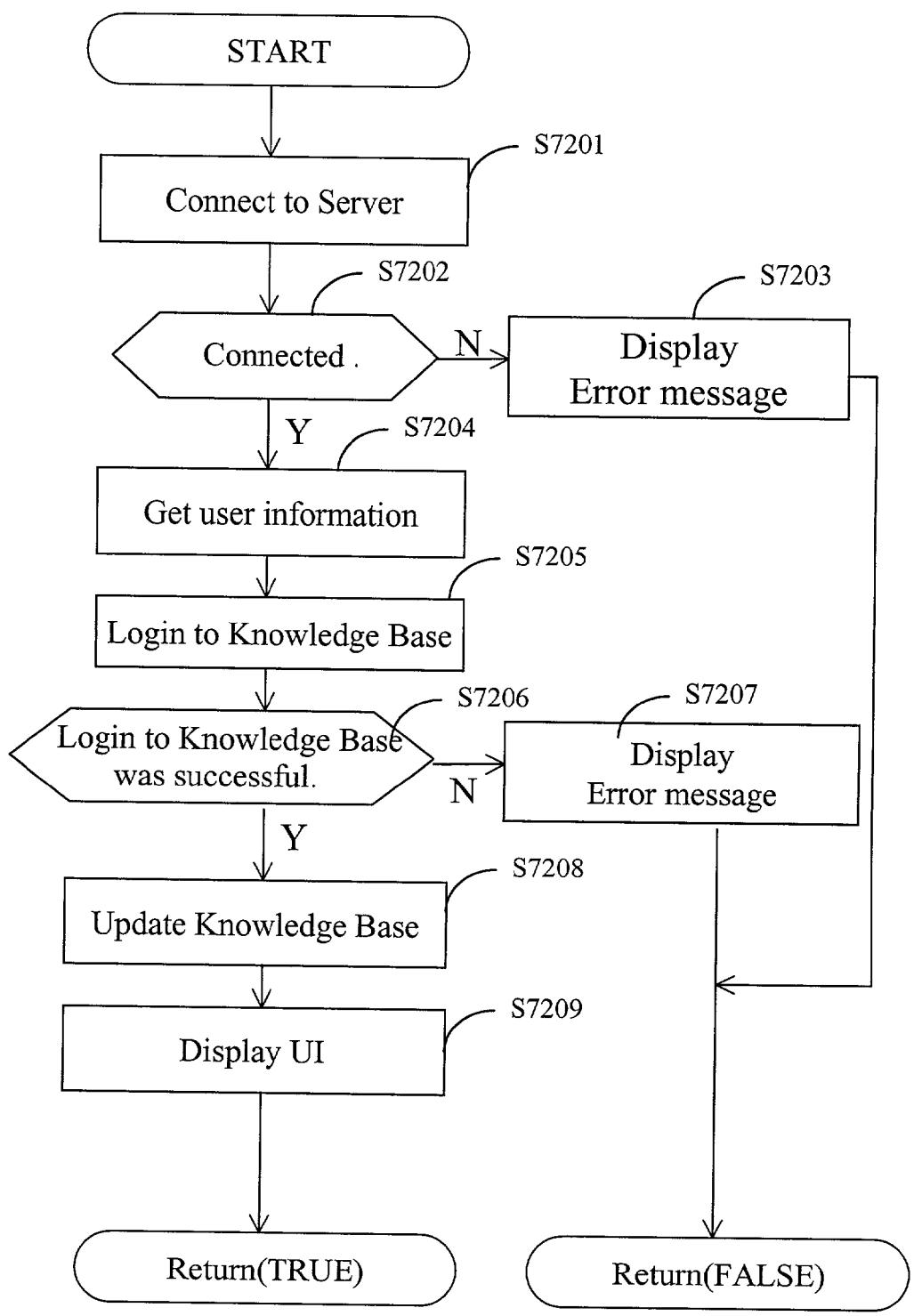
FIG. 72 is a flowchart of the procedural steps of INITIALIZE processing of a client.

FIG. 72 is a flowchart of the procedural steps of INITIALIZE processing step S401 of a client 401, when the embodiment is implemented as Client-Server type implementation. In step S7201, the client first connects to the server. In step S7202, a check is made to determine if connection was successful. If not, error message is displayed in step S7203 and the process returns false. Otherwise, in step S7204, User information is got and using the information thus obtained, the client logs in to knowledge base in step S7205. In step S7206 a check is made to determine if the login to the knowledge base was successful. If not, an error message is displayed in step S7207 and the process returns false. Otherwise, the knowledge base is updated in step S7208. In step S7209, UI of this embodiment is displayed, an example of which is shown in FIG. 25 is shown and the process returns true.

Figure 73:
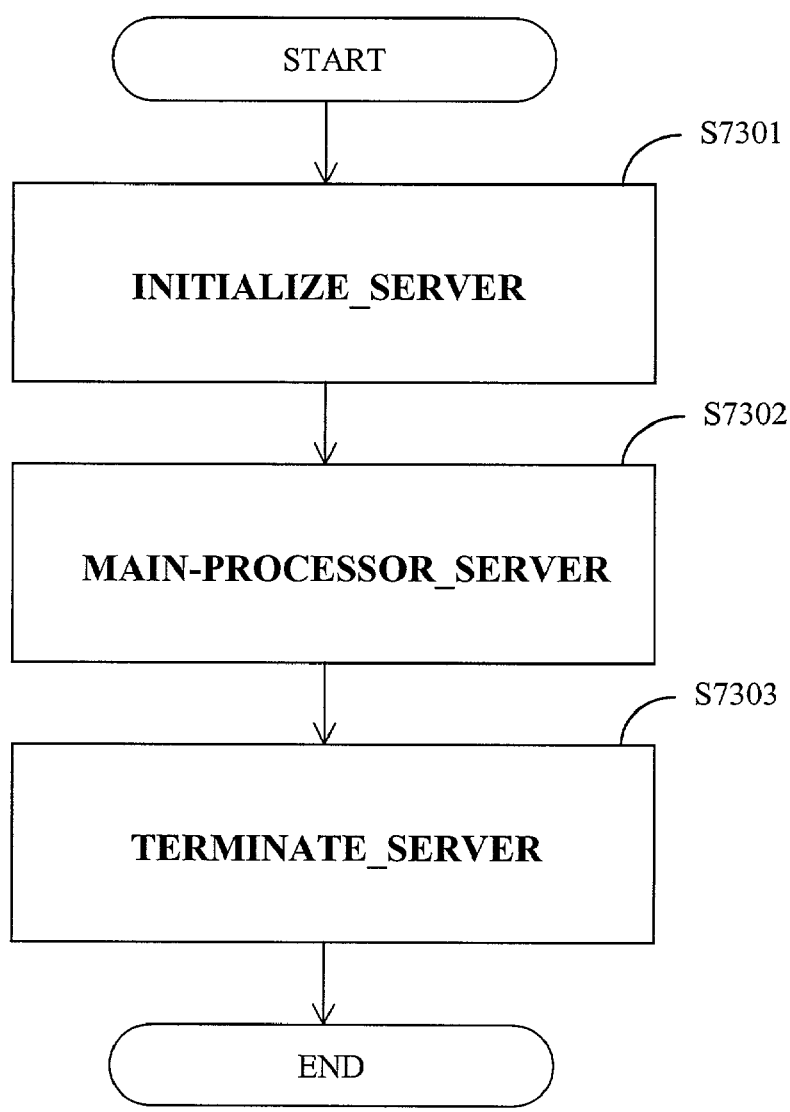
FIG. 73 is a flowchart of the main procedural steps of server.

FIG. 73 is a flowchart of the main procedural steps of server 403, when the embodiment is implemented as Client-Server type implementation. In step S7301, initialization steps are executed. In step S7302, main function processing saving etc. of this embodiment at the server side is performed. In step S7303, terminate or clean-up processing is executed.

Figure 74:
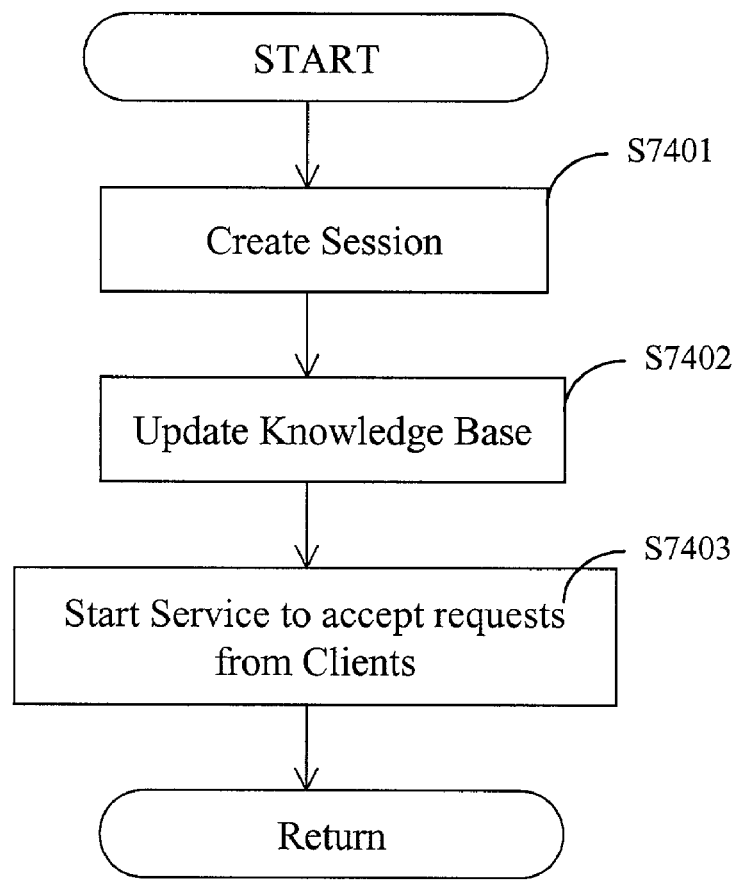
FIG. 74 is a flowchart of INITIALIZE_SERVER procedure.

FIG. 74 is a flowchart of INITIALIZE_SERVER procedure of step S7301 of this embodiment when implemented as Client-Server. In step S7401, Session is created. In step S7402 knowledge base is updated. In step S7403, service is started to accept requests from clients and the process returns.

Figure 75:
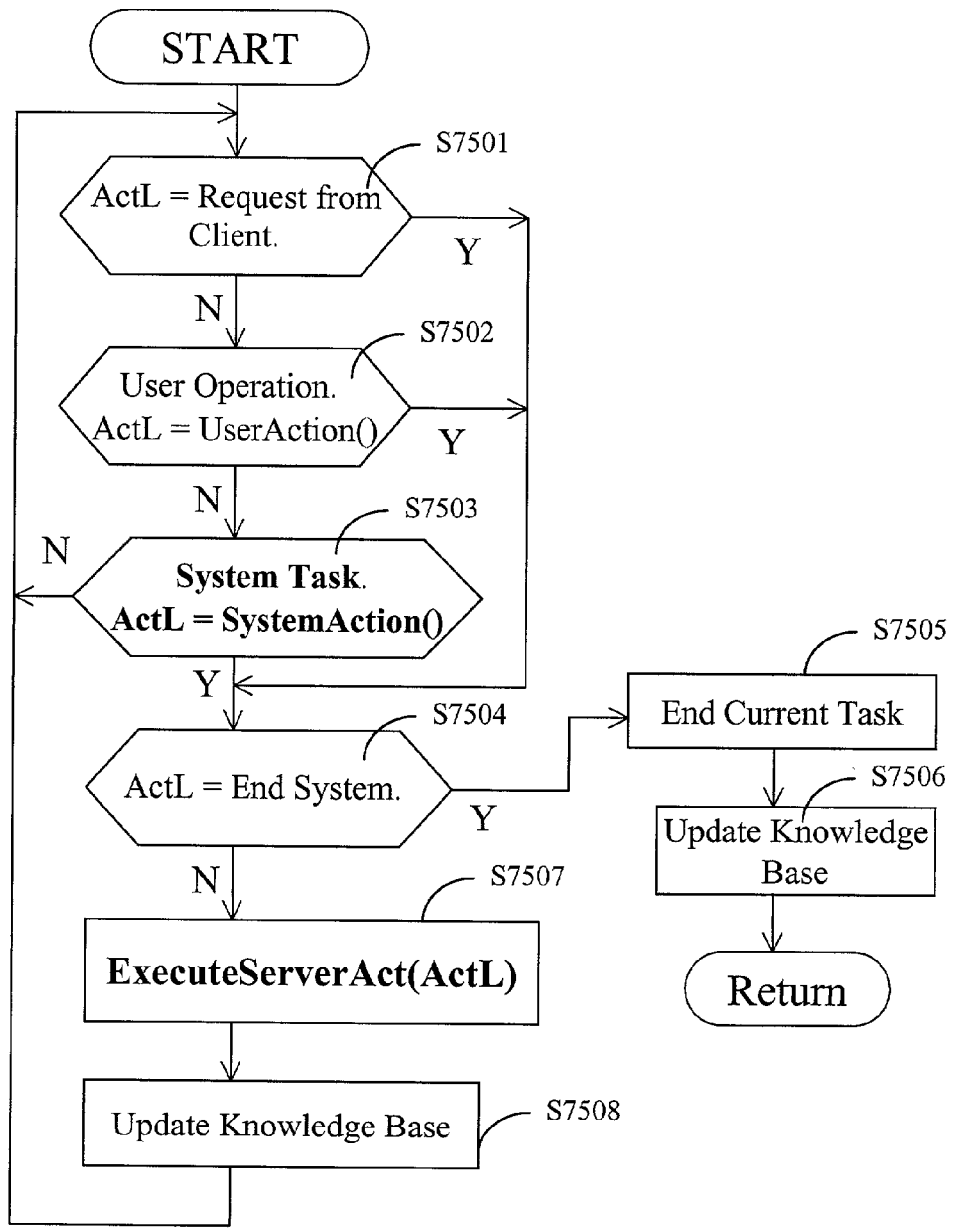
FIG. 75 is a flowchart of the procedural steps of MAIN-PROCESSOR_SERVER procedure.

FIG. 75 is a flowchart of the procedural steps of MAIN-PROCESSOR$_{13}$ SERVER procedure of step S7302 of this embodiment when implemented as Client-Server. In step S7501, a check is made if ActL has any requests from any client. If so, the process proceeds to step S7504. If no, a check is made to determine if there is any user operation and ActL is set to UserAction. If so, the process proceeds to step S7504. If not, a check is made to determine if there are any system tasks to be performed and ActL is set to SystemAction( ). If not, the process returns to step S7501. In step S7504, a check is made to determine if ActL is equal to End System. If so, all the current active tasks are terminated in step S7505 and the knowledge base is updated in step S7506 and the process returns. If not, in step S7507 ExecuteServerAct(ActL) is executed The ExecuteServerAct is similar to the ExecuteAction of FIG. 14 of this embodiment, the only difference being instead of executing the action completely at the client-end, only a request is made by the client and the actual process is executed at the server end. The knowledge base is updated in step S7508 and the process returns to step S7501.

Figure 76:
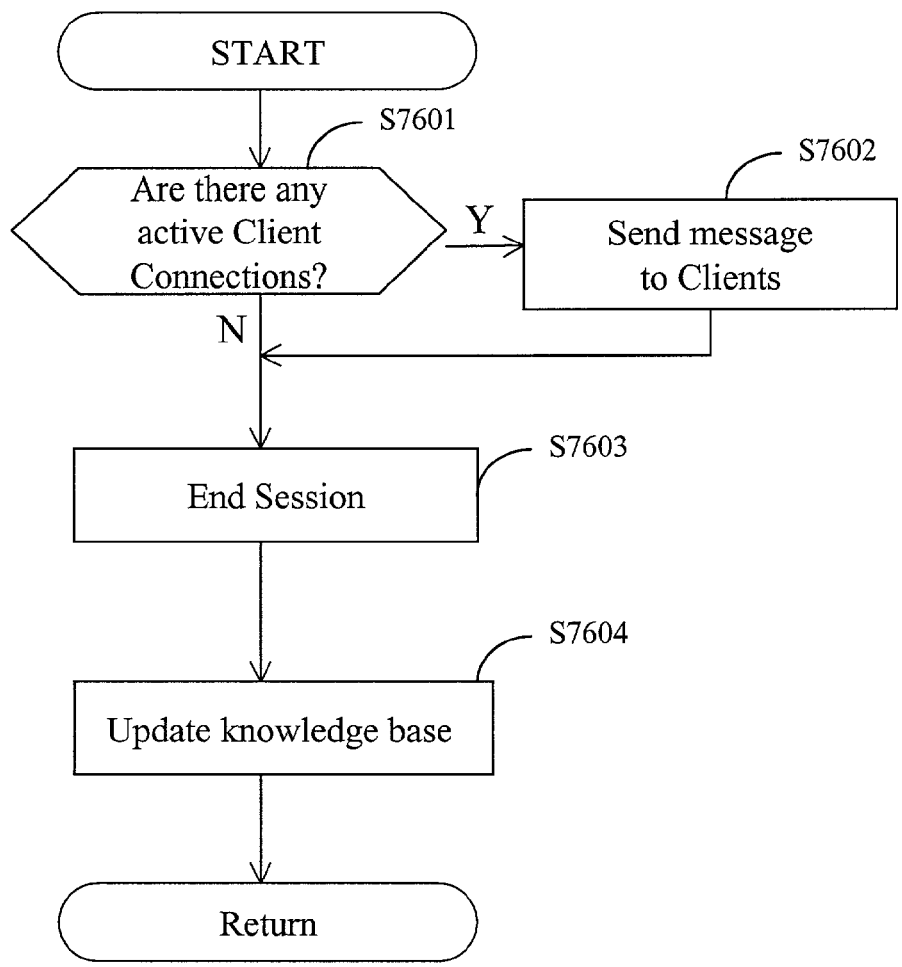
FIG. 76 is a flowchart of TERMINATE_SERVER procedure.

FIG. 76 is a flowchart of TERMINATE$_{13}$ SERVER procedure of step S7303 of this embodiment when implemented as Client-Server. In step S7601 a check is made to determine if there are any active client connections. If so, message is sent to the clients to disconnect from this server since it is shutting down. In either case the process proceeds to step S7603, where all the active sessions are terminated and the knowledge base is updated in step S7604 and the process returns.

Other exemplary configurations of the system are furthered described below.

Figure 77:
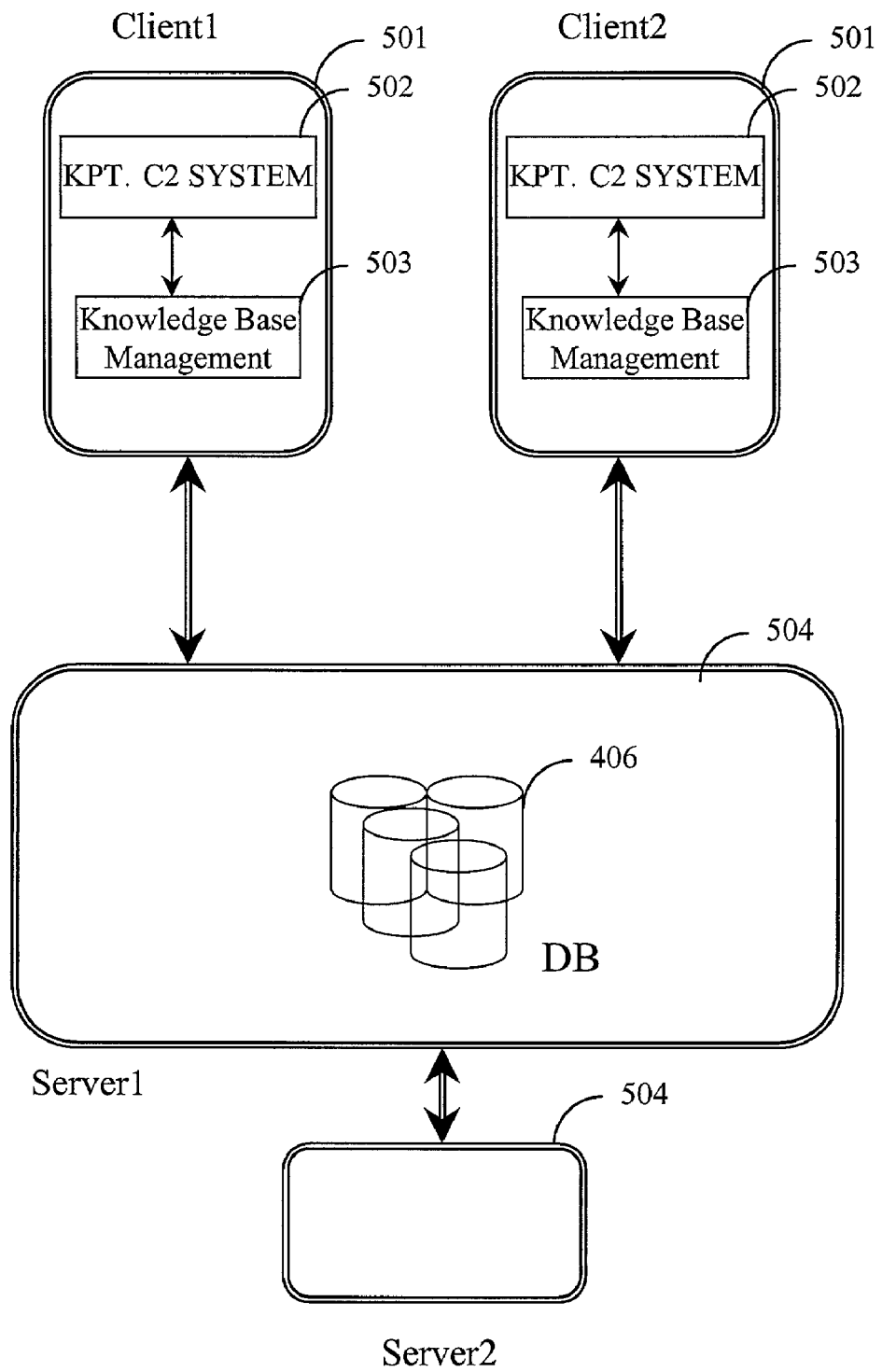
FIG. 77 shows a File Server type implementation.

FIG. 77 shows a File Server type implementation of this embodiment. The figure illustrates an example File Server type implementation of embodiment of FIG. 2. Multiple clients 501 have KPT C2 System 502, Knowledge Base Management 503, and communicate with Server 504. Server 504 is equipped with Date Base 406. Server 504 can also communicate with other servers to access their information stored in the database. This File Server type implementation differs from the Client Server type implementation only to the fact that all the processing is done at the client side and only the database is stored on the server, thus allowing multiple clients to share the data stored on the server. The server side does not have any processing module, but for the database.

Figure 78:
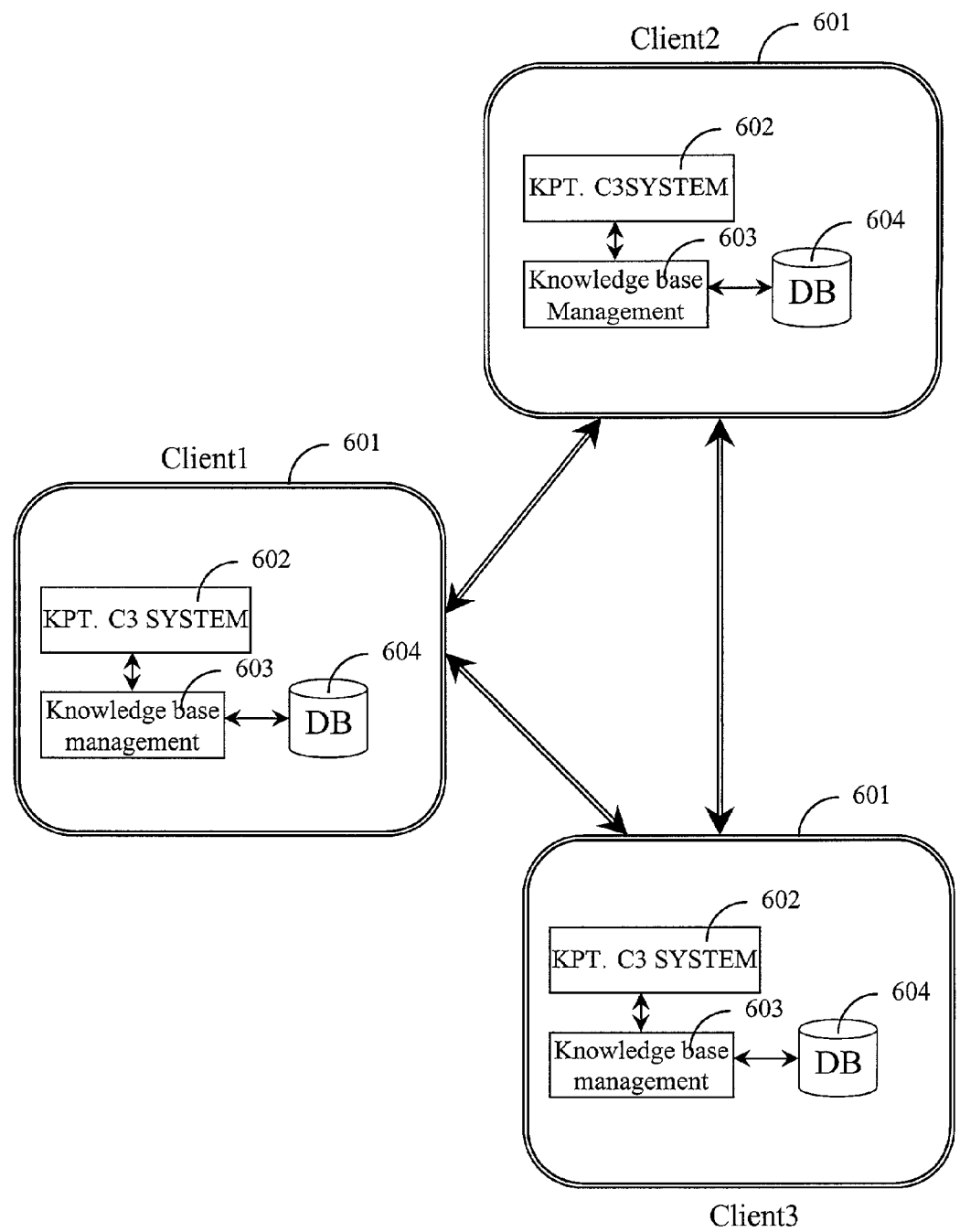
FIG. 78 shows a Distributed Clients type implementation.

FIG. 78 shows a Distributed Clients type implementation of this embodiment. The figure illustrates an example Distributed Clients type implementation of embodiment of FIG. 2. Multiple clients 601 have KPT C3 System 602, Knowledge Base Management 603, Database 604 and communicate with other clients to access their information stored in individual databases. The Distributed Clients implementation differs from the Client Server type implementation only to the fact that all the processing is done at the client side and each individual client is able to access data stored on other clients, thus allowing multiple clients to share the data stored across clients in an distributed environment.

Figure 79:
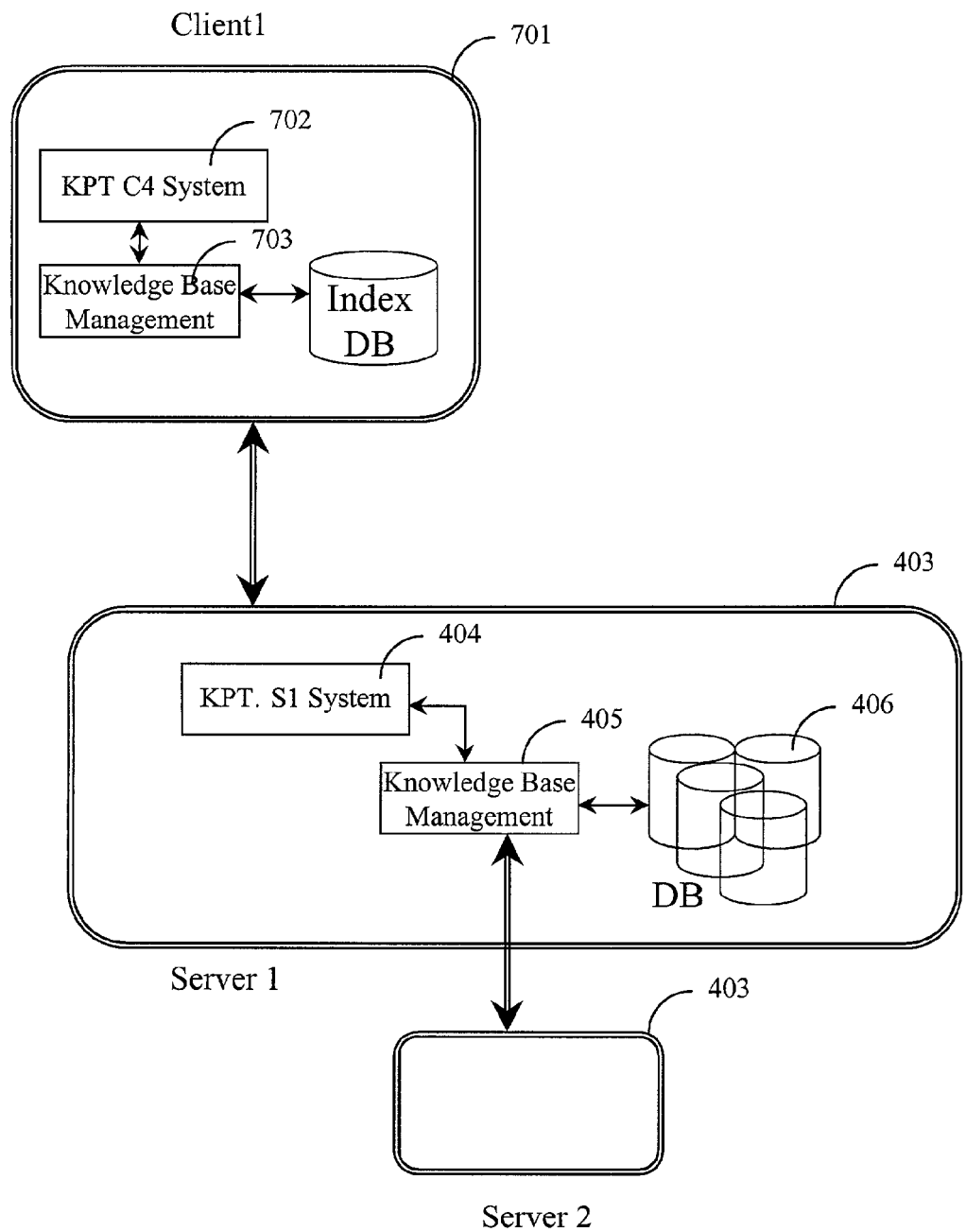
FIG. 79 shows another example of Client-Server type implementation.

FIG. 79 shows another example of Client-Server type implementation of this embodiment. The figure illustrates another example Client-Server type implementation of embodiment of FIG. 2. Multiple clients 701 have KPT C4 system 702, Knowledge base Management 703 and Index DB and communicate with Server 403. Server 403 is equipped with KPT S1 System 404, knowledge base management 405 and Database 406. Server 403 can also communicate with other servers to access their information stored in database, via knowledge base management. The client in this case has the indexes of the information in index DB of the information stored in the server to enable it to process and display the information in a very efficient way, since during retrieve or sorting the client does not need to connect and fetch the information from the server, thus speeding up the process considerably.

Figure 80:
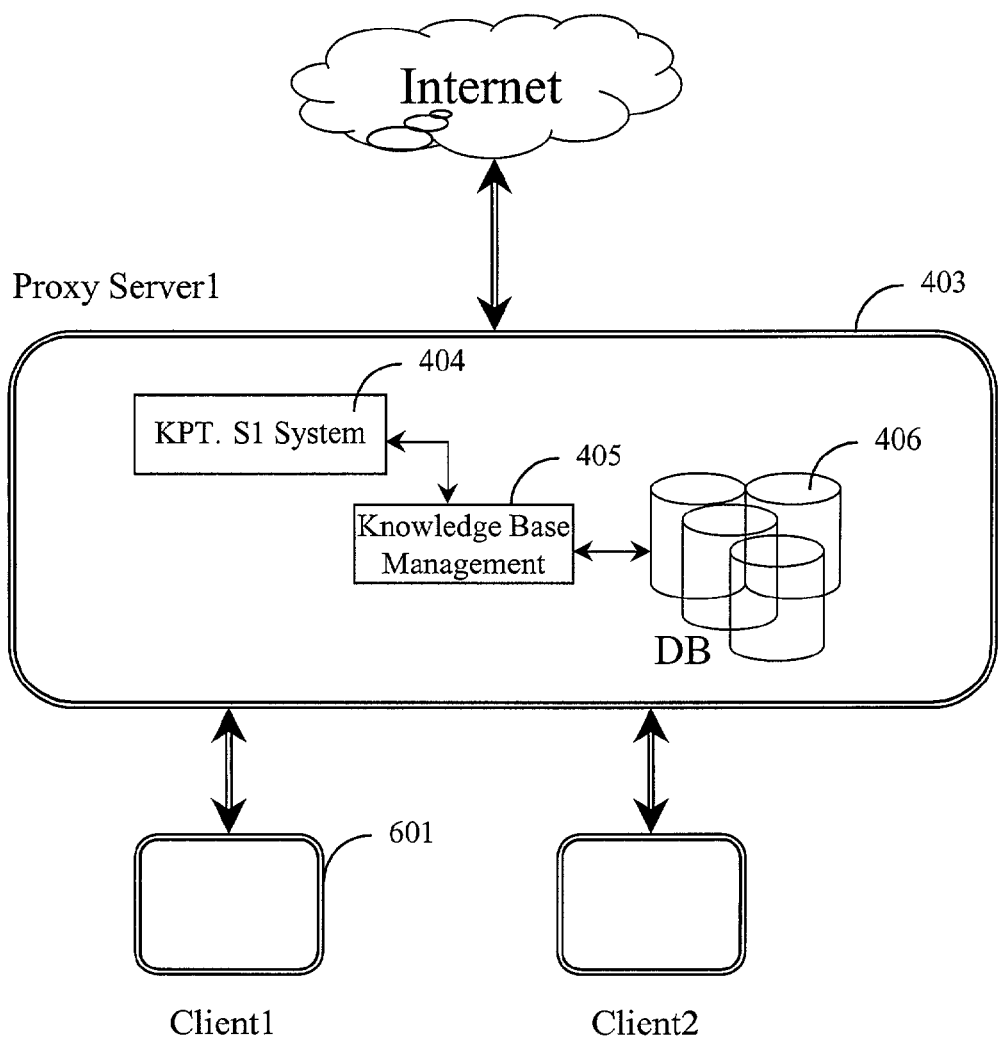
FIG. 80 shows an example implementation in which the server acts as a proxy server.

FIG. 80 shows an example implementation of this embodiment in which the server acts as a proxy server and all the connections to the internet are via the proxy server. By combining the KPT Server and Proxy server, the information browsing and fetch is speeded up to considerable extent, since the proxy server has an in-built cache.

Figure 81:
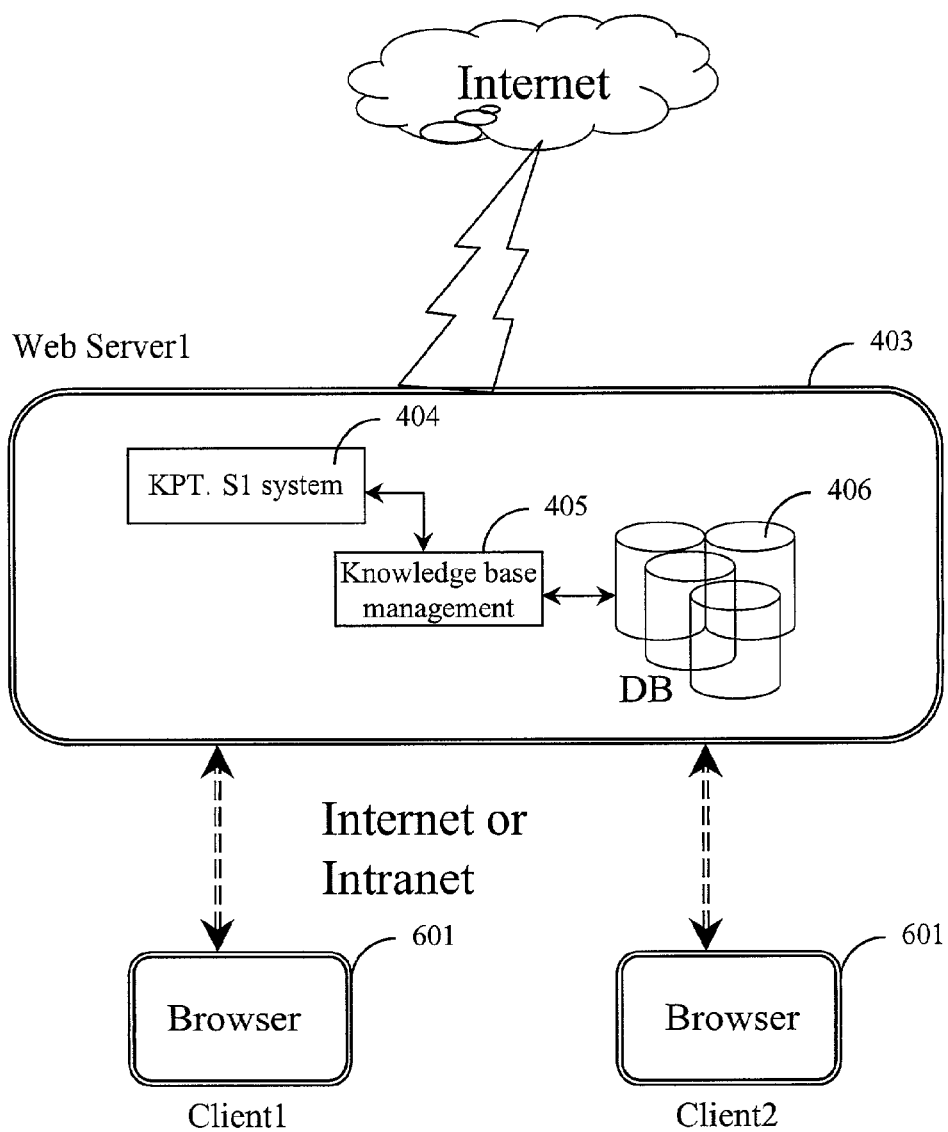
FIG. 81 shows an example web server based implementation.

FIG. 81 shows an example web server based implementation of this embodiment in which the server is a WebServer with KPT S1 System, Knowledge base management and DB. The clients 601 themselves are mere browsers. Thus, the entire processing of this embodiment is done at the server end and the clients only act as a means of displaying the information and getting information from the user.

Figure 82:
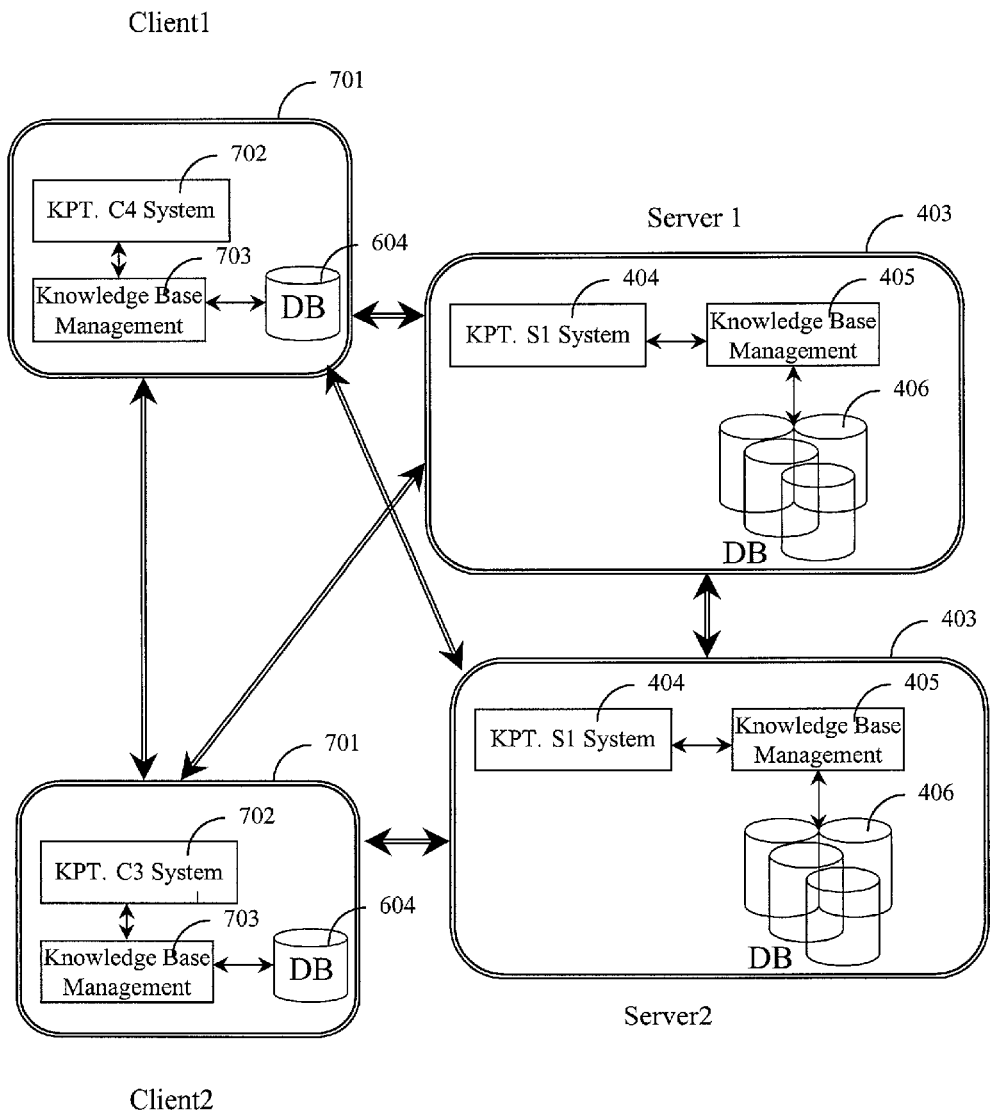
FIG. 82 shows an example mixed implementation of a File Server implementation and a Distributed Client implementation.

FIG. 82 shows an example mixed implementation in which the clients can communicate not only with server, as in a File Server implementation, but also to other clients, as in a Distributed Client implementation. As can be seen from the figure, numerous other combinations, like the client communicating with a web server based implementation, proxy server based implementation can also be implemented.

Figure 83:
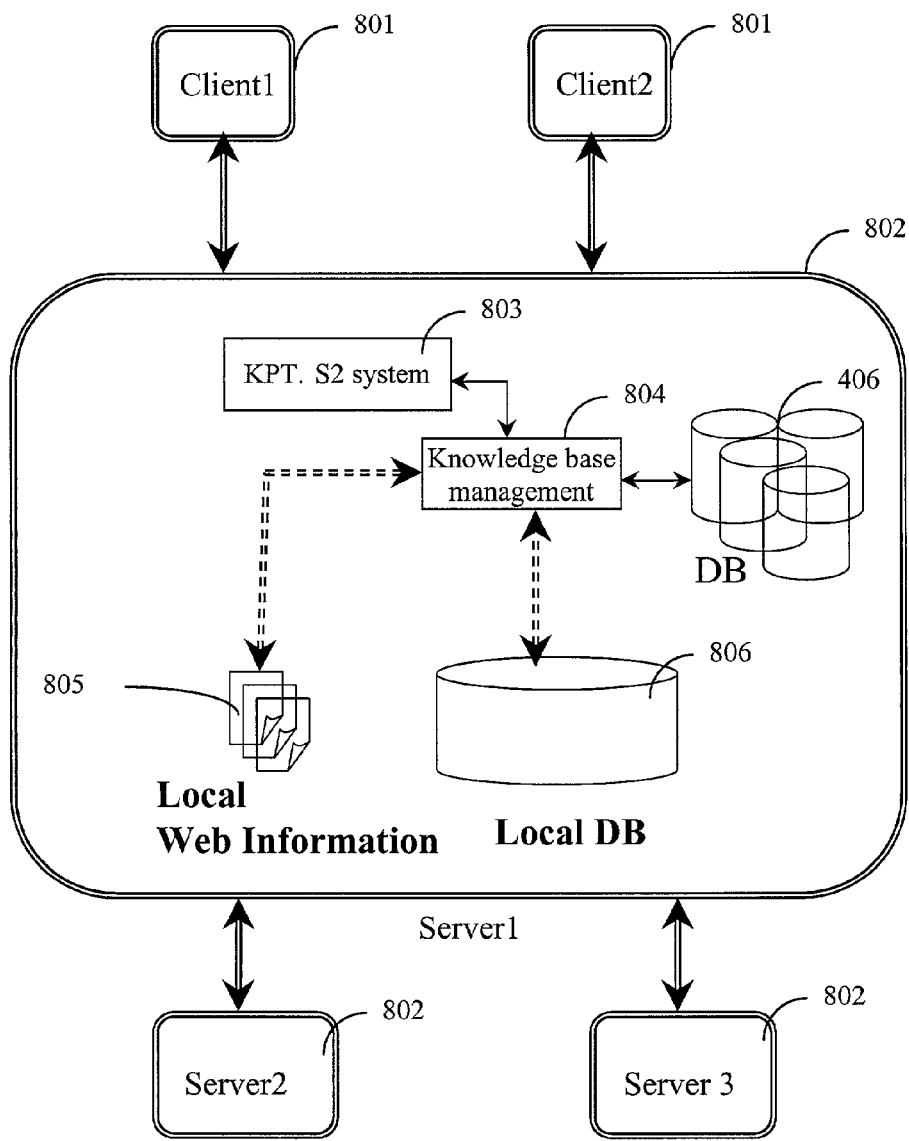
FIG. 83 shows another example of implementation.

FIG. 83 shows another example of implementation of this embodiment, in which the knowledge base management 804 at the server end, not only communicates with Database 406, but also to other external databases 806 and other external web information 805. Thus, the clients not only view the contents of the internet, but can also view the contents of a local database or local web information, along the same lines described in detail earlier in this embodiment.

Figure 84:
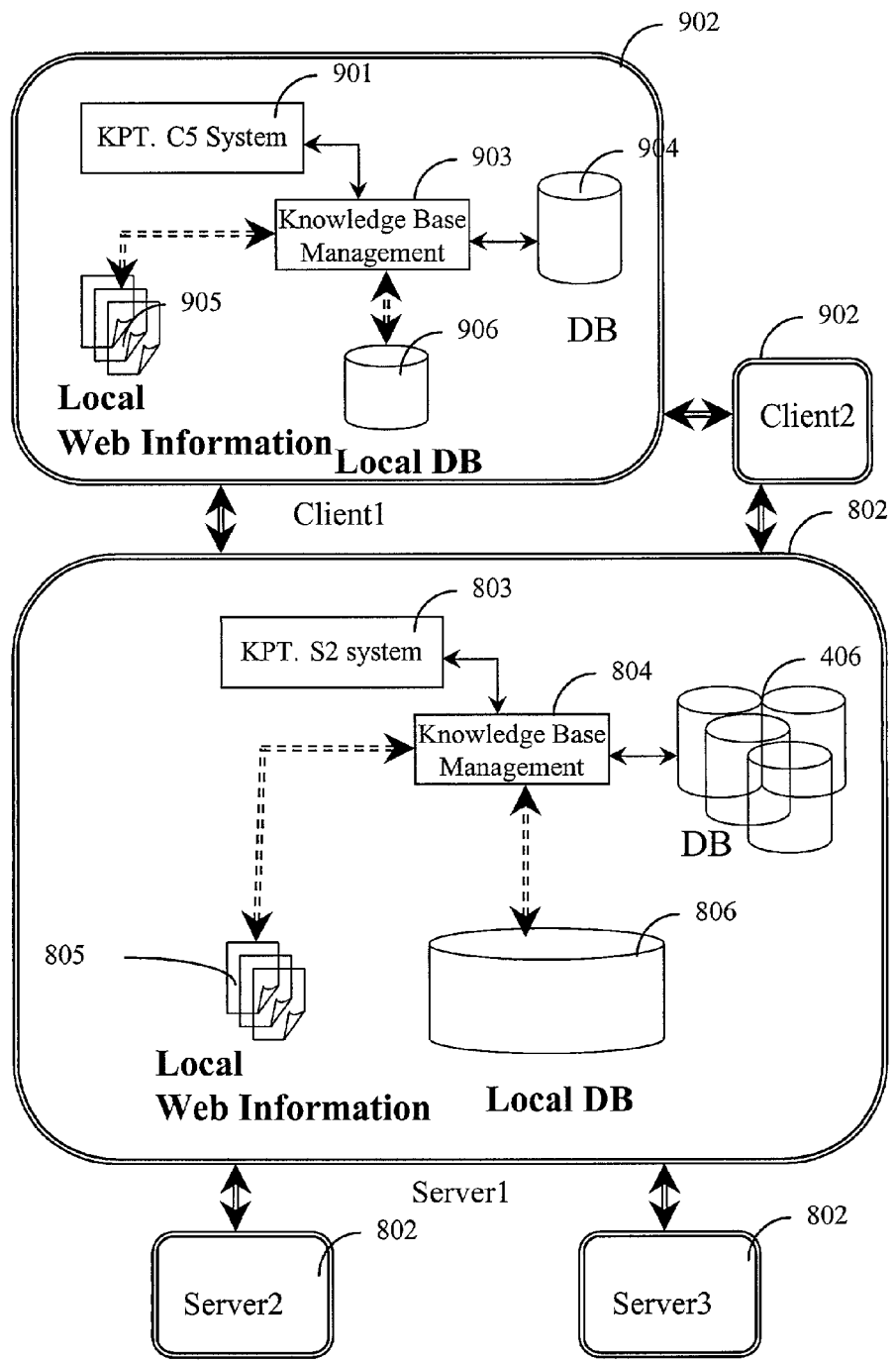
FIG. 84 shows another example of compounded implementation.

FIG. 84 shows another example of compounded implementation of this embodiment, in which the client 902 not only has knowledge base management 903, at the client end not only communicates with Database 904, but also to other external databases 906 and other local web information 905 on the client but also to other clients or servers explained earlier in this embodiment.

Figure 85:
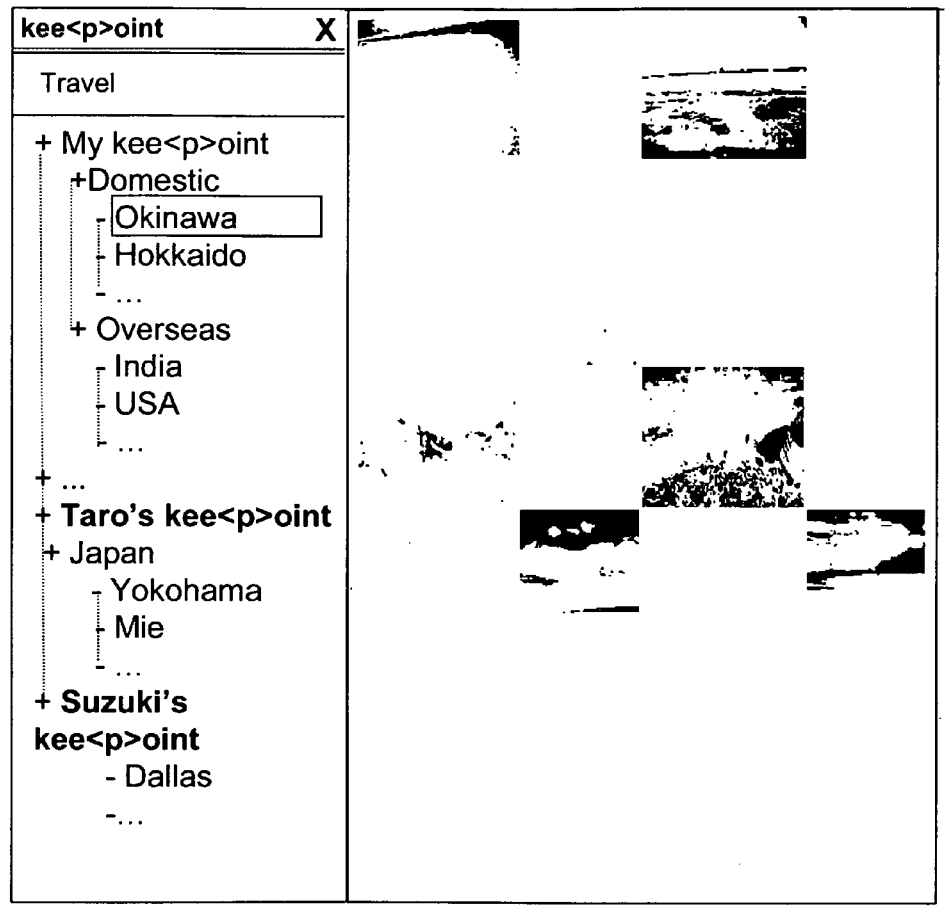
FIG. 85 displays an example of Show All links User Interface for Distributed client implementation.

FIG. 85 displays an example of Show All links User Interface for Distributed client implementation of this embodiment. The left hand side displays the links sorted on the specified attribute (Travel, in this example) of the current users' information and information on other client for example as can be seen in this figure, Taro's kee<p>oint and Suzuki's kee<p>oint. The right hand side view shows the contents of the saved information selected by the user for viewing on the left-hand side. It is obvious from the figure that it is possible that in case of Client Server implementation, the left-hand side view can be based on multiple servers and clients. It is also possible that only selected or customized servers or clients can be specified or defined in the left hand side view and also allow other clients to refer only after obtaining the necessary authentication or permission required to access the information.

Figure 86:
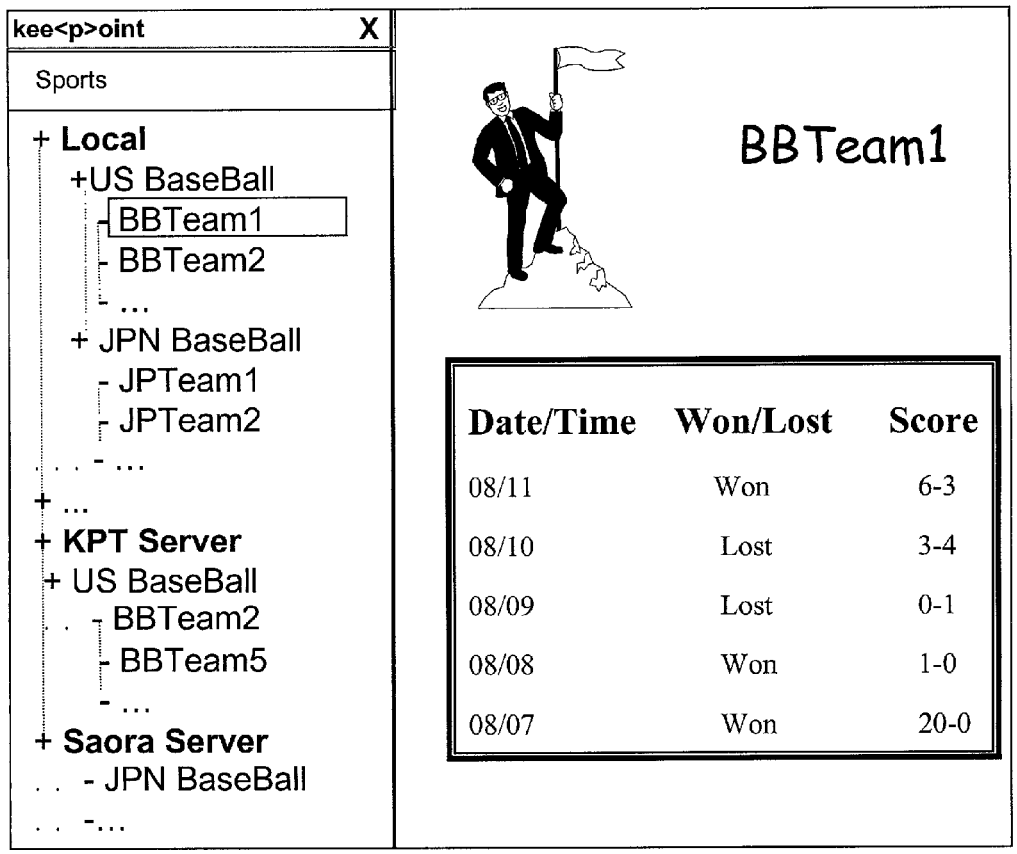
FIG. 86 displays an example of Show All links User Interface for Client Server implementation.

FIG. 86 displays an example of Show All links User Interface for Client Server implementation of this embodiment. The left-hand side displays the links sorted on the specified attribute (Sports, in this example) of the current users' information and information on other Server for example, KPT Server and Saora Server. The right hand side view shows the contents of the saved information selected by the user for viewing on the left-hand side. It is obvious from the figure that it is possible that in case of File Server implementation, the left-hand side view can be based on multiple servers and clients.

Figure 87:
FIGS. 87 and 88 display other examples of Show all links User Interface for external Database implementation.
Figure 88:
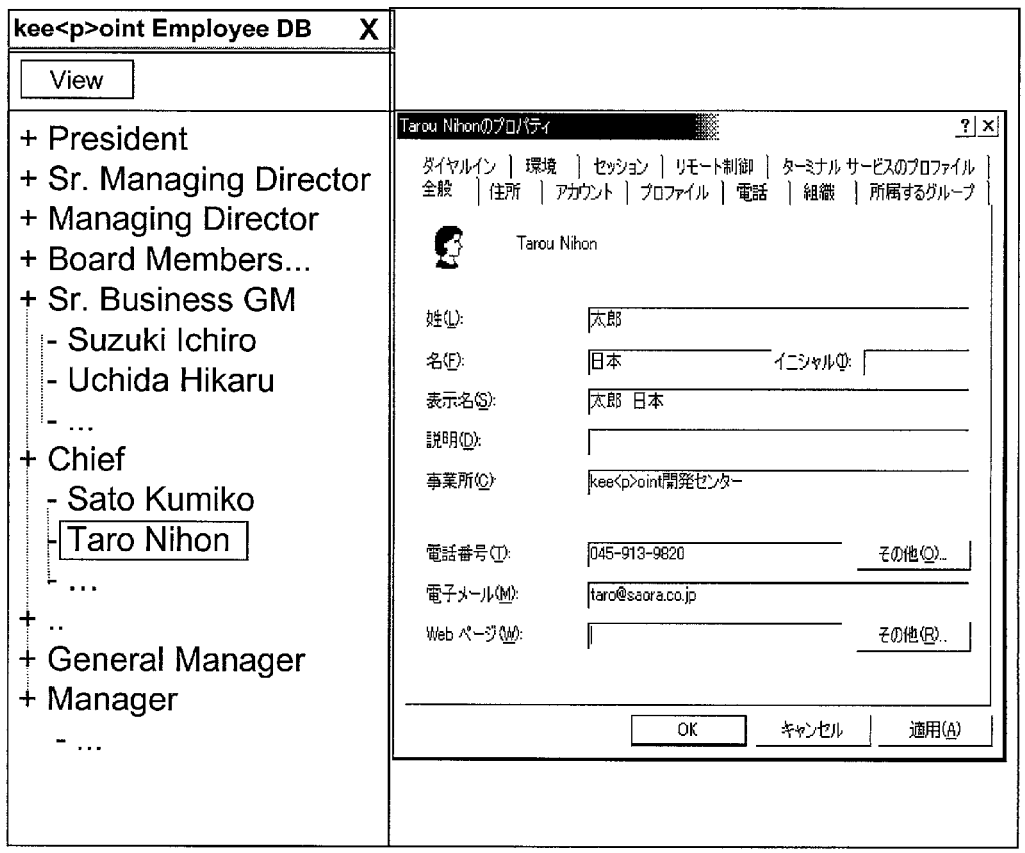

FIGS. 87 and 88 display other examples of Show all links User Interface for external Database implementation of this embodiment. The left hand side displays the links sorted in the specified attribute (Organization Chart, Designation in these examples respectively). The right hand side view shows the contents of the saved information selected by the user for viewing on the left-hand side.

Figure 89:
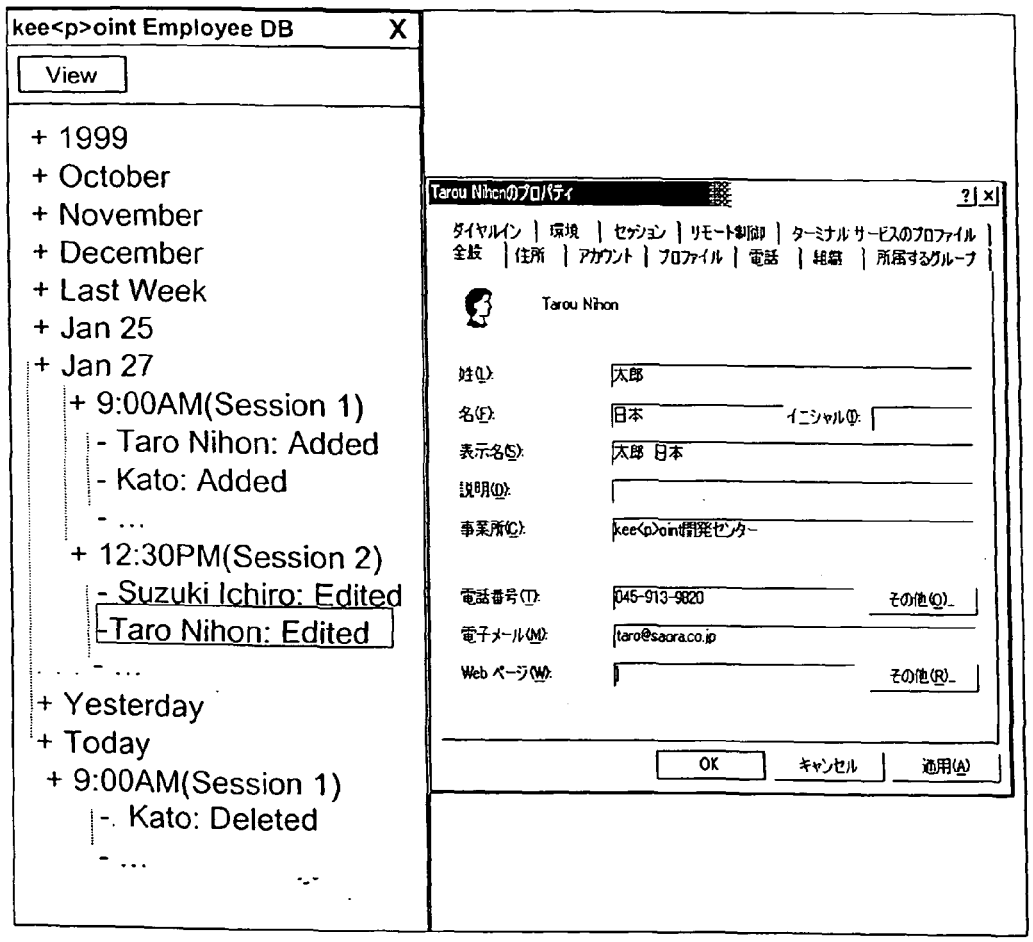
FIG. 89 displays an example of Session User Interface for external Database implementation.

FIG. 89 displays an example of Session User Interface for external Database implementation of this embodiment. The left hand side displays the links sorted in the time or session order. The right hand side view shows the contents of the saved information selected by the user for viewing on the left-hand side.

Figure 90:
FIG. 90 displays another example of Show all links User Interface for local web information implementation.

FIG. 90 displays another example of Show all links User Interface for local web information implementation of this embodiment. The left-hand side displays the links sorted in the specified attribute (Product DB, in this example). The right hand side view shows the contents of the saved information selected by the user for viewing on the left-hand side.

Figure 91:
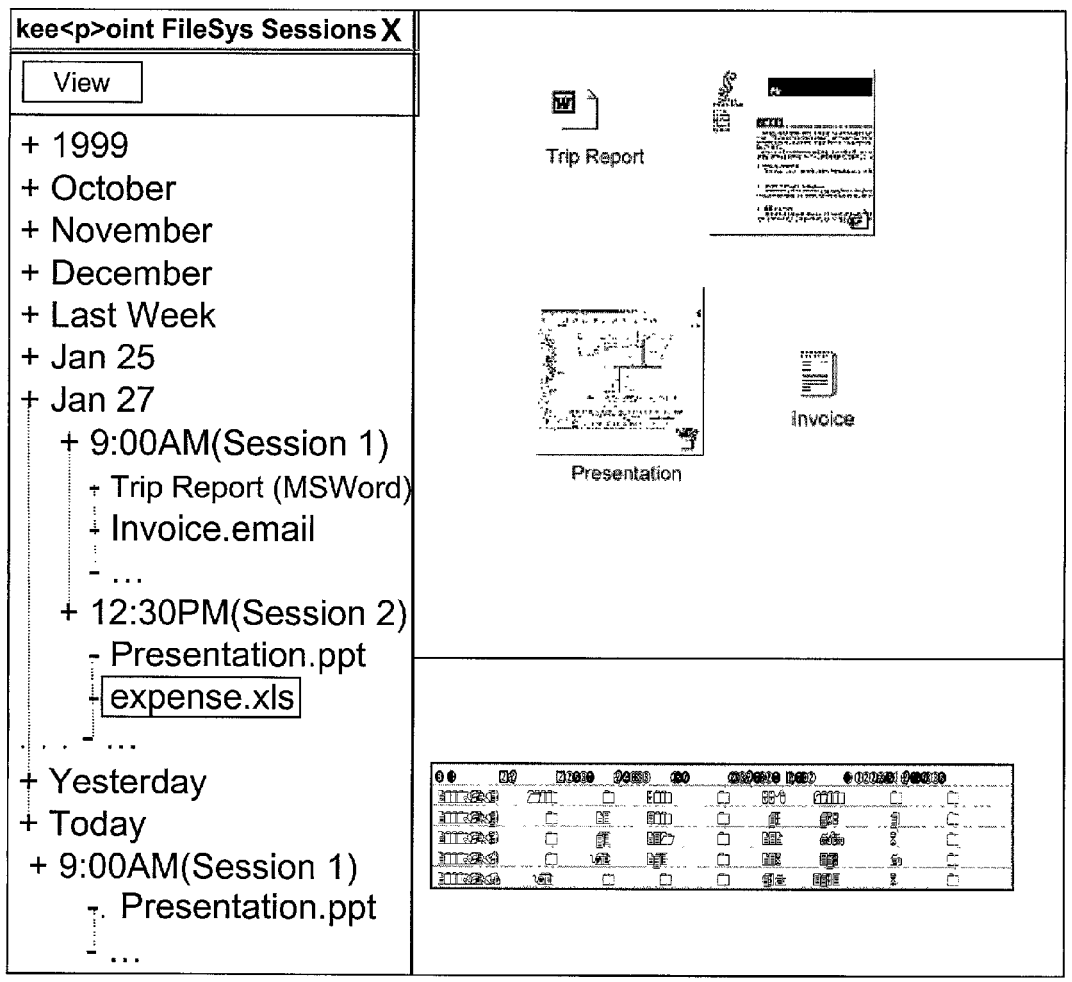
FIG. 91 displays another example of Session User Interface for File System implementation.

FIG. 91 displays another example of Session User Interface for File System implementation of this embodiment. The left hand side displays the links sorted in the time or session order. The sessions as can be seen from the figure are defined as from start of the working day till the end, or say from start of the day till lunch break and after lunch break to end of the day etc. The right hand side view shows the contents of the information selected by the user for viewing on the left-hand side. Thus, as it becomes obvious from this figure that the human beings keep track of the actions performed based on time and session and the contents of the proposed embodiment can be applied to any invention to sort and present the actions of an entity in time sorted, session fashion.

The present invention described above may be applied to a system constituted of a plurality of computers, or a specific computer within a system. the object of the present invention can also be achieved by supplying a storage medium storing program codes of software for implementing the function of the above embodiment to a system or an apparatus, and reading out and executing the program codes stored in the storage medium by a computer (or a CPU or MPU) of the system or apparatus. In this case, the program codes read out from the storage medium implement the function of the present invention, and the storage medium storing these program codes constitutes the invention. Also, besides the function of the above embodiment is implemented by executing the readout program codes by the computer, the present invention includes a case where an OS (Operating System) or the like running on the computer performs a part or the whole of actual processing in accordance with designations by the program codes and thereby implements the function of the above embodiment.

Furthermore, the present invention also includes a case where, after the program codes read out from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the function of the above embodiment.

It is to be understood that the above description is only representative of illustrative examples of embodiments and implementations. For the reader's convenience, the above description has focused on a representative sample of all possible embodiments, a sample that teaches the principles of the invention. Other embodiments may result from a different combination of portions of different embodiments. The description has not attempted to exhaustively enumerate all possible variations.

It should be recognized that the method, system and apparatus for monitoring connectivity across disparate networks has many applications, and is not limited to the representative examples disclosed herein. Alternate embodiments may not have been presented for some of the specific portions of the invention. Some alternate embodiments may result from a different combination of described portions, or other un-described alternate embodiments may be available for a portion. This is not to be considered a disclaimer of those alternate embodiments, because many of those un-described embodiments are within the literal scope of the following claims, and others are equivalent.

It is to be further understood that the tasks described in the following claims can be sequenced in many different orders to achieve the desired result. Thus, the scope of the present invention covers conventionally known variations and modifications to the system components and the method steps described herein, as would be known by those skilled in the art.

What is claimed is:

1. A method of saving web page data comprising:
   providing a first and a second save option within a window of a browser client;
   receiving a selection of the first or second save option from a user;
   acquiring web page data browsed by the browser client when the selection of the first save option is received from the user or when the browser client newly browses the web page data when the selection of the second save option has been received from the user;
   extracting a keyword from a content of the acquired web page data;
   assigning a plurality of indices that include a first index unique to the acquired web page data and a second index comprising the extracted keyword to the acquired web page data; and
   saving, subsequent to the keyword extraction, the acquired web page data browsed by the browser client in correspondence with the assigned indices in a predefined database, the saved web page data being sufficient to regenerate at least a portion of a previously browsed web page without accessing to the original source,
   wherein the acquired web page data is saved without prompting the user for a file name or destination folder when the selection of the first save option is received from the user, and
   the acquired web page data is saved without any further instruction from the user when the browser client is subsequently operated to move to another URL, when the selection of the second save option has been received from the user.

2. The method of claim 1, wherein the second save option includes a user selectable option to save only links of the browsed data or page contents of the browsed data.

3. The method of claim 1, wherein the second save option further includes an exclusion option that excludes saving particular web pages.

4. The method of claim 1, further comprising:
   displaying the first or second index within the browser client,
   wherein when the first index is displayed, a representation of the acquired web page data is listed in an order sorted by date, and
   wherein when the second index is displayed the representation of the acquired web page data is listed in an order sorted by keyword.

* * * * *